(12) United States Patent
Zhang et al.

(10) Patent No.: US 12,309,773 B2
(45) Date of Patent: May 20, 2025

(54) METHOD AND DEVICE FOR TRANSMITTING HARQ-ACK

(71) Applicant: Samsung Electronics Co., Ltd., Suwon-si (KR)

(72) Inventors: Sa Zhang, Beijing (CN); Yi Wang, Beijing (CN); Feifei Sun, Beijing (CN); Jingxing Fu, Beijing (CN); Miao Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 17/612,412

(22) PCT Filed: Nov. 18, 2020

(86) PCT No.: PCT/KR2020/016295
§ 371 (c)(1),
(2) Date: Nov. 18, 2021

(87) PCT Pub. No.: WO2021/101251
PCT Pub. Date: May 27, 2021

(65) Prior Publication Data
US 2022/0248436 A1    Aug. 4, 2022

(30) Foreign Application Priority Data

Nov. 18, 2019   (CN) .......................... 201911130306.8
Nov. 29, 2019   (CN) .......................... 201911205758.8
(Continued)

(51) Int. Cl.
*H04W 72/1273*   (2023.01)
*H04L 1/1812*    (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ........... H04W 72/1273; H04W 72/569; H04W 72/23; H04W 72/0446; H04L 1/1812;
(Continued)

(56) References Cited

U.S. PATENT DOCUMENTS

2014/0369294 A1   12/2014   Seo et al.
2017/0223695 A1   8/2017    Kwak et al.
(Continued)

FOREIGN PATENT DOCUMENTS

CN   104205710 A   12/2014
CN   110505698 A   11/2019
(Continued)

OTHER PUBLICATIONS

English Translation of Provisional U.S. Appl. No. 62/936,583 (Year: 2019).*
(Continued)

*Primary Examiner* — Mandish K Randhawa
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present application provide a method and device for transmitting Hybrid Automatic
(Continued)

| PDSCH 0 | PDSCH 1 | PDSCH 2 | PDSCH 3 | |
|---|---|---|---|---|
| Downlink time unit 0<br>First PDSCH group number: 0<br>First NFI: 0<br>First DAI: 2<br>HARQ-ACK feedback type indication information for the currently scheduled PDSCH: CBG<br>Uplink time unit in which the HARQ-ACK is fed back: 0 | Downlink time unit 1<br>First PDSCH group number: 0<br>First NFI: 0<br>First DAI: 2<br>HARQ-ACK feedback type indication information for the currently scheduled PDSCH: CBG<br>Uplink time unit in which the HARQ-ACK is fed back: 0 | Downlink time unit 2<br>First PDSCH group number: 0<br>First NFI: 1<br>First DAI: 1<br>Third DAI: 0<br>HARQ-ACK feedback type indication information for the currently scheduled PDSCH: CBG<br>Uplink time unit in which the HARQ-ACK is fed back: 1 | Downlink time unit 3<br>First PDSCH group number: 1<br>First NFI: 1<br>First DAI: 1<br>Third DAI: 1<br>Second NFI: 1<br>HARQ-ACK feedback type indication information for the currently scheduled PDSCH: CBG<br>Uplink time unit in which the HARQ-ACK is fed back: 1 | Uplink time unit 1<br>HARQ-ACK codebook:<br>Bit 1: PDSCH2-CBG0<br>Bit 2: PDSCH2-CBG1<br>Bit 3: PDSCH2-CBG1<br>Bit 4: PDSCH2-CBG1 |

Repeat request-Acknowledgement (HARQ-ACK). The method for transmitting HARQ-ACK comprises: receiving, in a downlink time unit, a physical downlink shared channel (PDSCH) and control signaling, which are transmitted by a transmitting side; determining, according to the control signaling, an uplink time unit configured to feed back HARQ-ACK corresponding to the received PDSCH and an HARQ-ACK codebook corresponding to the uplink time unit; and transmitting HARQ-ACK information corresponding to the HARQ-ACK codebook on a physical uplink control channel (PUCCH) or physical uplink shared channel (PUSCH) in the uplink time unit. By the method of the present application, the determination of an HARQ-ACK codebook corresponding to an uplink time unit is realized, and thus the effective utilization of uplink control channel resources is ensured.

24 Claims, 18 Drawing Sheets

(30) Foreign Application Priority Data

| Jan. 17, 2020 | (CN) | 202010053398.0 |
|---|---|---|
| Jan. 22, 2020 | (CN) | 202010074022.8 |
| Feb. 13, 2020 | (CN) | 202010091343.9 |
| Feb. 28, 2020 | (CN) | 202010130313.4 |
| Mar. 2, 2020 | (CN) | 202010136662.7 |
| Mar. 25, 2020 | (CN) | 202010217089.2 |
| Aug. 5, 2020 | (CN) | 202010779386.6 |
| Aug. 14, 2020 | (CN) | 202010820339.1 |

(51) Int. Cl.
  *H04L 5/00* (2006.01)
  *H04W 72/0446* (2023.01)
  *H04W 72/23* (2023.01)
  *H04W 72/566* (2023.01)

(52) U.S. Cl.
  CPC ....... *H04W 72/0446* (2013.01); *H04W 72/23* (2023.01); *H04W 72/569* (2023.01)

(58) Field of Classification Search
  CPC ... H04L 5/0053; H04L 1/1864; H04L 1/1671; H04L 1/1854; H04L 5/0094; H04L 5/0055
  See application file for complete search history.

(56) References Cited

U.S. PATENT DOCUMENTS

| 2019/0103943 | A1 | 4/2019 | Wang et al. | |
|---|---|---|---|---|
| 2019/0103947 | A1 | 4/2019 | Park | |
| 2019/0253206 | A1* | 8/2019 | Kusashima | H04L 1/1867 |
| 2019/0254045 | A1 | 8/2019 | Sadiq et al. | |
| 2019/0260515 | A1 | 8/2019 | Tang et al. | |
| 2019/0261361 | A1 | 8/2019 | Xiong et al. | |
| 2019/0342040 | A1 | 11/2019 | Tiirola et al. | |
| 2019/0363840 | A1 | 11/2019 | Wang et al. | |
| 2020/0295878 | A1* | 9/2020 | Choi | H04L 5/0094 |
| 2020/0344012 | A1* | 10/2020 | Karaki | H04L 1/1861 |
| 2021/0006356 | A1* | 1/2021 | Khoshnevisan | H04L 1/1864 |
| 2021/0218519 | A1 | 7/2021 | Gou et al. | |
| 2022/0158769 | A1 | 5/2022 | Gou et al. | |
| 2022/0295521 | A1 | 9/2022 | Gou et al. | |
| 2022/0303100 | A1* | 9/2022 | Yang | H04L 1/1861 |

FOREIGN PATENT DOCUMENTS

| CN | 110535555 A | 12/2019 |
|---|---|---|
| CN | 110536464 A | 12/2019 |
| WO | 2018/128474 A1 | 7/2018 |
| WO | 2019/139908 A1 | 7/2019 |

OTHER PUBLICATIONS

Sharp, HARQ enhancement for NR unlicensed operation, R1-1909090, 3GPP TSG RAN WG1 #98, Prague, Czech Republic, Aug. 16, 2019.
Qualcomm Incorporated, Enhancements to Scheduling and HARQ operation for NR-U, R1-1912940, 3GPP TSG RAN WG1 Meeting #99, Reno, Nevada, USA, Nov. 9, 2019.
Extended European Search Report dated May 17, 2022, issued in European Patent Application No. 20890079.5.
European Office Action dated Nov. 15, 2023, issued in European Patent Application No. 20 890 079.5.
Chinese Office Action dated Dec. 28, 2023, issued in Chinese Patent Application No. 201911205758.8.
Huawei, 'Feature lead summary of HARQ enhancements for NR-U', R1-1905649, 3GPP TSG RAN WG1 Meeting #96bis, Xi'an, China, Apr. 10, 2019.
Oppo, 'HARQ enhancements for NR-U', R1-1908419, 3GPP TSG RAN WG1 #98, Prague, Czech, Aug. 17, 2019.
Liu et al.; A scheme to reduce the delay of hybrid automatic repeat request process in unlicensed frequency band; Science Technology and Engineering; vol. 17, Issue 10, Apr. 2017; China Academic Journal Electronic Publishing House; Apr. 8, 2017.
Chinese Office Action with English translation dated May 8, 2024; Chinese Appln. No. 202010130313.4.
Qualcomm Incorporated; UCI Enhancements for eURLLC; 3GPP TSG-RAN WG1 #98; R1-1909575; Aug. 26-30, 2019; Prague, Czech Republic; Sep. 3, 2019.
Chinese Notice of Allowance with English translation dated Sep. 29, 2024; Chinese Appln. No. 202010130313.4.
VIVO; Other issues for Urllc; 3GPP TSG RAN WG1 #98bis; R1-1910227; Chongqing, China; Oct. 14-20, 2019; Oct. 4, 2019.
Qualcomm Incorporated; Remaining Design Details for URLLC Downlink Sps; 3GPP TSG-RAN WG1 #99; R1-1912965; Nov. 18-22, 2019; Reno, Nevada, USA; Nov. 9, 2019.
Nokia et al.; Clarification to the dynamically scheduled PDSCH collision with SPS-PDSCH; 3GPP TSG RAN WG1 #98bis; R1-1911663; Chongqing, P.R. China; Oct. 14-20, 2019; Oct. 22, 2019.
Chinese Office Action with English translation dated Jan. 27, 2025; Chinese Appln. No. 202010820339.1.

* cited by examiner

METHOD AND DEVICE FOR TRANSMITTING HARQ-ACK

TECHNICAL FIELD

The present application relates to the technical field of wireless communication technologies, and in particular to a method and device for transmitting HARQ-ACK.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

DISCLOSURE OF INVENTION

Technical Problem

Rapid development of the information industry, especially increasing demands on the mobile internet and the Internet of Things (IoT), brings unprecedented changes to the mobile communication technology in the future. For example, according to the ITU-R M. [IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT. FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc. In 3GPP, the task in the first stage of 5G has been in progress. In order to support more flexible scheduling, it is decided by the 3GPP that a variable Hybrid Automatic Repeat request-Acknowledgement (HARQ-ACK) feedback delay is supported in 5G. In an existing Long Term Evolution (LTE) system, the time from the reception of downlink data to the uplink transmission of HARQ-ACK is fixed. For example, in a Frequency Division Duplex (FDD) system, the delay is 4 subframes; while in a Time Division Duplex (TDD) system, an HARA-ACK feedback delay is determined for a corresponding downlink subframe according to the downlink/uplink configuration. In a 5G system, whether in an FDD system or a TDD system, for a determined downlink time unit (for example, a downlink slot or a mini downlink slot), an uplink time unit for feeding back HARQ-ACK is variable. For example, the delay of HARQ-ACK feedback may be dynamically indicated by a physical layer signaling, or different HARQ-ACK delays may be determined according to different services, user capabilities or other factors.

In 5G, when the HARQ-ACK delay is variable, even in an FDD system, it is also possible that the HARA-ACK to be fed back within an uplink time unit is from downlink data of multiple downlink time units; and, the number of HARQ-ACK downlink time units to be fed back is also variable and often different for each UE. However, in an existing TDD system, since the HARQ-ACK delay is variable, a starting location of a binding window for HARQ-ACK feedback is variable, and the length of the binding window is also variable. Moreover, in 5G, in addition to an HARQ-ACK feedback mechanism using a Transport Block (TB) as granularity in the existing LTE system, an HARQ-ACK feedback mechanism based on a Code Block Group (CBG) may also be used. When Physical Downlink Shred Channels (PDSCHs) of the two HARQ-ACK feedback mechanisms are to be fed back on a same Physical Uplink Control Channel (PUCCH) or Physical Uplink Shared Channel (PUSCH), how to design a downlink control signaling to allow a user terminal to determine an HARQ-ACK codebook and how to design an uplink control signaling to bear HARQ-ACK are problems to be urgently solved.

The 3GPP defines the three major directions of 5G application scenarios, i.e., eMBB (Enhanced Mobile Broadband), mMTC (large-scale Internet of Things, more commonly called massive Machine Type Communication) and URLLC (Ultra Reliable and Low Latency Communication). Among them, the eMBB scenario refers to the further improvement of performances such as user experience on the basis of the existing mobile broadband service scenario, mainly pursuing ultimate communication experience between persons. The mMTC and the URLLC are application scenarios of the Internet of Things, but their respective focuses are different: the mMTC is mainly the information interaction between persons and things, and the URLLC mainly reflects the communication demands between things. The eMBB and URLLC of 5G will adopt a manner of jointly networking, supporting both the URLLC service and the eMBB service in the same cell. Since the URLLC service may be a sparse service, compared to URLLC networking separately, eMBB and URLLC networking jointly can improve system spectrum efficiency. When there is a URLLC service in the system, the URLLC service is scheduled preferentially. When there is no URLLC service in the system or the URLLC service occupies fewer resources, the eMBB service can be scheduled. At present, when the URLLC service conflicts with the eMBB service, data and/or control information of the URLLC service will be transmitted preferentially. At this time, the performance of the eMBB service will be lost, and thus a solution how to optimize the transmission of the data and control information of the eMBB service is needed urgently.

Solution to Problem

In view of those defects in the prior art, the present application provides a method and device for transmitting HARQ-ACK to solve those technical defects.

In a first aspect, a method for transmitting hybrid automatic repeat request-acknowledgement (HARQ-ACK) is provided, applied on a receiving side, including:

receiving, in a downlink time unit, a physical downlink shared channel PDSCH and control signaling, which are transmitted by a transmitting side;

determining, according to the control signaling, an uplink time unit configured to feed back HARQ-ACK corresponding to the received PDSCH and an HARQ-ACK codebook corresponding to the uplink time unit, the size of the HARQ-ACK codebook being determined by at least one of a first downlink assignment index (DAI), a second DAI, a third DAI, a first PDSCH group number, a first new ACK group feedback indicator (NFI), a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for a transport block (TB) level HARQ-ACK feedback, and the number of bits corresponding to a PDSCH for code block group (CBG) level HARQ-ACK feedback; and transmitting HARQ-ACK information corresponding to the HARQ-ACK codebook on a physical uplink control channel (PUCCH) or physical uplink shared channel (PUSCH) in the uplink time unit.

Alternatively, the HARQ-ACK sub-codebook indication information for a second PDSCH group indicates at least one of the number of HARQ-ACK sub-codebooks for the second PDSCH group and the type of HARQ-ACK sub-codebooks included in the HARQ-ACK group codebooks for the second PDSCH group, the HARQ-ACK sub-codebooks including at least one of a first HARQ-ACK sub-codebook and a second HARQ-ACK sub-codebook.

Alternatively, the determining the HARQ-ACK group codebook for the second PDSCH group includes:

the HARQ-ACK codebook includes at least one of an HARQ-ACK group codebook for a first PDSCH group and an HARQ-ACK group codebook for a second PDSCH group; the HARQ-ACK group codebook for the second PDSCH group includes at least one of a first HARQ-ACK sub-codebook and a second HARQ-ACK sub-codebook; and the number for the second PDSCH group is indicated by a first PDSCH group number in downlink control information (DCI) configured to schedule a PDSCH in the second PDSCH group.

Alternatively, the determining the HARQ-ACK group codebook for the second PDSCH group includes:

configuring, by a base station and through higher layer signaling that the HARQ-ACK group codebook for the second PDSCH group includes one HARQ-ACK sub-codebook; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the type of the HARQ-ACK sub-codebook included in the HARQ-ACK group codebook for the second PDSCH group, the third DAI being indicative of the total number of PDSCHs to be fed back by the HARQ-ACK sub-codebook.

Alternatively, the determining the HARQ-ACK group codebook for the second PDSCH group includes:

configuring, by the base station and through higher layer signaling that the HARQ-ACK group codebook for the second PDSCH group includes one HARQ-ACK sub-codebook or two HARQ-ACK sub-codebooks; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the number of HARQ-ACK sub-codebooks for the second PDSCH group, the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the determining the HARQ-ACK group codebook for the second PDSCH group includes:

configuring, by a base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by a first HARQ-ACK sub-codebook included in the HARQ-ACK group codebook for the second PDSCH group and the total number of PDSCHs to be fed back by a second HARQ-ACK sub-codebook included in the HARQ-ACK group codebook for the second PDSCH group.

Alternatively, the third DAI may be divided into two parts. The third DAI may have 4 bits. The first part of the third DAI (for example, the first 2 bits of the 4 bits of the third DAI) indicates the total number of PDSCHs to be fed back by the first HARQ-ACK sub-codebook included in the HARQ-ACK group codebook for the second PDSCH group, and the second part of the third DAI (for example, the last 2 bits of the 4 bits of the third DAI) indicates the total number of PDSCHs to be fed back by the second HARQ-ACK sub-codebook included in the HARQ-ACK group codebook for the second PDSCH group; or, the second part of the third DAI (for example, the last 2 bits of the 4 bits of the third DAI) indicates the total number of PDSCHs to be fed back by the second HARQ-ACK sub-codebook included in the HARQ-ACK group codebook for the second PDSCH group, and the first part of the third DAI (for example, the first 2 bits of the 4 bits of the third DAI) indicates the total number of PDSCHs to be fed back by the first HARQ-ACK sub-codebook included in the HARQ-ACK group codebook for the second PDSCH group; or, the first part of the third DAI (for example, the first 2 bits of the 4 bits of the third DAI) indicates the total number of PDSCHs to be fed back by the second HARQ-ACK sub-codebook, and the second part of the third DAI (for example, the last 2 bits of the 4 bits of the third DAI) indicates the total number of PDSCHs to be fed back by the first HARQ-ACK sub-codebook.

Alternatively, the determining the HARQ-ACK group codebook for the second PDSCH group includes: configuring, by the base station and through higher layer signaling that the HARQ-ACK group codebook for the second PDSCH group may include zero HARQ-ACK sub-codebook (or, no HARQ-ACK sub-codebook), one first HARQ-ACK sub-codebook (or, one HARQ-ACK sub-codebook and this HARQ-ACK sub-codebook is the first HARQ-ACK sub-codebook), one second HARQ-ACK sub-codebook (or, one HARQ-ACK sub-codebook and this HARQ-ACK sub-codebook is the second HARQ-ACK sub-codebook) or two HARQ-ACK sub-codebooks; and configuring, by the base station and through higher layer signaling that the HARQ-ACK sub-codebook indication information for the second PDSCH group in the DCI is 2 bits, the HARQ-ACK sub-codebook indication information for the second PDSCH group being indicative of the number and type of HARQ-ACK sub-codebooks for the second PDSCH group, the third DAI being indicative of the total number of PDSCHs to be fed back by one or two HARQ-ACK sub-codebooks included in the HARQ-ACK group codebook for the second PDSCH group, and when there is one HARQ-ACK sub-codebook, the type of the HARQ-ACK sub-codebook being determined by the HARQ-ACK feedback type indication information for the currently scheduled PDSCHs.

Alternatively, joint coding may be used for the HARQ-ACK group codebook indication information for a PDSCH group and the HARQ-ACK sub-codebook indication information for a second PDSCH group. 2 bits may be used to indicate that the HARQ-ACK group codebook for the second PDSCH group may include zero HARQ-ACK sub-codebook (or, no HARQ-ACK sub-codebook), one first HARQ-ACK sub-codebook (or, one HARQ-ACK sub-codebook and this HARQ-ACK sub-codebook is a first HARQ-ACK sub-codebook), one second HARQ-ACK sub-codebook (or, one HARQ-ACK sub-codebook and this HARQ-ACK sub-codebook is a second HARQ-ACK sub-codebook) or two HARQ-ACK sub-codebooks.

Alternatively, the HARQ-ACK codebook includes at least one of an HARQ-ACK group codebook for a first PDSCH group and an HARQ-ACK group codebook for a second PDSCH group; and whether the HARQ-ACK codebook includes the HARQ-ACK group codebook for the PDSCH group is determined by the HARQ-ACK group codebook indication information for the PDSCH group.

Alternatively, one HARQ-ACK codebook includes one or more HARQ-ACK group codebooks for the PDSCH group. The number of HARQ-ACK group codebooks for the PDSCH group, included in one HARQ-ACK codebook, is determined by the HARQ-ACK group codebook indication information for the PDSCH group.

Alternatively, one HARQ-ACK group codebook for the PDSCH group may include one or more HARQ-ACK sub-codebooks. An HARQ-ACK sub-codebook may be a first HARQ-ACK sub-codebook, or may be a second HARQ-ACK sub-codebook. The first HARQ-ACK sub-codebook is an HARQ-ACK sub-codebook for TB-level HARQ-ACK feedback. The second HARQ-ACK sub-codebook is an HARQ-ACK sub-codebook for CBG-level HARQ-ACK feedback. When one HARQ-ACK group codebook for the PDSCH group includes two HARQ-ACK sub-codebooks, the first HARQ-ACK sub-codebook is ahead of the second HARQ-ACK sub-codebook.

Alternatively, the order, in the HARQ-ACK codebook, of one HARQ-ACK group codebook for the PDSCH group is determined by the PDSCH group number and the type of the PDSCH group. The type of the PDSCH group indicates whether the PDSCH group is a first PDSCH group or a second PDSCH group.

Alternatively, the number of HARQ-ACK sub-codebooks included in the HARQ-ACK group codebook for the first PDSCH group is determined by the feedback type for all PDSCHs, for which the feedback of HARQ-ACK is required, in the first PDSCH group. The feedback type for a PDSCH is CBG-level HARQ-ACK feedback or TB-level HARQ-ACK feedback.

Alternatively, the number of HARQ-ACK sub-codebooks included in the HARQ-ACK group code for the second PDSCH group is determined by at least one of the HARQ-ACK sub-codebook indication information for the second PDSCH group, the feedback type for PDSCHs, for which the feedback of HARQ-ACK is required, in the second PDSCH group, and the feedback type for the currently scheduled PDSCHs.

Alternatively, the size and order of the HARQ-ACK sub-codebooks for the first PDSCH group are determined by at least one of the first DAI, the second DAI, the first NFI, and the HARQ-ACK feedback type for PDSCHs. The HARQ-ACK feedback type for PDSCHs indicates whether the feedback for the PDSCH is TB-level HARQ-ACK feedback or CBG-level HARQ-ACK feedback.

Alternatively, the size and order of the HARQ-ACK sub-codebooks for the second PDSCH group are determined by at least one of the first DAI, the second DAI, the third DAI, the first NFI, the second NFI, the HARQ-ACK feedback type indication information for the currently scheduled PDSCHs, and the HARQ-ACK sub-codebook indication information for the second PDSCH group.

Alternatively, the HARQ-ACK sub-codebook indication information for the second PDSCH group indicates at least one of the number of HARQ-ACK sub-codebooks for the second PDSCH group and the type of HARQ-ACK sub-codebooks included in the HARQ-ACK group codebook for the second PDSCH group. The HARQ-ACK sub-codebooks include at least one of a first HARQ-ACK sub-codebook and a second HARQ-ACK sub-codebook.

Alternatively, the currently scheduled PDSCHs are divided into groups. The first PDSCH group is a PDSCH group in which the currently scheduled PDSCHs are included. The first PDSCH group number is indicated by the first PDSCH group number in the DCI configured to schedule PDSCHs currently. The first PDSCH group and the second PDSCH group may be numbered uniformly. The second PDSCH group number is different from the first PDSCH group number in the DCI configured to schedule PDSCHs currently. For example, when the HARQ-ACK codebook includes an HARQ-ACK group codebook for the first PDSCH group and an HARQ-ACK group codebook for the second PDSCH group, the first PDSCH group number in the DCI configured to schedule PDSCHs currently may be indicated by 1 bit, and when the first PDSCH group number is 0, the second PDSCH group number is 1; and when the first PDSCH group number is 1, the second PDSCH group number is 0. In the DCI configured to schedule PDSCHs currently, no PDSCH in the second PDSCH group is scheduled. The second PDSCH group number may also be indicated by the HARQ-ACK group codebook indication information for the PDSCH group.

Alternatively, the HARQ-ACK group codebook for the PDSCH group indicates whether to provide feedback for the HARQ-ACK group codebook for the second PDSCH group. The HARQ-ACK group codebook indication information for the PDSCH group may indicate the number of HARQ-ACK group codebooks. For example, 1 bit may be used to indicate that there is one or two HARQ-ACK group codebooks. 0 may be used to indicate that there is one HARQ-ACK group codebook, and 1 may be used to indicate that there are two HARQ-ACK group codebooks; or, 1 may be used to indicate that there is one HARQ-ACK group codebook, and 0 may be used to indicate that there are two HARQ-ACK group codebooks. The HARQ-ACK group codebook indication information for the PDSCH group may also indicate the group number of the second HARQ-ACK group codebook. When the group number of the second HARQ-ACK group codebook is different from the number of the first HARQ-ACK group codebook, HARQ-ACK feedback is provided for the second HARQ-ACK group codebook, and when the group number of the second HARQ-ACK group codebook is the same as the number of the first HARQ-ACK group codebook, HARQ-ACK feedback is not provided for the second HARQ-ACK group codebook. The HARQ-ACK group codebook indication information for the PDSCH group may also indicate whether to provide feedback for the second HARQ-ACK group codebook. For example, 1 bit may be used for indication. 0 may be used to indicate to provide HARQ-ACK feedback for the second HARQ-ACK group codebook, and 1 may be used to indicate not to provide HARQ-ACK feedback for the second HARQ-ACK group codebook; or, 1 may be used to indicate to provide HARQ-ACK feedback for the second HARQ-ACK group codebook, and 0 may be used to indicate not to provide HARQ-ACK feedback for the second HARQ-ACK group codebook.

Alternatively, the order, in the HARQ-ACK codebook, of a HARQ-ACK group codebook for a PDSCH group may be determined by the type of the PDSCH group. For example, the HARQ-ACK group codebook for the first PDSCH group is ahead of (or behind) the HARQ-ACK group codebook for the second PDSCH group.

Alternatively, the order, in the HARQ-ACK codebook, of a HARQ-ACK group codebook for a PDSCH group may be determined by the PDSCH group number. For example, the HARQ-ACK group codebook for a PDSCH group numbered by 0 is ahead of (or behind) the HARQ-ACK group codebook for a PDSCH group numbered by 1.

Alternatively, the type of HARQ-ACK sub-codebooks included in the HARQ-ACK group codebook for the first PDSCH group is determined by the feedback type for all PDSCHs, for which the feedback of HARQ-ACK is required, in the first PDSCH group. Specifically, when the feedback type for all PDSCHs, for which the feedback of HARQ-ACK is required, in the first PDSCH group is TB-level HARQ-ACK feedback, the HARQ-ACK group codebook for the first PDSCH group includes only the first HARQ-ACK sub-codebook; when the feedback type for all PDSCHs, for which the feedback of HARQ-ACK is required, in the first PDSCH group is CBG-level HARQ-ACK feedback, the HARQ-ACK group codebook for the first PDSCH group includes only the second HARQ-ACK sub-codebook; when the feedback type for all PDSCHs, for which the feedback of HARQ-ACK is required, in the first PDSCH group includes both the TB-level HARQ-ACK feedback and the CBG-level HARQ-ACK feedback, the HARQ-ACK group codebook for the first PDSCH group includes both the first HARQ-ACK sub-codebook and the second HARQ-ACK sub-codebook.

Alternatively, the control signaling may further include at least one of the first DAI, the second DAI, the third DAI, the first PDSCH group number, the first NFI, the second NFI, the HARQ-ACK feedback type indication information for currently scheduled PDSCHs, the HARQ-ACK sub-codebook indication information for a PDSCH group, and the HARQ-ACK sub-codebook indication information for a second PDSCH group. The DAIs are numbered in PDSCHs, for which HARQ-ACK is fed back, in a same PDSCH group.

Alternatively, the first DAI indicates the following information: the relative order of currently scheduled PDSCHS in a downlink time unit and all scheduled PDSCHs in the downlink time unit corresponding to the uplink time unit, and the bit position of the HARQ-ACK bits for currently scheduled PDSCHs in the downlink time unit in the HARQ-ACK sub-codebook in the HARQ-ACK group codebook.

Alternatively, the second DAI indicates the total number of all scheduled PDSCHs, corresponding to the uplink time unit, in the first PDSCH group.

The first NFI indicates whether the first DAI and/or the second DAI for the first PDSCH group are recounted. 1 bit may be used to indicate it. When the first NFI received in the current downlink time unit is the same as the first NFI received in the previous downlink time unit, the first DAI and/or the second DAI is not recounted; and when the first NFI received in the current downlink time unit is different from the first NFI received in the previous downlink time unit, the first DAI and/or the second DAI are recounted. For example, when the first NFI received in a first current downlink time unit is 0, if the first NFI received in a second previous downlink time unit is 0, the first DAI and/or the second DAI received in the second downlink time unit is not recounted; and if the first NFI received in a second previous downlink time unit is 1, the first DAI and/or the second DAI received in the second downlink time unit are recounted.

The second NFI indicates whether the third DAI for the second PDSCH group is recounted. The principle of the second NFI is the same as that of the first NFI. By judging whether the second NFI received in the current downlink time unit is the same as the first NFI received in the previous downlink time unit in which a PDSCH in the second PDSCH group is scheduled, it is determined whether the third DAI is recounted.

Alternatively, if there is no second NFI in the DCI, it may be specified that the third DAI for the second PDSCH group is not recounted or that the third DAI for the second PDSCH group is recounted.

The third DAI indicates the total number of all scheduled PDSCHs, corresponding to the uplink time unit, in the second PDSCH group.

Alternatively, the downlink time unit includes a first downlink time unit and a second downlink time unit. In the second downlink time unit, the downlink scheduling DCI indicates that the HARQ-ACK sub-codebook indication included in the HARQ-ACK group codebook for the second PDSCH group is 1, the HARQ-ACK sub-codebook indication indicates that the HARQ-ACK group codebook for the second PDSCH group includes one HARQ-ACK sub-codebook, and the HARQ-ACK sub-codebook is a second HARQ-ACK sub-codebook. The HARQ-ACK sub-codebook has 4 bits. The HARQ-ACK sub-codebook corresponds to the CBG-level HARQ-ACK feedback for PDSCHs scheduled by the downlink scheduling DCI in the first downlink time unit.

Alternatively, the determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit, the third DAI being indicative of the total number of PDSCHs to be fed back by both a first HARQ-ACK sub-codebook and a second HARQ-ACK sub-codebook included in the HARQ-ACK group codebook for the second PDSCH group.

In a second aspect, a method for transmitting HARQ-ACK is provided, applied on a transmitting side, including:

transmitting a PDSCH and control signaling to a receiving side, the control signaling including at least one of HARQ-ACK timing information, a first DAI, a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for a transport block (TB) level HARQ-ACK feedback, and the number of bits corresponding to a PDSCH for a code block group (CBG) level HARQ-ACK feedback; and receiving HARQ-ACK information corresponding to an HARQ-ACK codebook transmitted by the receiving side.

In a third aspect, a receiving-side device is provided, including:

a first processing module, configured to receive, in a downlink time unit, a physical downlink shared channel PDSCH and control signaling, which are transmitted by a transmitting side;

a second processing module, configured to determine, according to the control signaling, an uplink time unit configured to feed back HARQ-ACK corresponding to the received PDSCH and an HARQ-ACK codebook corresponding to the uplink time unit, the size of the HARQ-ACK codebook being determined by at least one of a first downlink assignment index (DAI), a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for a transport block (TB) level HARQ-ACK feedback, and the number of bits corresponding to a PDSCH for code block group (CBG) level HARQ-ACK feedback; and a third processing module, configured to transmit HARQ-ACK information corresponding to the HARQ-ACK codebook over a physical uplink control channel (PUCCH) or physical uplink shared channel (PUSCH) in the uplink time unit.

In a fourth aspect, a transmitting-side device is provided, including:

a fourth processing module, configured to transmit a PDSCH and control signaling to a receiving-side device, the control signaling including at least one of HARQ-ACK timing information, a first DAI, a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for a transport block (TB) level HARQ-ACK feedback, and the number of bits corresponding to a PDSCH for code block group (CBG) level HARQ-ACK feedback; and a fifth processing module, configured to receive HARQ-ACK information corresponding to an HARQ-ACK codebook transmitted by the receiving-side device.

In a fifth aspect, the present application provides a receiving-side device, including a processor, a memory and a bus;

the bus is configured to connect the processor and the memory;

the memory is configured to store operating instructions; and the processor is configured to execute the method for transmitting HARQ-ACK in the first aspect of the present application by invoking the operating instructions.

In a sixth aspect, the present application provides a transmitting-side device, including a processor, a memory and a bus;

the bus is configured to connect the processor and the memory;

the memory is configured to store operating instructions; and the processor is configured to execute the method for transmitting HARQ-ACK in the second aspect of the present application by invoking the operating instructions.

The present disclosure is provided to solve at least the above-mentioned problems and provide at least the following advantages.

According to an aspect of the present disclosure, there is provided a method performed by a first transceiver node in a wireless communication system, comprising: receiving first information from a second transceiver node; determining, based on the first information, second information of a first priority and a first time unit in which the second information of the first priority is transmitted; determining, based on the first information, the second information of a second priority and a second time unit in which the second information of the second priority is transmitted; and the second information of the first priority includes Hybrid Automatic Repeat request-Acknowledgement (HARQ-ACK) information of the first priority, when the first time unit conflicts with the second time unit, determining the second information to be transmitted according to HARQ-ACK information of the first priority.

According to an embodiment of the present disclosure, the first information includes data and/or control information, and the data includes at least one of a transport block, a code block group or a code block; and/or the second information includes at least one of data, HARQ-ACK information, Channel State Information (CSI) or Scheduling Request (SR) information.

According to an embodiment of the present disclosure, the first priority is higher than the second priority, or the first priority is equal to the second priority.

According to an embodiment of the present disclosure, determining the second information to be transmitted according to the HARQ-ACK information of the first priority comprises: determining the second message to be transmitted according to whether the number of erroneously decoded data and/or control information contained in the HARQ-ACK information of the first priority is greater than a first threshold or greater than or equal to the first threshold, or according to whether the number of Negative Acknowledgement (NACK) bits in a HARQ-ACK codebook contained in the HARQ-ACK information of the first priority is greater than a second threshold or greater than or equal to the second threshold.

According to an embodiment of the present disclosure, the first threshold is a non-negative integer and the second threshold is a non-negative integer.

According to an embodiment of the present disclosure, when the number of the erroneously decoded data and/or control information contained in the HARQ-ACK information of the first priority is greater than the first threshold or greater than or equal to the first threshold, or the number of the NACK bits in the HARQ-ACK codebook contained in the HARQ-ACK information of the first priority is greater than the second threshold or greater than or equal to the second threshold, determining the second information to be transmitted comprises one of the following ways: determining to transmit the second message of the first priority; and determining to transmit the second information of the first priority and the second information of the second priority simultaneously.

According to an embodiment of the present disclosure, when the number of the erroneously decoded data and/or control information contained in the HARQ-ACK information of the first priority is greater than the first threshold or greater than or equal to the first threshold, or the number of the NACK bits in the HARQ-ACK codebook contained in the HARQ-ACK information of the first priority is greater than the second threshold or greater than or equal to the second threshold, determining the second information to be transmitted comprises one of the following ways: determining to transmit the second information of the second priority; determining to transmit the second information of the first priority and the second information of the second priority simultaneously; and determining to transmit the second information of the second priority and compressed HARQ-ACK information of the first priority simultaneously.

According to an embodiment of the present disclosure, the compressed HARQ-ACK information of the first priority includes one of the following information: 1-bit ACK in a manner of bundling; the number of bits of the codebook of the HARQ-ACK information of the first priority; and the X least significant bits of the number of bits of the codebook of the HARQ-ACK information of the first priority.

According to an embodiment of the present disclosure, the transmitting simultaneously is implemented in a manner of multiplexing, a set of offsets beta-offsets related to the manner of multiplexing is configured by higher layer signaling or specified by a protocol, and an index of the set of beta-offsets is dynamically indicated by Downlink Control Information (DCI).

According to an embodiment of the present disclosure, when determining to transmit the second information of the second priority, the HARQ-ACK information of the first priority is not transmitted, or transmitting the HARQ-ACK information of the first priority is delayed.

According to an embodiment of the present disclosure, the method further comprises: when the first time unit conflicts with the second time unit, determining a time unit in which the second information is transmitted, according to the second information of the first priority, the time unit being the first time unit and/or the second time unit.

According to an embodiment of the present disclosure, at least one of the following is provided in a predetermined manner: a manner of determining the second information to be transmitted, the first threshold or the second threshold, and the predetermined manner includes at least one of: specifying by a protocol, configuring by higher layer signaling, or dynamically indicating by DCI.

According to another aspect of the present disclosure, there is provided a first transceiver node, comprising: a transceiver configured to receive and transmit a signal; and at least one processor coupled to the transceiver and configured to perform the method according to an embodiment of the present disclosure.

According to the present disclosure, when the HARQ-ACK information of the first priority conflicts with uplink data and/or control information, the uplink data and/or control information to be preferentially transmitted is selected according to the HARQ-ACK information of the first priority, so as to ensure effective utilization of the uplink control channel resources.

According to an aspect of the present disclosure, a method performed by a second type of transceiver node in a wireless communication system is provided, comprising: receiving a first type of data and/or a first type of control signaling from a first type of transceiver node; determining a hybrid automatic repeat request-acknowledgement (HARQ-ACK) codebook and a time unit for transmitting the HARQ-ACK codebook based on the first type of data and/or the first type of control signaling; and transmitting the HARQ-ACK codebook to the first type of transceiver node in the determined time unit.

Optionally, the HARQ-ACK codebook is configured, through standard specifications or higher layer signaling, to include HARQ-ACK information for the first type of control signaling indicating a semi-persistent scheduling (SPS) physical downlink shared channel (PDSCH) release.

Optionally, the HARQ-ACK information for the first type of control signaling indicating the SPS PDSCH release is indicated by adding 1 bit after or before the HARQ-ACK codebook.

Optionally, a number of bits of the HARQ-ACK information for the first type of control signaling indicating the SPS PDSCH release is determined, for each serving cell, based on one of the following: standard specifications or higher layer signaling configuration, a number of one or more SPS PDSCH configurations of the serving cell, a number of configurations indicating one or more SPS PDSCH releases of the serving cell, a number of bits of a field indicating a HARQ procedure in the first type of control signaling of the serving cell.

Optionally, the number of bits of the HARQ-ACK information for the first type of control signaling indicating the SPS PDSCH release is configured as Q for each serving cell through higher layer signaling, indicating HARQ-ACK information for most recent Q first type of control signaling indicating SPS PDSCH releases received before the HARQ-ACK codebook is transmitted, wherein the Q is the same or different for various serving cells.

Optionally, the HARQ-ACK information for the first type of control signaling indicating the SPS PDSCH release is located in one of the following positions: after or before HARQ-ACK information for various HARQ procedures of various serving cells, after or before HARQ-ACK information for various HARQ procedures of all serving cells.

Optionally, the HARQ-ACK information for the first type of control signaling indicating the SPS PDSCH release is sorted according to indexes of serving cells and/or indexes of SPS PDSCH configurations.

Optionally, a time interval between a time unit where the first type of control signaling indicating the SPS PDSCH release is received and a time unit determined to transmit the HARQ-ACK codebook including the HARQ-ACK information for the first type of control signaling indicating the SPS PDSCH release are configured through standard specifications or higher layer signaling.

Optionally, the time interval is not greater than X slots or sub-slots or orthogonal frequency division multiplexing (OFDM) symbols, or not less than Y slots or sub-slots or OFDM symbols.

Optionally, a HARQ procedure corresponding to the HARQ-ACK information for the first type of control signaling indicating the SPS PDSCH release is configured through standard specifications or higher layer signaling, or calculated by a formula, and the HARQ-ACK information for the first type of control signaling indicating the SPS PDSCH releases is used to replace HARQ-ACK information for the corresponding HARQ procedure in the HARQ codebook.

Optionally, the second type of transceiver node determines whether to trigger transmission of a HARQ-ACK codebook for all configured HARQ procedures based on a 1-bit indication in the first type of control signaling.

Optionally, in the case where the first type of control signaling is scrambled by a Radio Network Temporary Identity (RNTI) scheduled by dynamic data, the second type of transceiver node determines whether the first type of control signaling schedules a PDSCH at the same time based on a frequency domain resource assignment field in the first type of control signaling.

Optionally, if the frequency domain resource allocation filed indicates a valid frequency domain resource, the second type of transceiver node determines that the first type of control signaling schedules a PDSCH at the same time; if the frequency domain resource assignment field indicates an invalid frequency domain resource, the second type of transceiver node determines that the first type of control signaling does not schedule a PDSCH.

According to an aspect of the present disclosure, a second type of transceiver node in a wireless communication system is provided, comprising: a transceiver configured to receive a first type of data and/or a first type of control signaling from a first type of transceiver node and transmit a HARQ-ACK codebook to the first type of transceiver node in a time unit; a controller configured to control an overall operation of the second type of transceiver node, including: determining the HARQ-ACK codebook and the time unit for transmitting the HARQ-ACK codebook based on the first type of data and/or the first type of control signaling; and controlling the transceiver to transmit the HARQ-ACK codebook to the first type of transceiver node in the determined time unit.

According to an aspect of the present disclosure, a method performed by a first type of transceiver node in a wireless communication system is provided, comprising: transmitting a first type of data and/or a first type of control signaling to a second type of transceiver node; receiving a HARQ-ACK codebook from the second type of transceiver node in a time unit; wherein the HARQ-ACK codebook and the time unit are determined by the second type of transceiver node based on the received first type of data and/or the first type of control signaling.

According to an aspect of the present disclosure, a first type of transceiver node in a wireless communication system is provided, the first type of transceiver node comprising: a transceiver configured to transmit a first type of data and/or a first type of control signaling to a second type of transceiver node, and receive a HARQ-ACK codebook from the second type of transceiver node in a time unit; and a controller configured to control an overall operation of the first type of transceiver node, including: controlling the transceiver to transmit the first type of data and/or the first type of control signaling to the second type of transceiver node and receive the HARQ-ACK codebook from the second type of transceiver node in the time unit; wherein the HARQ-ACK codebook and the time unit are determined by the second type of transceiver node based on the received first type of data and/or the first type of control signaling.

Advantageous Effects of Invention

A physical downlink shared channel PDSCH and control signaling, which are transmitted by a transmitting side, are received in a downlink time unit; according to the control signaling, an uplink time unit configured to feed back HARQ-ACK corresponding to the received PDSCH and an HARQ-ACK codebook corresponding to the uplink time unit are determined; and HARQ-ACK information corresponding to the HARQ-ACK codebook is transmitted on a physical uplink control channel (PUCCH) or physical uplink shared channel (PUSCH) in the uplink time unit. In this way, the determination of an HARQ-ACK codebook corresponding to an uplink time unit is realized, and thus the effective utilization of uplink control channel resources is ensured.

Additional aspects and advantages of the present application will be given in the following description, which will become apparent from the following description or appreciated by implementing the present application.

According to an aspect of the present disclosure, there is provided a method performed by a first transceiver node in a wireless communication system.

According to an aspect of the present disclosure, a method performed by a second type of transceiver node in a wireless communication system is provided

BRIEF DESCRIPTION OF DRAWINGS

In order to more clearly illustrate the technical solutions in the embodiments of the present application, the drawings used in the description of the embodiments of the present application will be briefly described below.

MODE FOR THE INVENTION

Figure 1:
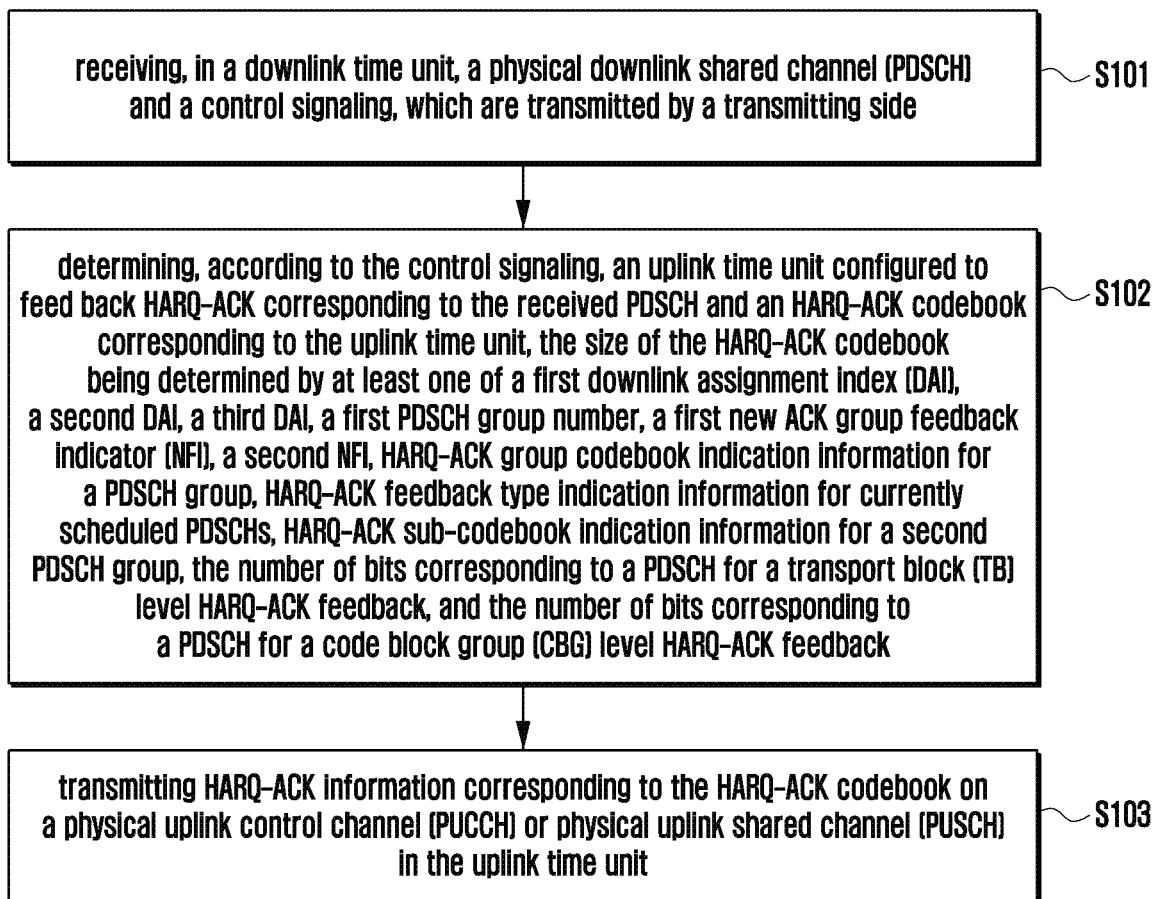
FIG. 1 is a schematic flowchart of a method for transmitting HARQ-ACK according to an embodiment of the present application.

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements there between. In addition, "connected to" or "coupled to" as used herein may include wireless connection or coupling. As used herein, term "and/or" includes all or any of one or more associated listed items or combinations thereof.

To make the objectives, technical solutions and advantages of the present applicant clearer, the implementations of the present application will be further described below in detail with reference to the accompanying drawings.

In the present application, the serial number of messages is merely used to indicate different messages (for example, a first message, a second message or the like are used to distinguish different messages), rather than implying the order of implementing the messages; and the serial number of nodes is merely used to indicate different nodes (for example, a first node, a second node or the like are used to distinguish different nodes), rather than implying the order that the nodes appear in the interaction process.

In the present application, the names or titles of massages are merely illustrative. Other names may be possible.

To make the objectives, technical solutions and advantages of the present applicant clearer, the implementations of the present application will be further described below in detail with reference to the accompanying drawings.

Embodiment 1

This embodiment of the present application provides a method for transmitting HARQ-ACK, applied on a receiving side. The schematic flowchart of this method is as shown in FIG. 1. The method includes:

S101: A physical downlink shared channel PDSCH and control signaling, which are transmitted by a transmitting side, are received in a downlink time unit.

S102: According to the control signaling, an uplink time unit configured to feed back HARQ-ACK corresponding to the received PDSCH and an HARQ-ACK codebook corresponding to the uplink time unit are determined, the size of the HARQ-ACK codebook being determined by at least one of a first downlink assignment index (DAI), a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for TB-level HARQ-ACK feedback, and the number of bits corresponding to a PDSCH for CBG-level HARQ-ACK feedback.

S103: HARQ-ACK information corresponding to the HARQ-ACK codebook is transmitted on a physical uplink control channel (PUCCH) or physical uplink shared channel (PUSCH) in the uplink time unit.

Alternatively, the receiving side is a user equipment (UE) and the transmitting side is a base station.

Alternatively, the transmitting side is a user equipment (UE) and the receiving side is a base station.

Alternatively, the receiving side and the transmitting side may be applied in V2X communication (vehicle to vehicle/infrastructure/pedestrian/network, collectively referred to as V2X).

In this embodiment of the present application, a physical downlink shared channel (PDSCH) and control signaling, which are transmitted by a transmitting side, are received in a downlink time unit; according to the control signaling, an uplink time unit configured to feed back HARQ-ACK corresponding to the received PDSCH and an HARQ-ACK codebook corresponding to the uplink time unit are determined; and HARQ-ACK information corresponding to the HARQ-ACK codebook is transmitted over a physical uplink control channel (PUCCH) or physical uplink shared channel (PUSCH) in the uplink time unit. In this way, the determination of an HARQ-ACK codebook corresponding to an uplink time unit is realized, and thus the effective utilization of uplink control channel resources is ensured.

Alternatively, according to the control signaling, an uplink time unit configured to feed back HARQ-ACK corresponding to the received PDSCH and an HARQ-ACK codebook corresponding to the uplink time unit are determined, the size of the HARQ-ACK codebook being determined by at least one of a first downlink assignment index (DAI), a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for TB-level HARQ-ACK feedback, and the number of bits corresponding to a PDSCH for CBG-level HARQ-ACK feedback.

HARQ-ACK information corresponding to the HARQ-ACK codebook is transmitted on a physical uplink control channel (PUCCH) or physical uplink shared channel (PUSCH) in the uplink time unit.

Alternatively, the HARQ-ACK sub-codebook indication information for a second PDSCH group indicates at least one of the number of HARQ-ACK sub-codebooks for the second PDSCH group and the type of HARQ-ACK sub-codebooks included in the HARQ-ACK group codebooks for the second PDSCH group, the HARQ-ACK sub-codebooks including at least one of a first HARQ-ACK sub-codebook and a second HARQ-ACK sub-codebook.

Alternatively, the determining the HARQ-ACK group codebook for the second PDSCH group includes:

the HARQ-ACK codebook includes at least one of an HARQ-ACK group codebook for a first PDSCH group and an HARQ-ACK group codebook for a second PDSCH group; the HARQ-ACK group codebook for the second PDSCH group includes at least one of a first HARQ-ACK sub-codebook and a second HARQ-ACK sub-codebook; and the number for the second PDSCH group is indicated by a first PDSCH group number in downlink control information DCI configured to schedule a PDSCH in the second PDSCH group.

Alternatively, the determining the HARQ-ACK group codebook for the second PDSCH group includes:

configuring, by a base station and through higher layer signaling that the HARQ-ACK group codebook for the second PDSCH group includes one HARQ-ACK sub-codebook; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the type of the HARQ-ACK sub-codebook included in the HARQ-ACK group codebook for the second PDSCH group, the third DAI being indicative of the total number of PDSCHs to be fed back by the HARQ-ACK sub-codebook.

Alternatively, the determining the HARQ-ACK group codebook for the second PDSCH group includes:

configuring, by the base station and through higher layer signaling that the HARQ-ACK group codebook for the second PDSCH group includes one HARQ-ACK sub-codebook or two HARQ-ACK sub-codebooks; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the number of HARQ-ACK sub-codebooks for the second PDSCH group, the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by a first HARQ-ACK sub-codebook included in the HARQ-ACK group codebook for the second PDSCH group and the total number of PDSCHs to be fed back by a second HARQ-ACK sub-codebook included in the HARQ-ACK group codebook for the second PDSCH group.

Alternatively, the third DAI may be divided into two parts. The third DAI may have 4 bits. The first part of the third DAI (for example, the first 2 bits of the 4 bits of the third DAI) indicates the total number of PDSCHs to be fed back by the first HARQ-ACK sub-codebook included in the HARQ-ACK group codebook for the second PDSCH group, and the second part of the third DAI (for example, the last 2 bits of the 4 bits of the third DAI) indicates the total number of PDSCHs to be fed back by the second HARQ-ACK sub-codebook included in the HARQ-ACK group codebook for the second PDSCH group; or, the second part of the third DAI (for example, the last 2 bits of the 4 bits of the third DAI) indicates the total number of PDSCHs to be fed back by the second HARQ-ACK sub-codebook included in the HARQ-ACK group codebook for the second PDSCH group, and the first part of the third DAI (for example, the first 2 bits of the 4 bits of the third DAI) indicates the total number of PDSCHs to be fed back by the first HARQ-ACK sub-codebook included in the HARQ-ACK group codebook for the second PDSCH group; or, the first part of the third DAI (for example, the first 2 bits of the 4 bits of the third DAI) indicates the total number of PDSCHs to be fed back by the second HARQ-ACK sub-codebook, and the second part of the third DAI (for example, the last 2 bits of the 4 bits of the third DAI) indicates the total number of PDSCHs to be fed back by the first HARQ-ACK sub-codebook.

Alternatively, the determining the HARQ-ACK group codebook for the second PDSCH group includes:

configuring, by the base station and through higher layer signaling that the HARQ-ACK group codebook for the second PDSCH group may include zero HARQ-ACK sub-codebook (or, no HARQ-ACK sub-codebook), one first HARQ-ACK sub-codebook (or, one HARQ-ACK sub-codebook and this HARQ-ACK sub-codebook is the first HARQ-ACK sub-codebook), one second HARQ-ACK sub-codebook (or, one HARQ-ACK sub-codebook and this HARQ-ACK sub-codebook is the second HARQ-ACK sub-codebook) or two HARQ-ACK sub-codebooks; and configuring, by the base station and through higher layer signaling that the HARQ-ACK sub-codebook indication information for the second PDSCH group in the DCI is 2 bits, the HARQ-ACK sub-codebook indication information for the second PDSCH group being indicative of the number and type of HARQ-ACK sub-codebooks for the second PDSCH group, the third DAI being indicative of the total number of PDSCHs to be fed back by one or two HARQ-ACK sub-codebooks included in the HARQ-ACK group codebook for the second PDSCH group, and when there is one HARQ-ACK sub-codebook, the type of the HARQ-ACK sub-codebook being determined by the HARQ-ACK feedback type indication information for the currently scheduled PDSCHs.

Alternatively, joint coding may be used for the HARQ-ACK group codebook indication information for a PDSCH group and the HARQ-ACK sub-codebook indication information for a second PDSCH group. 2 bits may be used to indicate that the HARQ-ACK group codebook for the second PDSCH group may include zero HARQ-ACK sub-codebook (or, no HARQ-ACK sub-codebook), one first HARQ-ACK sub-codebook (or, one HARQ-ACK sub-codebook and this HARQ-ACK sub-codebook is a first HARQ-ACK sub-codebook), one second HARQ-ACK sub-codebook (or, one HARQ-ACK sub-codebook and this HARQ-ACK sub-codebook is a second HARQ-ACK sub-codebook) or two HARQ-ACK sub-codebooks.

Alternatively, the HARQ-ACK codebook includes at least one of an HARQ-ACK group codebook for a first PDSCH group and an HARQ-ACK group codebook for a second PDSCH group; and whether the HARQ-ACK codebook includes the HARQ-ACK group codebook for the PDSCH group is determined by the HARQ-ACK group codebook indication information for the PDSCH group.

Alternatively, one HARQ-ACK codebook includes one or more HARQ-ACK group codebooks for the PDSCH group. The number of HARQ-ACK group codebooks for the PDSCH group, included in one HARQ-ACK codebook, is determined by the HARQ-ACK group codebook indication information for the PDSCH group.

Alternatively, one HARQ-ACK group codebook for the PDSCH group may include one or more HARQ-ACK sub-codebooks. An HARQ-ACK sub-codebook may be a first HARQ-ACK sub-codebook, or may be a second HARQ-ACK sub-codebook. The first HARQ-ACK sub-codebook is an HARQ-ACK sub-codebook for TB-level HARQ-ACK feedback. The second HARQ-ACK sub-codebook is an HARQ-ACK sub-codebook for CBG-level HARQ-ACK feedback. When one HARQ-ACK group codebook for the PDSCH group includes two HARQ-ACK sub-codebooks, the first HARQ-ACK sub-codebook is ahead of the second HARQ-ACK sub-codebook.

Alternatively, the order, in the HARQ-ACK codebook, of one HARQ-ACK group codebook for the PDSCH group is determined by the PDSCH group number and the type of the PDSCH group. The type of the PDSCH group indicates whether the PDSCH group is a first PDSCH group or a second PDSCH group.

Alternatively, the number of HARQ-ACK sub-codebooks included in the HARQ-ACK group codebook for the first PDSCH group is determined by the feedback type for all PDSCHs, for which the feedback of HARQ-ACK is required, in the first PDSCH group. The feedback type for a PDSCH is CBG-level HARQ-ACK feedback or TB-level HARQ-ACK feedback.

Alternatively, the number of HARQ-ACK sub-codebooks included in the HARQ-ACK group code for the second PDSCH group is determined by at least one of the HARQ-ACK sub-codebook indication information for the second PDSCH group, the feedback type for PDSCHs, for which the feedback of HARQ-ACK is required, in the second PDSCH group, and the feedback type for the currently scheduled PDSCHs.

Alternatively, the size and order of the HARQ-ACK sub-codebooks for the first PDSCH group are determined by at least one of the first DAI, the second DAI, the first NFI, and the HARQ-ACK feedback type for PDSCHs. The HARQ-ACK feedback type for PDSCHs indicates whether the feedback for the PDSCH is TB-level HARQ-ACK feedback or CBG-level HARQ-ACK feedback.

Alternatively, the size and order of the HARQ-ACK sub-codebooks for the second PDSCH group are determined by at least one of the first DAI, the second DAI, the third DAI, the first NFI, the second NFI, the HARQ-ACK feedback type indication information for the currently scheduled PDSCH, and the HARQ-ACK sub-codebook indication information for the second PDSCH group.

Alternatively, the HARQ-ACK sub-codebook indication information for the second PDSCH group indicates at least one of the numbers of HARQ-ACK sub-codebooks for the second PDSCH group and the type of HARQ-ACK sub-codebooks included in the HARQ-ACK group codebook for the second PDSCH group. The HARQ-ACK sub-codebooks include at least one of a first HARQ-ACK sub-codebook and a second HARQ-ACK sub-codebook.

Alternatively, the currently scheduled PDSCHs are divided into groups. The first PDSCH group is a PDSCH group in which the currently scheduled PDSCHs are included. The first PDSCH group number is indicated by the first PDSCH group number in the DCI configured to schedule PDSCHs currently. The first PDSCH group and the second PDSCH group may be numbered uniformly. The second PDSCH group number is different from the first PDSCH group number in the DCI configured to schedule PDSCHs currently. For example, when the HARQ-ACK codebook includes an HARQ-ACK group codebook for the first PDSCH group and an HARQ-ACK group codebook for the second PDSCH group, the first PDSCH group number in the DCI configured to schedule PDSCHs currently may be indicated by 1 bit, and when the first PDSCH group number is 0, the second PDSCH group number is 1; and when the first PDSCH group number is 1, the second PDSCH group number is 0. In the DCI configured to schedule PDSCHs currently, no PDSCH in the second PDSCH group is scheduled. The second PDSCH group number may also be indicated by the HARQ-ACK group codebook indication information for the PDSCH group.

Alternatively, the HARQ-ACK group codebook for the PDSCH group indicates whether to provide feedback for the HARQ-ACK group codebook for the second PDSCH group. The HARQ-ACK group codebook indication information for the PDSCH group may indicate the number of HARQ-ACK group codebooks. For example, 1 bit may be used to indicate that there is one or two HARQ-ACK group codebooks. 0 may be used to indicate that there is one HARQ-ACK group codebook, and 1 may be used to indicate that there are two HARQ-ACK group codebooks; or, 1 may be used to indicate that there is one HARQ-ACK group codebook, and 0 may be used to indicate that there are two HARQ-ACK group codebooks. The HARQ-ACK group codebook indication information for the PDSCH group may also indicate the group number of the second HARQ-ACK group codebook. When the group number of the second HARQ-ACK group codebook is different from the number of the first HARQ-ACK group codebook, HARQ-ACK feedback is provided for the second HARQ-ACK group codebook, and when the group number of the second HARQ-ACK group codebook is the same as the number of the first HARQ-ACK group codebook, HARQ-ACK feedback is not provided for the second HARQ-ACK group codebook. The HARQ-ACK group codebook indication information for the PDSCH group may also indicate whether to provide feedback for the second HARQ-ACK group codebook. For example, 1 bit may be used for indication. 0 may be used to indicate to provide HARQ-ACK feedback for the second HARQ-ACK group codebook, and 1 may be used to indicate not to provide HARQ-ACK feedback for the second HARQ-ACK group codebook; or, 1 may be used to indicate to provide HARQ-ACK feedback for the second HARQ-ACK group codebook, and 0 may be used to indicate not to provide HARQ-ACK feedback for the second HARQ-ACK group codebook.

Alternatively, the order, in the HARQ-ACK codebook, of a HARQ-ACK group codebook for a PDSCH group may be determined by the type of the PDSCH group. For example, the HARQ-ACK group codebook for the first PDSCH group is ahead of (or behind) the HARQ-ACK group codebook for the second PDSCH group.

Alternatively, the order, in the HARQ-ACK codebook, of a HARQ-ACK group codebook for a PDSCH group may be determined by the PDSCH group number. For example, the HARQ-ACK group codebook for a PDSCH group numbered by 0 is ahead of (or behind) the HARQ-ACK group codebook for a PDSCH group numbered by 1.

Alternatively, the type of HARQ-ACK sub-codebooks included in the HARQ-ACK group codebook for the first PDSCH group is determined by the feedback type for all PDSCHs, for which the feedback of HARQ-ACK is required, in the first PDSCH group. Specifically, when the feedback type for all PDSCHs, for which the feedback of HARQ-ACK is required, in the first PDSCH group is TB-level HARQ-ACK feedback, the HARQ-ACK group codebook for the first PDSCH group includes only the first HARQ-ACK sub-codebook; when the feedback type for all PDSCHs, for which the feedback of HARQ-ACK is required, in the first PDSCH group is CBG-level HARQ-ACK feedback, the HARQ-ACK group codebook for the first PDSCH group includes only the second HARQ-ACK sub-codebook; when the feedback type for all PDSCHs, for which the feedback of HARQ-ACK is required, in the first PDSCH group includes both the TB-level HARQ-ACK feedback and the CBG-level HARQ-ACK feedback, the HARQ-ACK group codebook for the first PDSCH group includes both the first HARQ-ACK sub-codebook and the second HARQ-ACK sub-codebook.

Alternatively, the control signaling may further include at least one of the first DAI, the second DAI, the third DAI, the first PDSCH group number, the first NFI, the second NFI, the HARQ-ACK feedback type indication information for currently scheduled PDSCHs, the HARQ-ACK sub-codebook indication information for a PDSCH group, and the HARQ-ACK sub-codebook indication information for a second PDSCH group. The DAIs are numbered in PDSCHs, for which HARQ-ACK is fed back, in a same PDSCH group.

Alternatively, the first DAI indicates the following information: the relative order of currently scheduled PDSCHS in a downlink time unit and all scheduled PDSCHs in the downlink time unit corresponding to the uplink time unit, and the bit position of the HARQ-ACK bits for currently scheduled PDSCHs in the downlink time unit in the HARQ-ACK sub-codebook in the HARQ-ACK group codebook.

Alternatively, the second DAI indicates the total number of all scheduled PDSCHs, corresponding to the uplink time unit, in the first PDSCH group.

The first NFI indicates whether the first DAI and/or the second DAI for the first PDSCH group are recounted. 1 bit may be used to indicate it. When the first NFI received in the current downlink time unit is the same as the first NFI received in the previous downlink time unit, the first DAI and/or the second DAI is not recounted; and when the first NFI received in the current downlink time unit is different from the first NFI received in the previous downlink time unit, the first DAI and/or the second DAI are recounted. For example, when the first NFI received in a first current downlink time unit is 0, if the first NFI received in a second previous downlink time unit is 0, the first DAI and/or the second DAI received in the second downlink time unit is not recounted; and if the first NFI received in a second previous downlink time unit is 1, the first DAI and/or the second DAI received in the second downlink time unit are recounted.

The second NFI indicates whether the third DAI for the second PDSCH group is recounted. The principle of the second NFI is the same as that of the first NFI. By judging whether the second NFI received in the current downlink time unit is the same as the first NFI received in the previous downlink time unit in which a PDSCH in the second PDSCH group is scheduled, it is determined whether the third DAI is recounted.

Alternatively, if there is no second NFI in the DCI, it may be specified that the third DAI for the second PDSCH group is not recounted or that the third DAI for the second PDSCH group is recounted.

Alternatively, when multiple DCIs may be transmitted (or received) in one downlink time unit to indicate the first NFI and/or second NFI, NFIs may be ordered in the following way: when multiple DCIs may be transmitted (or received) in a same downlink time unit to indicate the first NFI and/or second NFI, the NFIs for a same PDSCH group may be ordered according to the carrier number, in the order from the smallest to the largest. For example, the NFI for a PDSCH group 0, for which carrier 0 transmitted (and/or received) in the downlink time unit 1, is ahead of the NFI for a PDSCH group 0, for which carrier 1 is transmitted (and/or received) in the downlink time unit 1. Here, NFI may be the first NFI and/or the second NFI. The NFI for a PDSCH group 0, for which carrier 0 is transmitted (and/or received) in the downlink time unit 2, is behind the NFI for a PDSCH group 0, for which carrier 1 is received in the downlink time unit 1.

Alternatively, when multiple DCIs may be transmitted (or received) in a same downlink time unit to indicate the first NFI and/or second NFI, the NFIs for a same PDSCH group may be ordered according to the carrier number, in the order from the largest to the smallest.

Alternatively, when multiple DCIs may be transmitted (or received) in a same carrier in one downlink time unit to indicate the first NFI and/or second NFI, NFIs may be ordered in the following way: when multiple DCIs may be transmitted (or received) in a same carrier in a same downlink time unit to indicate the first NFI and/or second NFI, the NFIs for a same PDSCH group may be ordered according to the transmission reception point TRP number, in the order from the smallest to the largest (or in the order from the largest to the smallest); and the NFIs for a same PDSCH group may also be ordered according to the control-resource set CORESET number associated with the TRP, in the order from the smallest to the largest (or in the order from the largest to the smallest).

The third DAI indicates the total number of all scheduled PDSCHs, corresponding to the uplink time unit, in the second PDSCH group.

Alternatively, the downlink time unit includes a first downlink time unit and a second downlink time unit. In the second downlink time unit, the downlink scheduling DCI indicates that there is one HARQ-ACK sub-codebook indication included in the HARQ-ACK group codebook for the second PDSCH group, the HARQ-ACK sub-codebook indication indicates that the HARQ-ACK group codebook for the second PDSCH group includes one HARQ-ACK sub-codebook, and the HARQ-ACK sub-codebook is a second HARQ-ACK sub-codebook. The HARQ-ACK sub-codebook has 4 bits. The HARQ-ACK sub-codebook corresponds to the CBG-level HARQ-ACK feedback for PDSCHs scheduled by the downlink scheduling DCI in the first downlink time unit.

Alternatively, the determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit, the third DAI being indicative of the total number of PDSCHs to be fed back by both a first HARQ-ACK sub-codebook and a second HARQ-ACK sub-codebook included in the HARQ-ACK group codebook for the second PDSCH group.

Figure 2:
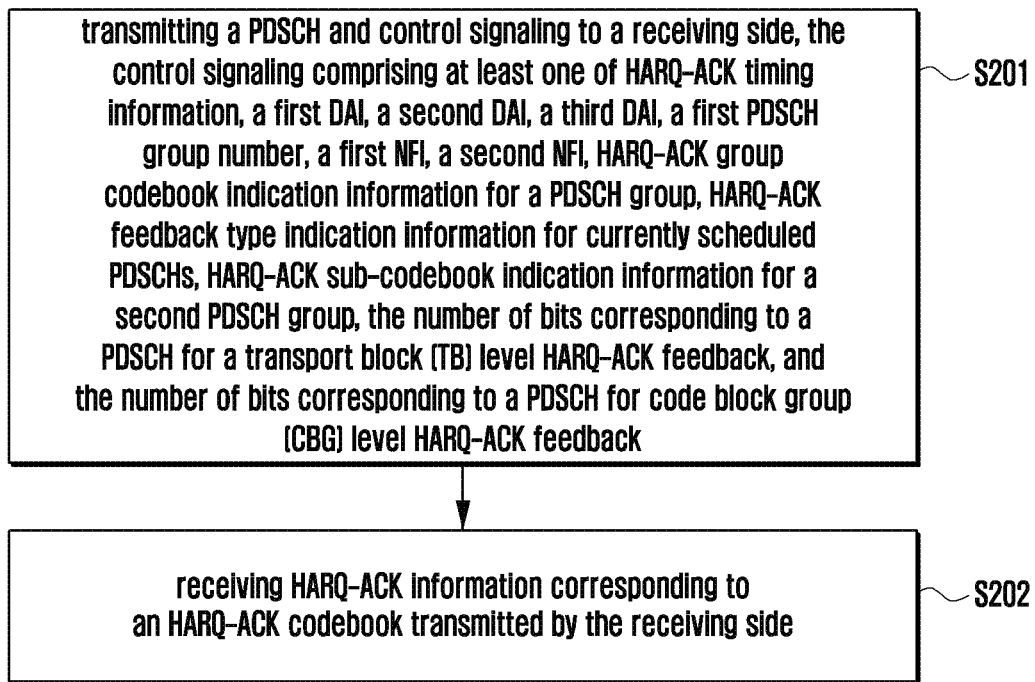
FIG. 2 is a schematic flowchart of another method for transmitting HARQ-ACK according to an embodiment of the present application.

This embodiment of the present application provides another method for transmitting HARQ-ACK, applied on a transmitting side. The schematic flowchart of this method is as shown in FIG. 2. The method includes:

S201: A PDSCH and control signaling are transmitted to a receiving side, the control signaling including at least one of HARQ-ACK timing information, a first DAI, a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for TB-level HARQ-ACK feedback, and the number of bits corresponding to a PDSCH for CBG-level HARQ-ACK feedback.

S202: HARQ-ACK information corresponding to an HARQ-ACK codebook transmitted by the receiving side is received.

In this embodiment of the present application, the determination of an HARQ-ACK codebook corresponding to an uplink time unit is realized, and thus the effective utilization of uplink control channel resources is ensured.

The method for transmitting HARQ-ACK in this embodiment of the present application will be described in detail by the following embodiments.

As shown in FIG. 1, in the S101, a physical downlink shared channel PDSCH and control signaling, which are transmitted by a transmitting side, are received in a downlink time unit.

Alternatively, here, the control signaling is a downlink scheduling signaling borne by a PDCCH or control signaling borne by a PDSCH. The control signal may include information about HARQ-ACK timing.

Alternatively, the information about HARQ-ACK timing may be indicated by a dynamic signaling or a semi-persistent signaling.

Alternatively, the UE may semi-persistently or dynamically determine the size of the HARQ-ACK codebook, according to the configuration of the base station.

Alternatively, the first DAI indicates the number of PDSCHs in the first PDSCH group. It is assumed that the HARQ-ACK bit number for PDSCHs in each downlink time unit is N0 and there is only one PDSCH group, then it is determined, according to the value X0 of the first DAI, that the HARQ-ACK bits for the downlink time unit start from the (X0*N0−1)th bit in the HARQ-ACK sub-codebook in the HARQ-ACK group codebook. For example, if N0=2, the first DAI=1 indicates that there is one PDSCH which has 2 bits. The HARQ-ACK bits for this PDSCH correspond to the first and second bits in the HARQ-ACK sub-codebook in the HARQ-ACK group codebook. Similarly, if the first DAI=4, the HARQ-ACK bits correspond to the seventh and eighth bits in the HARQ-ACK sub-codebook in the HARQ-ACK group codebook. Therefore, the UE may determine the size of the HARQ-ACK sub-codebook in the HARQ-ACK group codebook, based on the first DAI.

Alternatively, in some scenario, the HARQ-ACK bit number N0 for PDSCHs in each downlink time unit may be different. For example, for different carriers, N0 is different since different transmission modes are used. The different transmission modes may include: a transmission mode in which whether a single transport block (TB) or multiple TBs is supported; a transmission mode in which a TB is used as the HARQ-ACK feedback granularity (that is, one TB feeds back 1-bit HARQ-ACK) or a CBG is used as the feedback granularity (that is, one TB feeds back N-bit HARQ-ACK, where N is the number of the configured CBGs); and a transmission mode in which a CBG is used as the feedback granularity but the number of the configured CBGs is different. The transmission mode may be limited to only a semi-persistently configured transmission mode. Or, the transmission modes may include both a semi-persistently configured transmission mode and a dynamically changing transmission mode. For another example, for a same carrier, in different time units, N0 may be different since different transmission modes are used. For example, although the semi-persistently configured transmission mode is a transmission mode using a CBG as the feedback granularity, the base station can dynamically schedule the user terminal to go back to a transmission mode using a TB as the feedback granularity. Or, according to the scheduling requirements, for example small TB size, the number of HARQ-ACK bits fed back by the user terminal may be less than the number of the configured CBGs. Therefore, N0 dynamically changes.

Alternatively, when the HARQ-ACK for PDSCHs in each downlink time unit may be CBG-level HARQ-ACK feedback or TB-level HARQ-ACK feedback, the first DAI for the TB-level HARQ-ACK feedback and the CBG-level feedback may be counted, respectively. For example, when there is only one PDSCH group, the first downlink time unit is HARQ-ACK based on CBG-level feedback, N0=4, the first DAI=1 indicates that there is one PDSCH for CBG-level feedback. The second downlink time unit is HARQ-ACK based on TB-level HARQ-ACK feedback, N0=1. The first DAI=1 indicates that there is one PDSCH for TB-level HARQ-ACK feedback. In this case, the HARQ-ACK codebook includes only one HARQ-ACK group codebook for the PDSCH group. This HARQ-ACK group codebook includes two HARQ-ACK sub-codebooks. The first HARQ-ACK sub-codebook has 1 bit, and the second HARQ-ACK sub-codebook has 4 bits.

Alternatively, the second DAI indicates the total number of all scheduled PDSCHs, corresponding to the uplink time unit, in the first PDSCH group.

Alternatively, similarly to the first DAI, the size of the HARQ-ACK sub-codebook may be determined by the second DAI and the number N0 of HARQ-ACK bits for PDSCHs in each downlink time unit.

The third DAI indicates the total number of all scheduled PDSCHs, corresponding to the uplink time unit, in the second PDSCH group.

It is to be noted that, when the semi-persistent scheduling SPS PDSCHs are released by DCIs, the first DAI, and/or the second DAI, and/or the third DAI may include the count of SPS PDSCH release DCIs. The number and/or total number of PDSCHs indicated by the first DAI, and/or the second DAI, and/or the third DAI may include the count of SPS PDSCH release DCIs.

Alternatively, the first DAI and/or the second DAI and/or the third DAI has finite number of bits, for example, 2 bits. However, by the modulo operation, they can represent a value greater than 4. For example, the number M of downlink time units corresponding to HARQ-ACK feedback in a same uplink time unit is greater than the range indicated by the bits of the DAI. For example, when the DAI has only 2 bits, then, in the DCI, the DAI indicated by 00 may indicate that the value of the DAI is 1, or that the value of the DAI is 5 or 9.

Optionally, the HARQ-ACK codebook in a same uplink time unit includes an HARQ-ACK group codebook for the first PDSCH group and an HARQ-ACK group codebook for the second PDSCH group, and the HARQ-ACK group codebook for the second PDSCH group may include a first HARQ-ACK sub-codebook and/or a second HARQ-ACK sub-codebook. In this case, it is necessary to determine whether the third DAI is a DAI for the first HARQ-ACK sub-codebook and/or the second HARQ-ACK sub-codebook.

Figure 3:
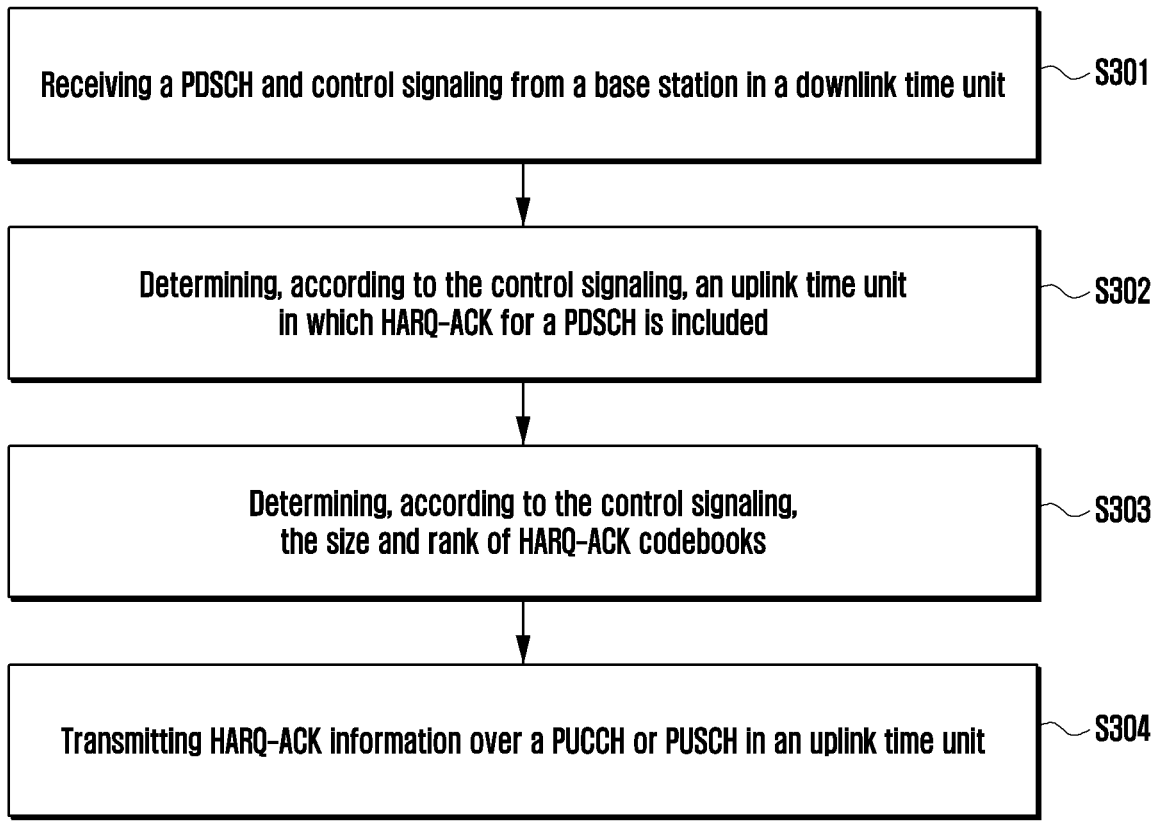
FIG. 3 is a schematic flowchart of still another method for transmitting HARQ-ACK according to an embodiment of the present application.

This embodiment of the present application provides still another method for transmitting HARQ-ACK, applied on a UE. The schematic flowchart of this method is as shown in FIG. 3. The method includes:

S301: A PDSCH and control signaling are received from a base station in a downlink time unit.

S302: According to the control signaling, an uplink time unit in which HARQ-ACK for a PDSCH is included is determined.

S303: According to the control signaling, the size and order of HARQ-ACK codebooks are determined.

Alternatively, according to the control signaling, the number of a first PDSCH group including the PDSCH is determined, to determine whether the PDSCH corresponds to TB-level HARQ-ACK feedback or CBG-level HARQ-ACK feedback. The type of HARQ-ACK sub-codebooks included in the first HARQ-ACK group codebook is determined.

Alternatively, the size and order of the first HARQ-ACK sub-codebooks in the first HARQ-ACK group codebook are determined according to the first DAI, and/or the second DAI, and/or the first NFI, and/or the first PDSCH group number, and/or the number of bits corresponding to PDSCHs for TB-level HARQ-ACK feedback in the DCIs configured to schedule PDSCHs for HARQ-ACK feedback in a same uplink time unit. The number of bits corresponding to PDSCHs for TB-level HARQ-ACK feedback may be determined according to higher layer signaling.

Alternatively, the size and order of the second HARQ-ACK sub-codebooks in the first HARQ-ACK group codebook are determined according to the first DAI, and/or the second DAI, and/or the first NFI, and/or the first PDSCH group number, and/or the number of bits corresponding to PDSCHs for CBG-level HARQ-ACK feedback in the DCIs configured to schedule PDSCHs for HARQ-ACK feedback in a same uplink time unit. The number of bits corresponding to PDSCHs for CBG-level HARQ-ACK feedback may be determined according to higher layer signaling.

Alternatively, the order of the HARQ-ACK sub-codebooks in the first HARQ-ACK group codebook is determined.

Alternatively, the type of HARQ-ACK sub-codebooks included in the second HARQ-ACK group codebook is determined according to at least one of the HARQ-ACK group codebook indication information for the PDSCH group, the HARQ-ACK feedback type indication information for currently scheduled PDSCHs, and the HARQ-ACK sub-codebook indication information for the second PDSCH group.

Alternatively, the size and order of the first HARQ-ACK sub-codebooks in the second HARQ-ACK group codebook are determined according to the first DAI, and/or the second DAI, and/or the third DAI, and/or the first NFI, and/or the second NFI, and/or the first PDSCH group number, and/or the number of bits corresponding to PDSCHs for TB-level HARQ-ACK feedback in the DCIs configured to schedule PDSCHs for HARQ-ACK feedback in a same uplink time unit.

Alternatively, the size and order of the second HARQ-ACK sub-codebooks in the second HARQ-ACK group codebook are determined according to the first DAI, and/or the second DAI, and/or the third DAI, and/or the first NFI, and/or the second NFI, and/or the first PDSCH group number, and/or the number of bits corresponding to PDSCHs for CBG-level HARQ-ACK feedback in the DCIs configured to schedule PDSCHs for HARQ-ACK feedback in a same uplink time unit.

Alternatively, the order of the HARQ-ACK sub-codebooks in the second HARQ-ACK group codebook is determined.

Alternatively, the order of the HARQ-ACK group codebooks is determined according to the group number information of PDSCHs for HARQ-ACK feedback and/or the group type of the PDSCHs.

S304: The HARQ-ACK information is transmitted over a PUCCH or PUSCH in an uplink time unit.

The order for implementing the S302 and the S303 is not limited.

In the S303, the determination of the second HARQ-ACK group codebook may be implemented by one of at least following five methods.

Method 1

It is configured by higher layer signaling that the second PDSCH group includes only one HARQ-ACK sub-codebook. The HARQ-ACK sub-codebook indication information for the second PDSCH in the downlink control information DCI is 1 bit. The HARQ-ACK sub-codebook indication information indicates the type of the HARQ-ACK sub-codebook for the second PDSCH group (for example, 0 indicates the first HARQ-ACK sub-codebook and 1 indicates the second HARQ-ACK sub-codebook; or, 1 indicates the first HARQ-ACK sub-codebook and 0 indicates the second HARQ-ACK sub-codebook). The third downlink assignment index (DAI) has 2 bits, and indicates the total number of PDSCHs to be fed back by the HARQ-ACK sub-codebooks for the second PDSCH group.

Figure 4:
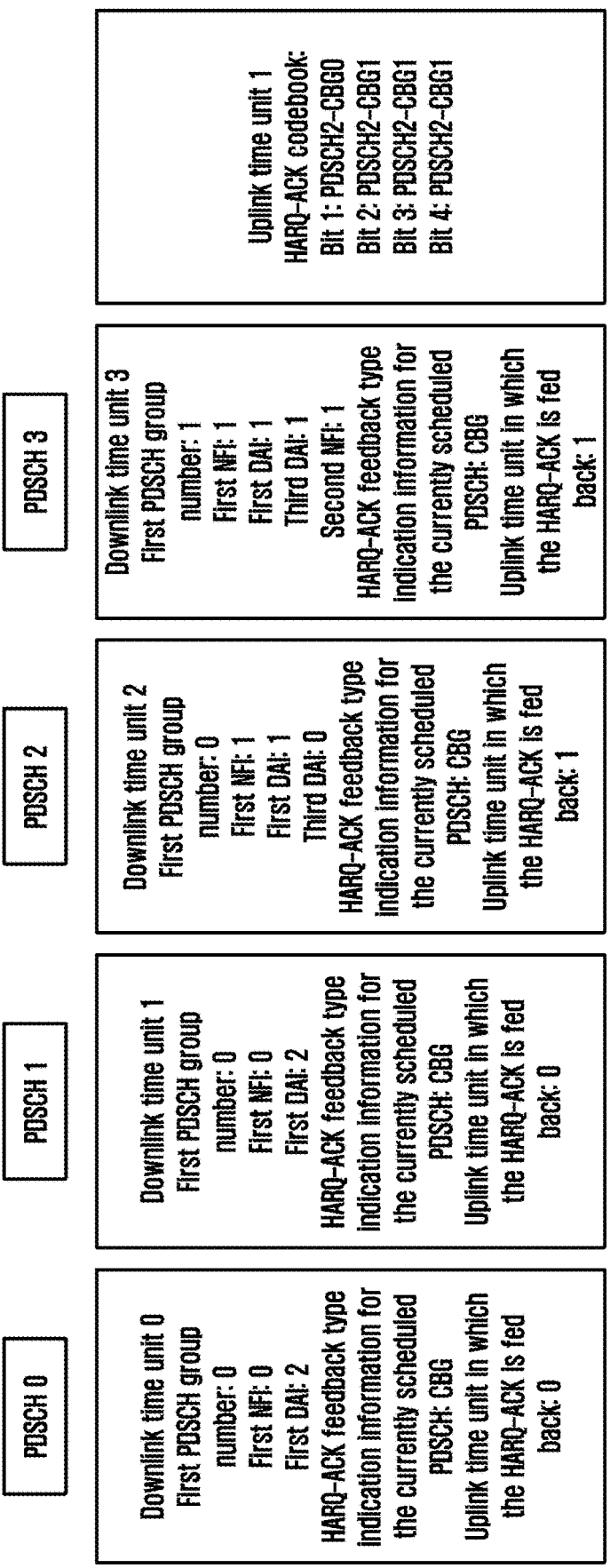
FIG. 4 is a schematic view of specific scheduling by a base station according to an embodiment of the present application.

Alternatively, the specific scheduling of the base station is shown in FIG. 4.

When there are two PDSCH groups, PDSCH2 is scheduled in the downlink time unit 2. The downlink scheduling DCI indicates that the first PDSCH group number is 0 and the group number of the scheduled PDSCH is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1 and the first NFI is 1.PDSCH0 is scheduled in the downlink time unit 0. The downlink scheduling DCI indicates that the first PDSCH group number is 0 and the first NFI is 0. The HARQ-ACK feedback type indication information for the currently scheduled PDSCH indicates that the PDSCH is CBG-level HARQ-ACK feedback. Compared with the first NFI in the downlink time unit 0, the first NFI in the downlink time unit 2 is inverted. This indicates that the first DAI is recounted and that the DCI schedules one PDSCH for CBG-level HARQ-ACK feedback. Then, the PDSCH group 0 is the first PDSCH group and the PDSCH group 1 is the second PDSCH group.

PDSCH3 is scheduled in the downlink time unit 3. The downlink scheduling DCI indicates that the first PDSCH group number is 1 and the group number of the scheduled PDSCH is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1 and the first NFI is 1. PDSCH1 is scheduled in the downlink time unit 1. The downlink scheduling DCI indicates that the first PDSCH group number is 1 and the first NFI is 0. The HARQ-ACK feedback type indication information for the currently scheduled PDSCH indicates that the PDSCH is TB-level HARQ-ACK feedback. Compared with the first NFI in the downlink time unit 1, the first NFI in the downlink time unit 3 is inverted. This indicates that the first DAI is recounted and that the DCI schedules one PDSCH for TB-level HARQ-ACK feedback. Then, the PDSCH group 1 is the first PDSCH group and the PDSCH group 0 is the second PDSCH group.

In the downlink time unit 3, the downlink scheduling DCI indicates that the HARQ-ACK sub-codebook indication for the second PDSCH group is 1, the HARQ-ACK group codebook for the second PDSCH group includes only one HARQ-ACK sub-codebook, and this HARQ-ACK sub-codebook is the second HARQ-ACK sub-codebook. The third DAI is 1; and compared with the first NFI in the downlink time unit 2, the second NFI is not inverted, which indicates that there is one PDSCH for CBG-level HARQ-ACK feedback. The HARQ-ACK sub-codebook included in the HARQ-ACK group codebook for the second PDSCH group has 4 bits, which correspond to the CBG-level HARQ-ACK feedback for the PDSCH scheduled by the downlink scheduling DCI in the downlink time unit 2.

The UE determines, according to the downlink scheduling DCIs in the downlink time unit 2 and the downlink time unit 3, that the uplink time unit in which the HARQ-ACK codebook is transmitted is the uplink time unit 1. The positions, in the HARQ-ACK codebook, of the HARQ-ACK group codebook for the first PDSCH group and the HARQ-ACK group codebook for the second PDSCH group in the HARQ-ACK codebook are determined by predefined rules. For example, the HARQ-ACK group codebook for the first PDSCH group is ahead of the HARQ-ACK group codebook for the second PDSCH group. The number of bits for the HARQ-ACK codebook is 5.

The HARQ-ACK group codebook for the first PDSCH group has 1 bit, includes only HARQ-ACK for which the first HARQ-ACK sub-codebook is PDSCH3, and is located at bit 0 in the HARQ-ACK codebook.

The HARQ-ACK group codebook for the second PDSCH group has 4 bits, includes only HARQ-ACK for which the second HARQ-ACK sub-codebook is PDSCH2, and is located at bits 1-4 in the HARQ-ACK codebook.

Compared with the existing solutions, this method can dynamically indicate the type of the HARQ-ACK sub-codebook included in the second HARQ-ACK group codebook. The flexibility of scheduling is improved. Meanwhile, the consistency of understanding by the base station and the UE is ensured, and the reliability of the HARQ-ACK codebook is improved.

Method 2

It is configured by higher layer signaling that the second PDSCH group may include one HARQ-ACK sub-codebook or two HARQ-ACK sub-codebooks. The HARQ-ACK sub-codebook indication information for the second PDSCH in the DCI is 1 bit. The HARQ-ACK sub-codebook indication information indicates the number of HARQ-ACK sub-codebooks for the second PDSCH group. For example, 0 indicates that there is one HARQ-ACK sub-codebook and 1 indicates that there are two HARQ-ACK sub-codebooks (or, 1 indicates that there is one HARQ-ACK sub-codebook and 0 indicates that there are two HARQ-ACK sub-codebooks). The third DAI field has 2 bits, and indicates the total number of PDSCHs to be fed back by one HARQ-ACK sub-codebook for the second PDSCH group. The type of this HARQ-ACK sub-codebook is determined by the HARQ-ACK feedback type indication information for the currently scheduled PDSCH. It may be stipulated that the type of this HARQ-ACK sub-codebook is the same as the HARQ-ACK feedback type for the currently scheduled PDSCH, or that the type of this HARQ-ACK sub-codebook is different from the HARQ-ACK feedback type for the currently scheduled PDSCH. In this embodiment, it is stipulated that the type of this HARQ-ACK sub-codebook is the same as the HARQ-ACK feedback type for the currently scheduled PDSCH.

When there are two PDSCH groups, PDSCH1 is scheduled in the downlink time unit 1 to be fed back in the uplink time unit 1. The downlink scheduling DCI indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 4. The first DAI is 1; and the first NFI is inverted, which indicates that there is one PDSCH for TB-level HARQ-ACK feedback. Then, the PDSCH group 0 is the first PDSCH group and the PDSCH group 1 is the second PDSCH group.

PDSCH2 is scheduled in the downlink time unit 2 to be fed back in the uplink time unit 1. The downlink scheduling DCI indicates that the first PDSCH group number is 1, the group number of the scheduled PDSCH is 1, and the PDSCH is TB-level HARQ-ACK feedback. The first DAI is 1; and the first NFI is inverted, which indicates that there is one PDSCH for TB-level HARQ-ACK feedback. Then, the HARQ-ACK group codebook for the first PDSCH group in the HARQ-ACK codebook includes only one HARQ-ACK sub-codebook. This HARQ-ACK sub-codebook is the first HARQ-ACK sub-codebook. Then, the PDSCH group 1 is the first PDSCH group and the PDSCH group 0 is the second PDSCH group.

PDSCH2, scheduled in the downlink time unit 2, is TB-level HARQ-ACK feedback. The downlink scheduling DCI indicates that the HARQ-ACK sub-codebook indication information for the second PDSCH group is 0. It means that there is one HARQ-ACK sub-codebook. The third DAI field has 2 bits, and indicates the number of PDSCHs to be fed back by the first HARQ-ACK sub-codebook for the second PDSCH group. The third DAI is 1; and compared with the first NFI in the downlink time unit 1, the second NFI is not inverted, which indicates that there is one PDSCH for TB-level HARQ-ACK feedback in the second HARQ-ACK group codebook. The first HARQ-ACK sub-codebook included in the HARQ-ACK group codebook for the second PDSCH group has 1 bit, which correspond to the TB-level HARQ-ACK feedback for the PDSCH scheduled by the downlink scheduling DCI in the downlink time unit 1.

The UE determines, according to the downlink scheduling DCI, that the uplink time unit in which the HARQ-ACK codebook is transmitted is the uplink time unit 1. The positions, in the HARQ-ACK codebook, of the HARQ-ACK group codebook for the first PDSCH group and the HARQ-ACK group codebook for the second PDSCH group in the HARQ-ACK codebook are determined by predefined rules. For example, the PDSCH group 0 is ahead of the PDSCH group 1. Or, the HARQ-ACK group codebook for the first PDSCH group is ahead of the HARQ-ACK group codebook for the second PDSCH group. The number of bits for the HARQ-ACK codebook is 2.

Compared with the existing solutions, this method can dynamically indicate the number of HARQ-ACK sub-codebooks included in the second HARQ-ACK group codebook. The flexibility of scheduling is improved.

Method 3

It is configured by higher layer signaling that the second PDSCH group includes two HARQ-ACK sub-codebooks. The HARQ-ACK sub-codebook indication information for the second PDSCH in the DCI is 0 bit (or, it is configured by higher layer signaling that there is no HARQ-ACK sub-codebook indication information for the second PDSCH group in the DCI). The third DAI field has 2 bits, and indicates the total number of PDSCHs to be fed back by one HARQ-ACK sub-codebook for the second PDSCH group. The type of this HARQ-ACK sub-codebook is determined by the HARQ-ACK feedback type for the PDSCH scheduled by the DCI.

When there are two PDSCH groups, PDSCH1 is scheduled in the downlink time unit 1 to be fed back in the uplink time unit 0. The downlink scheduling DCI1 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback.

PDSCH2 is scheduled in the downlink time unit 2 to be fed back in the uplink time unit 0. The downlink scheduling DCI2 indicates that the first PDSCH group number is 0, and the group number of the scheduled PDSCH is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1. The first NFI indicates that the first DAI is recounted, which indicates that there is one PDSCH for CBG-level HARQ-ACK feedback.

PDSCH3 is scheduled in the downlink time unit to be fed back in the uplink time unit 0. The downlink scheduling DCI3 indicates that the first PDSCH group number is 0, and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 2. The first NFI indicates that the first DAI is not recounted, which indicates that there are two PDSCHs for TB-level HARQ-ACK feedback.

PDSCH3 is scheduled in the downlink time unit 4 to be fed back in the uplink time unit 1. The downlink scheduling DCI4 indicates that the first PDSCH group number is 1 and the group number of the scheduled PDSCH is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback. Then, the HARQ-ACK group codebook for the first PDSCH group in the HARQ-ACK codebook includes only one HARQ-ACK sub-codebook. This HARQ-ACK sub-codebook is the first HARQ-ACK sub-codebook.

The downlink scheduling DCI4 in the downlink time unit 4 indicates that the third DAI field has 2 bits. The third DAI indicates the total number of PDSCHs to be fed back by one HARQ-ACK sub-codebook for the second PDSCH group. The type of this HARQ-ACK sub-codebook is determined by the HARQ-ACK feedback type indication information for the currently scheduled PDSCH. Then, the HARQ-ACK feedback is TB-level HARQ-ACK feedback. That is, this HARQ-ACK sub-codebook is the first HARQ-ACK sub-codebook. The third DAI=2 indicates that there are two PDSCHs for TB-level HARQ-ACK feedback. The first HARQ-ACK sub-codebook in the HARQ-ACK group codebook for the second PDSCH group has 2 bits, respectively corresponding to the TB-level HARQ-ACK feedback for the PDSCH1 scheduled by the downlink scheduling DCI1 in the downlink time unit 1 and the TB-level HARQ-ACK feedback for the PDSCH3 scheduled by the downlink scheduling DCI3 in the downlink time unit 3. The number of PDSCHs in the second HARQ-ACK sub-codebook in the HARQ-ACK group codebook for the second PDSCH group is determined as 1, since the downlink scheduling DCI #2 in the downlink time unit 2 indicates that the first DAI is 1. The number of bits for the second HARQ-ACK sub-codebook in the HARQ-ACK group codebook for the second PDSCH group is 4, corresponding to the CBG-level HARQ-ACK feedback for the PDSCH scheduled by the downlink scheduling DCI in the second downlink time unit. The HARQ-ACK group codebook for the second PDSCH group has 6 bits. The first 2 bits indicate the first HARQ-ACK sub-codebook and the last 4 bits indicate the second HARQ-ACK sub-codebook.

The UE determines, according to the downlink scheduling DCI4, that the time when the HARQ-ACK codebook is transmitted is the uplink time unit 1. The positions, in the HARQ-ACK codebook, of the HARQ-ACK group codebook for the first PDSCH group and the HARQ-ACK group codebook for the second PDSCH group in the HARQ-ACK codebook are determined by predefined rules. For example, the PDSCH group 0 is ahead of the PDSCH group 1. Or, the HARQ-ACK group codebook for the first PDSCH group is ahead of the HARQ-ACK group codebook for the second PDSCH group. The number of bits for the HARQ-ACK codebook is 7.

Compared with the existing solutions, this method can indicate the total number of PDSCHs to be fed back by a certain determined HARQ-ACK sub-codebook included in the second HARQ-ACK group codebook, without increasing the physical layer signaling overhead. The reliability of the HARQ-ACK codebook is improved.

Method 4

It is configured by higher layer signaling that the second PDSCH group includes two HARQ-ACK sub-codebooks. The HARQ-ACK sub-codebook indication information for the second PDSCH in the DCI is 0 bit (or, it is configured by higher layer signaling that there is no HARQ-ACK sub-codebook indication information for the second PDSCH group in the DCI). The third DAI has 4 bits. The first 2 bits indicate the total number of PDSCHs to be fed back by the first HARQ-ACK sub-codebook for the second PDSCH group, and the last 2 bits indicate the total number of PDSCHs to be fed back by the second HARQ-ACK sub-codebook for the second PDSCH group. (Or, the first 2 bits indicate the total number of PDSCHs to be fed back by the second HARQ-ACK sub-codebook for the second PDSCH group, and the last 2 bits indicate the total number of PDSCHs to be fed back by the first HARQ-ACK sub-codebook for the second PDSCH group.)

When there are two PDSCH groups, PDSCH1 is scheduled in the downlink time unit 1 to be fed back in the uplink time unit 0. The downlink scheduling DCI1 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback.

PDSCH2 is scheduled in the downlink time unit 2 to be fed back in the uplink time unit 0. The downlink scheduling DCI2 indicates that the first PDSCH group number is 0, and the group number of the scheduled PDSCH is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1. The first NFI indicates that the first DAI is recounted, which indicates that there is one PDSCH for CBG-level HARQ-ACK feedback.

PDSCH3 is scheduled in the downlink time unit to be fed back in the uplink time unit 0. The downlink scheduling DCI3 indicates that the first PDSCH group number is 0, and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 2. The first NFI indicates that the first DAI is not recounted, which indicates that there are two PDSCHs for TB-level HARQ-ACK feedback.

PDSCH3 is scheduled in the downlink time unit 4 to be fed back in the uplink time unit 1. The downlink scheduling DCI4 indicates that the first PDSCH group number is 1 and the group number of the scheduled PDSCH is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback. Then, the HARQ-ACK group codebook for the first PDSCH group in the HARQ-ACK codebook includes only one HARQ-ACK sub-codebook. This HARQ-ACK sub-codebook is the first HARQ-ACK sub-codebook.

The downlink scheduling DCI4 in the downlink time unit 4 indicates that the third DAI has 4 bits. The first 2 bits indicate the total number of PDSCHs to be fed back by the first HARQ-ACK sub-codebook for the second PDSCH group, and the last 2 bits indicate the total number of PDSCHs to be fed back by the second HARQ-ACK sub-codebook for the second PDSCH group.

When the front 2 bits of the third DAI are indicated as 2, it means that there are two PDSCHs for TB-level HARQ-ACK feedback. The first HARQ-ACK sub-codebook in the HARQ-ACK group codebook for the second PDSCH group has 2 bits, respectively corresponding to the TB-level HARQ-ACK feedback for the PDSCH1 scheduled by the downlink scheduling DCI1 in the downlink time unit 1 and the TB-level HARQ-ACK feedback for the PDSCH3 scheduled by the downlink scheduling DCI3 in the downlink time unit 3.

The number of PDSCHs in the second HARQ-ACK sub-codebook in the HARQ-ACK group codebook for the second PDSCH group is determined as 1, since the downlink scheduling DCI #2 in the downlink time unit 2 indicates that the first DAI is 1. The number of bits for the second HARQ-ACK sub-codebook in the HARQ-ACK group codebook for the second PDSCH group is 4, corresponding to the CBG-level HARQ-ACK feedback for the PDSCH scheduled by the downlink scheduling DCI in the second downlink time unit. The HARQ-ACK group codebook for the second PDSCH group has 6 bits. The first 2 bits indicate the first HARQ-ACK sub-codebook and the last 4 bits indicate the second HARQ-ACK sub-codebook.

When the last 2 bits of the third DAI are indicated as 1, it means that there is only one PDSCH in the second HARQ-ACK sub-codebook in the HARQ-ACK group codebook for the second PDSCH group. The number of bits for the second HARQ-ACK sub-codebook in the HARQ-ACK group codebook for the second PDSCH group is 4, corresponding to the CBG-level HARQ-ACK feedback for the PDSCH scheduled by the downlink scheduling DCI in the second downlink time unit. The HARQ-ACK group codebook for the second PDSCH group has 6 bits. The first 2 bits indicate the first HARQ-ACK sub-codebook and the last 4 bits indicate the second HARQ-ACK sub-codebook.

The UE determines, according to the downlink scheduling DCI4, that the time when the HARQ-ACK codebook is transmitted is the uplink time unit 1. The positions, in the HARQ-ACK codebook, of the HARQ-ACK group codebook for the first PDSCH group and the HARQ-ACK group codebook for the second PDSCH group in the HARQ-ACK codebook are determined by predefined rules. For example, the PDSCH group 0 is ahead of the PDSCH group 1. Or, the HARQ-ACK group codebook for the first PDSCH group is ahead of the HARQ-ACK group codebook for the second PDSCH group. The number of bits for the HARQ-ACK codebook is 7.

Compared with the existing solutions, this method can indicate the total number of PDSCHs to be fed back by both two HARQ-ACK sub-codebooks included in the second HARQ-ACK group codebook. The reliability of the HARQ-ACK codebook is improved.

Method 5

It is configured by higher layer signaling that the HARQ-ACK group codebook for the second PDSCH group may include zero HARQ-ACK sub-codebook (or, no HARQ-ACK sub-codebook), one first HARQ-ACK sub-codebook (or, one HARQ-ACK sub-codebook and this HARQ-ACK sub-codebook is the first HARQ-ACK sub-codebook), one second HARQ-ACK sub-codebook (or, one HARQ-ACK sub-codebook and this HARQ-ACK sub-codebook is the second HARQ-ACK sub-codebook) or two HARQ-ACK sub-codebooks; and it is configured by higher layer signaling that the HARQ-ACK sub-codebook indication information for the second PDSCH group in the DCI is 2 bits. In the DCI, those four cases are indicated by 00, 01, 10, 11, respectively. The third DAI indicates the total number of PDSCHs to be fed back by the two HARQ-ACK sub-codebooks included in the HARQ-ACK group codebook for the second PDSCH group.

When there are two PDSCH groups, PDSCH1 is scheduled in the downlink time unit 1 to be fed back in the uplink time unit 0. The downlink scheduling DCI1 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback.

PDSCH2 is scheduled in the downlink time unit 2 to be fed back in the uplink time unit 0. The downlink scheduling DCI2 indicates that the first PDSCH group number is 0, and the group number of the scheduled PDSCH is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1. The first NFI indicates that the first DAI is recounted, which indicates that there is one PDSCH for CBG-level HARQ-ACK feedback.

PDSCH3 is scheduled in the downlink time unit to be fed back in the uplink time unit 0. The downlink scheduling DCI3 indicates that the first PDSCH group number is 0, and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 2. The first NFI indicates that the first DAI is not recounted, which indicates that there are two PDSCHs for TB-level HARQ-ACK feedback.

PDSCH3 is scheduled in the downlink time unit 4 to be fed back in the uplink time unit 1. The downlink scheduling DCI4 indicates that the first PDSCH group number is 1 and the group number of the scheduled PDSCH is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1. The first NFI indicates that the first DAI is recounted, which indicates that there is one PDSCH for TB-level HARQ-ACK feedback. Then, the HARQ-ACK group codebook for the first PDSCH group in the HARQ-ACK codebook includes only one HARQ-ACK sub-codebook. This HARQ-ACK sub-codebook is the first HARQ-ACK sub-codebook.

The downlink scheduling DCI4 in the downlink time unit 4 indicates that the third DAI has 4 bits. The first 2 bits indicate the total number of PDSCHs to be fed back by the first HARQ-ACK sub-codebook for the second PDSCH group, and the last 2 bits indicate the total number of PDSCHs to be fed back by the second HARQ-ACK sub-codebook for the second PDSCH group.

The downlink scheduling DCI4 in the downlink time unit 4 indicates that the HARQ-ACK sub-codebook indication information for the second PDSCH group is 11. It means that the HARQ-ACK group codebook for the second PDSCH includes two HARQ-ACK sub-codebooks.

When the front 2 bits of the third DAI are indicated as 2, it means that there are two PDSCHs for TB-level HARQ-ACK feedback. The first HARQ-ACK sub-codebook in the HARQ-ACK group codebook for the second PDSCH group has 2 bits, respectively corresponding to the TB-level HARQ-ACK feedback for the PDSCH1 scheduled by the downlink scheduling DCI1 in the downlink time unit 1 and the TB-level HARQ-ACK feedback for the PDSCH3 scheduled by the downlink scheduling DCI3 in the downlink time unit 3.

The number of PDSCHs in the second HARQ-ACK sub-codebook in the HARQ-ACK group codebook for the second PDSCH group is determined as 1, since the downlink scheduling DCI #2 in the downlink time unit 2 indicates that the first DAI is 1. The number of bits for the second HARQ-ACK sub-codebook in the HARQ-ACK group codebook for the second PDSCH group is 4, corresponding to the CBG-level HARQ-ACK feedback for the PDSCH scheduled by the downlink scheduling DCI in the second downlink time unit. The HARQ-ACK group codebook for the second PDSCH group has 6 bits. The first 2 bits indicate the first HARQ-ACK sub-codebook and the last 4 bits indicate the second HARQ-ACK sub-codebook.

When the last 2 bits of the third DAI are indicated as 1, it means that there is only one PDSCH in the second HARQ-ACK sub-codebook in the HARQ-ACK group codebook for the second PDSCH group. The number of bits for the second HARQ-ACK sub-codebook in the HARQ-ACK group codebook for the second PDSCH group is 4, corresponding to the CBG-level HARQ-ACK feedback for the PDSCH scheduled by the downlink scheduling DCI in the second downlink time unit. The HARQ-ACK group codebook for the second PDSCH group has 6 bits. The first 2 bits indicate the first HARQ-ACK sub-codebook and the last 4 bits indicate the second HARQ-ACK sub-codebook.

The UE determines, according to the downlink scheduling DCI4, that the time when the HARQ-ACK codebook is transmitted is the uplink time unit 1. The positions, in the HARQ-ACK codebook, of the HARQ-ACK group codebook for the first PDSCH group and the HARQ-ACK group codebook for the second PDSCH group in the HARQ-ACK codebook are determined by predefined rules. For example, the PDSCH group 0 is ahead of the PDSCH group 1. Or, the HARQ-ACK group codebook for the first PDSCH group is ahead of the HARQ-ACK group codebook for the second PDSCH group. The number of bits for the HARQ-ACK codebook is 7.

Compared with the existing solutions, this method can dynamically indicate the number and type of HARQ-ACK sub-codebooks included in the second HARQ-ACK group codebook. The flexibility of scheduling is improved. Meanwhile, the consistency of understanding by the base station and the UE is ensured, and the reliability of the HARQ-ACK codebook is improved. The technical solutions of the embodiments of the present application at least have the following beneficial effects:

The determination of an HARQ-ACK codebook corresponding to an uplink time unit is realized. When the number of HARQ-ACK bits for PDSCHs to be fed in a same uplink time unit is different, the order and size of HARQ-ACK are determined by finite downlink control signaling. The flexibility of scheduling is improved. The reliability of the HARQ-ACK codebook is improved, and the effective utilization of uplink control channel resources is ensured.

In the S303, the determination of the HARQ-ACK codebook may be implemented by one of at least following six methods.

Method 1

It is configured by higher layer signaling that the HARQ-ACK group codebook for each PDSCH group may include at most two HARQ-ACK sub-codebooks. It is stipulated by specifications that or it is configured by higher layer signaling that there are two PDSCH groups. It is stipulated by specifications that or it is configured by higher layer signaling that the HARQ-ACK sub-codebook indication information for the second PDSCH group in the downlink scheduling DCI is 0 bit.

The third DAI indicates the total number of PDSCHs to be fed back by both the first HARQ-ACK sub-codebook and the second HARQ-ACK sub-codebook included in the HARQ-ACK group codebook for the second PDSCH group.

The indication information of the third DAI may be configured by higher layer signaling or stipulated by specifications. The third DAI indicates the total number of PDSCHs to be fed back by both the first HARQ-ACK sub-codebook and the second HARQ-ACK sub-codebook included in the HARQ-ACK group codebook for the second PDSCH group (including the number of SPS PDSCH release DCIs). Whether the third DAI is recounted is indicated by the second NFI. When the second NFI is inverted, the third DAI is recounted; and when the second NFI is not inverted, the third DAI is not recounted. In this embodiment, the third DAI field has 2 bits.

It is to be noted that, since the number of bits in the DCI indicated by the DAI is limited, the indication information of the third DAI in the DCI may be different for the total number of actual PDSCHs corresponding to different HARQ-ACK sub-codebooks for the second PDSCH group. For example, the binary value of the third DAI in the DCI is indicated as 00, the total number of PDSCHs to be fed back by the first HARQ-ACK sub-codebook for the second PDSCH group is 5, and the total number of PDSCHs to be fed back by the second HARQ-ACK sub-codebook for the second PDSCH group is 1.

The default value or initial value of the first NFI and the second NFI may be stipulated by specifications or configured by higher layer signaling. If it is stipulated by specifications that the default value or the initial value of the first NFI and the second NFI is 0, then, when the UE receives a first downlink scheduling DCI from a certain PDSCH group to schedule the TB-level or CBG-level HARQ-ACK feedback, the first NFI=1 indicates that the first NFI is inverted, which means that the first DAI and the second DAI are recounted; and if it is stipulated by specifications that the default value or initial value of the first NFI and the second NFI is 1, then, when the UE receives a first downlink scheduling DCI from a certain PDSCH group to schedule the TB-level or CBG-level HARQ-ACK feedback, the first NFI=0 indicates that the first NFI is inverted, which means that the first DAI and the second DAI are recounted.

When the UE receives a downlink scheduling DCI, which is not the first downlink scheduling DCI, from a certain PDSCH group to schedule the TB-level or CBG-level HARQ-ACK feedback, whether the first NFI is inverted is determined by comparing the current first NFI with the previous TB-level or CBG-level NFI indication information for this PDSCH group. If the two NFIs are different, it is considered that the first DAI and the second DAI are recounted. Otherwise, the first DAI and the second DAI are not recounted.

The principle of the second NFI is the same as that of the first NFI. In this embodiment, the default value or initial value of the first NFI and the second NFI is 0.

In this embodiment, there are two PDSCH groups, and the HARQ-ACK feedback type for the PDSCHs in each PDSCH group may be TB-level or CBG-level HARQ-ACK feedback.

PDSCH1 is scheduled in the downlink time unit 1 to be fed back in the uplink time unit 1. The downlink scheduling DCI1 indicates that the first PDSCH group number is 0 and the group number of the scheduled PDSCH1 is 0. The HARQ-ACK feedback type indication information for the currently scheduled PDSCH indicates that the PDSCH is TB-level HARQ-ACK feedback. The number of bits corresponding to the PDSCHs for TB-level HARQ-ACK feedback is 1. The first DAI is 1, the second DAI is 1, and the first NFI is 1. DCI1 is the first downlink scheduling DCI, which schedules the TB-level HARQ-ACK feedback, for the PDSCH group 0. Then, the first NFI is inverted, which means that the first DAI and the second DAI are recounted. It indicates that there is one PDSCH for TB-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The third DAI indicates the total number of PDSCHs to be fed back by both the first HARQ-ACK sub-codebook and the second HARQ-ACK sub-codebook for the second PDSCH group. The binary value of the third DAI in the DCI is indicated as 11, and the size of the HARQ-ACK group codebook for the second PDSCH group is 0.

PDSCH2 is scheduled in the downlink time unit 2 to be fed back in the uplink time unit 1. The downlink scheduling DCI2 indicates that the first PDSCH group number is 0 and the group number of the scheduled PDSCH2 is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1, the second DAI is 1, and the first NFI is 1. Compared with the default value, the first NFI is inverted. DCI2 is the first downlink scheduling DCI, which schedules the CBG-level HARQ-ACK feedback, for the PDSCH group 0. Then, the first NFI is inverted, which means that the first DAI and the second DAI are recounted. There is one PDSCH for CBG-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The third DAI indicates the total number of PDSCHs to be fed back by both the first HARQ-ACK sub-codebook and the second HARQ-ACK sub-codebook for the second PDSCH group. The binary value of the third DAI in the DCI is indicated as 11. The HARQ-ACK group codebook for the second PDSCH group has 0 bit. The HARQ-ACK codebook determined according to the downlink time unit 1 and the downlink time unit 2 has 5 bits, i.e., the first HARQ-ACK sub-codebook and the second HARQ-ACK sub-codebook for the PDSCH group 0. The first HARQ-ACK sub-codebook for the PDSCH group 0 has 1 bit, corresponding to the TB-level HARQ-ACK feedback for PDSCH1 scheduled in the downlink time unit 1. The second HARQ-ACK sub-codebook for the PDSCH group 0 has 4 bits, corresponding to the CBG-level HARQ-ACK feedback for PDSCH2 scheduled in the downlink time unit 2. The HARQ-ACK group codebook for the PDSCH group 1 has 0 bit.

The base station does not receive the HARQ-ACK codebook, transmitted by the UE, in the uplink time unit 1.

PDSCH3 is scheduled in the downlink time unit 3 to be fed back in the uplink time unit 2. The downlink scheduling DCI3 indicates that the first PDSCH group number is 1 and the group number of the scheduled PDSCH3 is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1, the second DAI is 1, and the first NFI is 1. DCI3 is the first downlink scheduling DCI, which schedules the TB-level HARQ-ACK feedback, for the PDSCH group 1. Then, the first NFI is inverted, which means that the first DAI and the second DAI are recounted. It indicates that there is one PDSCH for TB-level HARQ-ACK feedback in the PDSCH group 1. Then, the PDSCH group 1 is the first PDSCH group and the PDSCH group 0 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by both the first HARQ-ACK sub-codebook and the second HARQ-ACK sub-codebook for the second PDSCH group. The binary value of the third DAI in the DCI is indicated as 00. The second NFI is 1. Compared with the previous downlink scheduling DCI for the PDSCH group 0, i.e., the first NFI in the DCI2, the NFI is not inverted. The total number of PDSCHs to be fed back by both the first HARQ-ACK sub-codebook and the second HARQ-ACK sub-codebook for the PDSCH group 0 is 1. The total number of PDSCHs to be fed back by the first HARQ-ACK sub-codebook for the PDSCH group 0 is 1, and the corresponding number of bits is 1. The total number of PDSCHs to be fed back by the second HARQ-ACK sub-codebook for the PDSCH group 0 is 1, and the corresponding number of bits is 4. The HARQ-ACK codebook consists of two HARQ-ACK group codebooks. The HARQ-ACK group codebook for the PDSCH group 0 consists of two HARQ-ACK sub-codebooks. The first HARQ-ACK sub-codebook has 1 bit, corresponding to the TB-level HARQ-ACK feedback for PDSCH1 scheduled by the DCI1. The second HARQ-ACK sub-codebook has 4 bits, corresponding to the CBG-level HARQ-ACK feedback for PDSCH2 scheduled by the DCI2. The HARQ-ACK group codebook for the PDSCH group 1 consists of a first HARQ-ACK sub-codebook having 1 bit, corresponding to the TB-level HARQ-ACK feedback for PDSCH3 scheduled by the DCI3.

The base station does not receive the HARQ-ACK codebook, transmitted by the UE, in the uplink time unit 2.

PDSCH4 is scheduled in the downlink time unit 4 to be fed back in the uplink time unit 3. The downlink scheduling DCI4 indicates that the first PDSCH group number is 0 and the group number of the scheduled PDSCH4 is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 2, the second DAI is 2, and the first NFI is 1. The first NFI is the same as the previous NFI indication for the PDSCH group 0 (then, the second NFI for the DCI3). The first DAI is 2 and the second DAI is 2, both of which are not recounted. There are two PDSCHs for TB-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by both the first HARQ-ACK sub-codebook and the second HARQ-ACK sub-codebook for the second PDSCH group. The binary value of the third DAI in the DCI is indicated as 00. The second NFI is 1. Compared with the previous downlink scheduling DCI for the PDSCH group 1, i.e., the first NFI in the DCI3, the NFI is not inverted. The total number of PDSCHs to be fed back by both the first HARQ-ACK sub-codebook and the second HARQ-ACK sub-codebook for the PDSCH group 1 is 1. The total number of PDSCHs to be fed back by the first HARQ-ACK sub-codebook for the PDSCH group 1 is 1, and the corresponding number of bits is 1. The total number of PDSCHs to be fed back by the second HARQ-ACK sub-codebook for the PDSCH group 1 is 1, and the corresponding number of bits is 4. The HARQ-ACK codebook consists of two HARQ-ACK group codebooks. The HARQ-ACK group codebook for the PDSCH group 0 consists of two HARQ-ACK sub-codebooks. The first HARQ-ACK sub-codebook has 2 bits, corresponding to the TB-level HARQ-ACK feedback for PDSCH1 scheduled by the DCI1 and the TB-level HARQ-ACK feedback for PDSCH4 scheduled by the DCI4. The second HARQ-ACK sub-codebook has 4 bits, corresponding to the CBG-level HARQ-ACK feedback for PDSCH2 scheduled by the DCI2. The HARQ-ACK group codebook for the PDSCH group 1 consists of two HARQ-ACK sub-codebooks. The first HARQ-ACK sub-codebook has 1 bit, corresponding to the TB-level HARQ-ACK feedback for PDSCH3 scheduled by the DCI3. The second HARQ-ACK sub-codebook has 4 bits. Since the UE does not receive the corresponding scheduling DCI, the UE considers that this DCI is missed and feeds back four NACK. The HARQ-ACK codebook has total 11 bits.

Compared with the existing solutions, by this solution, the consistency of understanding the size of the HARQ-ACK codebook by the UE and the base station is ensured, and the reliability of the HARQ-ACK codebook transmission is improved.

Method 2

It is configured by higher layer signaling that the HARQ-ACK group codebook for each PDSCH group includes only the first HARQ-ACK sub-codebook. It is stipulated by specifications that or it is configured by higher layer signaling that there are two PDSCH groups. It is stipulated by specifications that or it is configured by higher layer signaling that the HARQ-ACK sub-codebook indication information for the second PDSCH group in the downlink scheduling DCI is 0 bit.

The indication information of the third DAI may be configured by higher layer signaling or stipulated by specifications. The third DAI indicates the total number of PDSCHs to be fed back by the HARQ-ACK sub-codebook for the second PDSCH group. Whether the third DAI is recounted is indicated by the second NFI. When the second NFI is inverted, the third DAI is recounted; and when the second NFI is not inverted, the third DAI is not recounted. In this embodiment, the third DAI field has 2 bits.

In this embodiment, there are two PDSCH groups, and the HARQ-ACK feedback type for the PDSCHs in each PDSCH group is TB-level HARQ-ACK feedback. The number of bits corresponding to the PDSCH for TB-level HARQ-ACK feedback is 1.

The UE determines, according to the first DAI, and/or second DAI, and/or the third DAI associated with each PDSCH group, whether any DCI is missed.

PDSCH1 is scheduled in the downlink time unit 1 to be fed back in the uplink time unit 1. The downlink scheduling DCI1 indicates that the first PDSCH group number is 0 and the group number of the scheduled PDSCH is 0. The first DAI is 1, the second DAI is 1, and the first NFI is 1. DCI1 is the first downlink scheduling DCI for the PDSCH group 0. Then, the first NFI is inverted, which means that the first DAI and the second DAI are recounted. There is one PDSCH in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH, and the third DAI is 0.

PDSCH2 is scheduled in the downlink time unit 2 to be fed back in the uplink time unit 1. The downlink scheduling DCI2 indicates that the first PDSCH group number is 0 and the group number of the scheduled PDSCH is 0. The first DAI is 2, the second DAI is 2, and the first NFI is 1. The first NFI is the same as the previous NFI indication for the PDSCH group 0 (then, the second NFI for the DCI3). The first DAI is 2 and the second DAI is 2, both of which are not recounted. There are two PDSCHs in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The third DAI is 0. Then, the HARQ-ACK codebook has 2 bits, respectively corresponding to HARQ-ACK feedback for the PDSCH1 scheduled by the DCI1 and the PDSCH2 scheduled by the DCI2. The UE does not receive the downlink scheduling DCI2.

The base station does not receive the HARQ-ACK codebook, transmitted by the UE, in the uplink time unit 1.

PDSCH3 is scheduled in the downlink time unit 3 to be fed back in the uplink time unit 2. The downlink scheduling DCI3 indicates that the first PDSCH group number is 1 and the group number of the scheduled PDSCH1 is 1. The first DAI is 1, the second DAI is 1, and the first NFI is 1. DCI3 is the first downlink scheduling DCI for the PDSCH group 1. Then, the first NFI is inverted, which means that the first DAI and the second DAI are recounted. There is one PDSCH in the PDSCH group 1. Then, the PDSCH group 1 is the first PDSCH group and the PDSCH group 0 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by the HARQ-ACK sub-codebook for the second PDSCH group. The third DAI is 2, and the second NFI is 1. Compared with the previous downlink scheduling DCI for the PDSCH group 0, i.e., the first NFI in the DCI2, the NFI is not inverted. The total number of PDSCHs to be fed back for the PDSCH group 0 is 2.

PDSCH4 is scheduled in carrier 1 in the downlink time unit 4 to be fed back in the uplink time unit 2. The downlink scheduling DCI4 indicates that the first PDSCH group number is 0 and the group number of the scheduled PDSCH is 0. The first DAI is 3, the second DAI is 6, and the first NFI is 1. The first NFI is the same as the previous NFI indication for the PDSCH group 0 (then, the first NFI for the DCI1). The first DAI is 3 and the second DAI is 6, both of which are not recounted. Then, the PDSCH group 0 is the first PDSCH group and the PDSCH group 1 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by the HARQ-ACK sub-codebook for the second PDSCH group. The third DAI is 1, and the second NFI is 1. Compared with the previous downlink scheduling DCI for the PDSCH group 1, i.e., the first NFI in the DCI3, the NFI is not inverted. The total number of PDSCHs to be fed back for the PDSCH group 1 is 1.

PDSCH5 is scheduled in carrier 2 in the downlink time unit 4 to be fed back in the uplink time unit 2. The downlink scheduling DCI5 indicates that the first PDSCH group number is 0 and the group number of the scheduled PDSCH is 0. The first DAI is 4, the second DAI is 6, and the first NFI is 1. The first NFI is the same as the previous NFI indication for the PDSCH group 0 (then, for the UE, the first NFI for the DCI1). The first DAI is 4 and the second DAI is 6, both of which are not recounted. Then, the PDSCH group 0 is the first PDSCH group and the PDSCH group 1 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by the HARQ-ACK sub-codebook for the second PDSCH group. The third DAI is 1, and the second NFI is 1. Compared with the previous downlink scheduling DCI for the PDSCH group 1, i.e., the first NFI in the DCI3, the NFI is not inverted. The total number of PDSCHs to be fed back for the PDSCH group 1 is 1.

PDSCH6 is scheduled in carrier 3 in the downlink time unit 4 to be fed back in the uplink time unit 2. The downlink scheduling DCI6 indicates that the first PDSCH group number is 0 and the group number of the scheduled PDSCH is 0. The first DAI is 5, the second DAI is 6, and the first NFI is 1. The first NFI is the same as the previous NFI indication for the PDSCH group 0 (then, for the UE, the first NFI for the DCI1). The first DAI is 5 and the second DAI is 6, both of which are not recounted. Then, the PDSCH group 0 is the first PDSCH group and the PDSCH group 1 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by the HARQ-ACK sub-codebook for the second PDSCH group. The third DAI is 1, and the second NFI is 1. Compared with the previous downlink scheduling DCI for the PDSCH group 1, i.e., the first NFI in the DCI3, the NFI is not inverted. The total number of PDSCHs to be fed back for the PDSCH group 1 is 1.

PDSCH7 is scheduled in carrier 4 in the downlink time unit 4 to be fed back in the uplink time unit 2. The downlink scheduling DCI7 indicates that the first PDSCH group number is 0 and the group number of the scheduled PDSCH is 0. The first DAI is 6, the second DAI is 6, and the first NFI is 1. The first NFI is the same as the previous NFI indication for the PDSCH group 0 (then, for the UE, the first NFI for the DCI1). The first DAI is 6 and the second DAI is 6, both of which are not recounted. Then, the PDSCH group 0 is the first PDSCH group and the PDSCH group 1 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by the HARQ-ACK sub-codebook for the second PDSCH group. The third DAI is 1, and the second NFI is 1. Compared with the previous downlink scheduling DCI for the PDSCH group 1, i.e., the first NFI in the DCI3, the NFI is not inverted. The total number of PDSCHs to be fed back for the PDSCH group 1 is 1.

In this embodiment, the number of bits in the DAI field is 2. When the DAI is indicated as 5, the bit field in the DCI is indicated as 00. When the DAI is indicated as 1, the bit field in the DCI is indicated also as 00. When the DAI is indicated as 6, the bit field in the DCI is indicated as 01. When the DAI is indicated as 2, the bit field in the DCI is indicated also as 01. The UE needs to determine, according to all the received first DAIs and second DAIs, the specific value of the DAI and the position of the PDSCH scheduled by a corresponding DCI in the HARQ-ACK codebook.

The UE does not receive DCI5, DCI6 and DCI7.

For the PDSCH group 0, the UE can determine, according to the first DAI=1 for the DCI1, the second DAI=1 and the second DAI=2 for the DCI3, that one DCI for the PDSCH group 0 is missed. The UE further determines, according to the first DAI and the second DAI for the DCI7 (the bit field in the DCI is indicated as 01), that at least three DCIs for the PDSCH group 0 before the DCI7 are missed. In this way, it is determined that there are total six PDSCHs, for which the feedback of HARQ-ACK is required, in the PDSCH group 0. The HARQ-ACK codebook has 7 bits. The first bit indicates the HARQ-ACK feedback for PDSCH1 scheduled by the DCI1. The second, third, fourth and fifth bits indicate NACK. The sixth bit indicates the HARQ-ACK feedback for PDSCH7 scheduled by the DCI7. The sixth bit indicates the HARQ-ACK feedback for PDSCH3 scheduled by the DCI3. The HARQ-ACK group codebook for the PDSCH group 0 has 6 bits. The HARQ-ACK group codebook for the PDSCH group 1 has 1 bit.

Compared with the existing solutions, by this solution, the probability for finding the missing of DCIs can be increased, and the reliability of the HARQ-ACK codebook can be improved. This method is applicable to scenarios having only the second HARQ-ACK sub-codebook and scenarios having both the first HARQ-ACK sub-codebook and the second HARQ-ACK sub-codebook.

Method 3

It is configured by higher layer signaling that the HARQ-ACK group codebook for each PDSCH group may include at most two HARQ-ACK sub-codebooks. It is stipulated by specifications that or it is configured by higher layer signaling that there is one PDSCH group. It is stipulated by specifications that or it is configured by higher layer signaling that the HARQ-ACK sub-codebook indication information for the second PDSCH group in the downlink scheduling DCI is 0 bit.

In carrier aggregation scenarios, when only one carrier is configured with CBG-level HARQ-ACK feedback, the downlink scheduling DCI schedules the PDSCH in this carrier and this PDSCH is CBG-level HARQ-ACK feedback. It may be stipulated by specifications that or configured, by higher layer signaling that the second DAI is used to indicate the total number of PDSCHs to be fed back by the first HARQ-ACK sub-codebook for the first PDSCH group.

In this embodiment, the number of bits corresponding to the PDSCH for TB-level HARQ-ACK feedback is 1 and the number of bits corresponding to the PDSCH for CBG-level HARQ-ACK feedback is 4. The carrier 1 is configured with the CBG-level HARQ-ACK feedback and the carrier 2 is not configured with the CBG-level HARQ-ACK feedback.

PDSCH1 is scheduled in the downlink time unit 1 to be fed back in the uplink time unit 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1 and the second DAI is 1. The UE does not receive the DCI1.

PDSCH2 is scheduled in the downlink time unit 2 to be fed back in the uplink time unit 1. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1 and the second DAI is 1. The second DAI indicates the total number of PDSCHs to be fed back by the first HARQ-ACK sub-codebook. The HARQ-ACK codebook has 5 bits. The first bit indicates NACK, corresponding to the first HARQ-ACK sub-codebook. The second, third, fourth and fifth bits indicate the second HARQ-ACK sub-codebook, corresponding to the CBG-level HARQ-ACK feedback for PDSCH2 scheduled by the DCI2.

This method is applicable to scenarios having two or any number of PDSCHs.

Compared with the existing solutions, by this solution, the probability for finding the missing of DCIs can be increased, and the reliability of the HARQ-ACK codebook can be improved.

Method 4

It is configured by higher layer signaling that the HARQ-ACK group codebook for each PDSCH group may include at most two HARQ-ACK sub-codebooks. It is stipulated by specifications that or it is configured by higher layer signaling that there are two PDSCH groups. It is stipulated by specifications that or it is configured by higher layer signaling that the HARQ-ACK sub-codebook indication information for the second PDSCH group in the downlink scheduling DCI is 0 bit.

The number of bits M for the third DAI and the information indicated by the third DAI may be stipulated by specifications or configured by higher layer signaling. The third DAI is divided into two parts. The first part includes M/2 most significant bits MSBs in the M bits, i.e., the first M/2 bits, and the second part includes M/2 least significant bits LSBs in the M bits, i.e., the last M/2 bits. In this embodiment, M is 4.

When the HARQ-ACK group codebook indication information for the PDSCH group indicates that HARQ-ACK is to be fed back for both two PDSCH groups, the first part of the third DAI indicates the total number of PDSCHs to be fed back by the first HARQ-ACK sub-codebook for the second PDSCH group, and the second part of the third DAI indicates the total number of PDSCHs to be fed back by the second HARQ-ACK sub-codebook for the second PDSCH group. Whether the third DAI is recounted is indicated by the second NFI. When the second NFI is inverted, the third DAI is recounted; and when the second NFI is not inverted, the third DAI is not recounted.

When the HARQ-ACK group codebook indication information for the PDSCH group indicates that HARQ-ACK is to be fed back only for the PDSCH group including the currently scheduled PDSCH, it may be configured by the base station through higher layer signaling that or stipulated by specifications that the third DAI is used to indicate the DAI information for the first PDSCH group. This DAI information may be a complete piece of DAI information, or part of the DAI information, for example X MSBs.

Specifically, the indication information may be implemented by one of the following six methods.

1) The first part of the third DAI indicates M/2 MSBs of the first DAI in the current DCI. If the currently scheduled PDSCH is TB-level HARQ-ACK feedback, the second part of the third DAI indicates the total number of PDSCHs to be fed back by the second HARQ-ACK sub-codebook for the first PDSCH group. If the currently scheduled PDSCH is CBG-level HARQ-ACK feedback, the second part of the third DAI indicates the total number of PDSCHs to be fed back by the first HARQ-ACK sub-codebook for the first PDSCH group.

2) The second part of the third DAI indicates M/2 MSBs of the first DAI in the current DCI. If the currently scheduled PDSCH is TB-level HARQ-ACK feedback, the first part of the third DAI indicates the total number of PDSCHs to be fed back by the second HARQ-ACK sub-codebook for the first PDSCH group. If the currently scheduled PDSCH is CBG-level HARQ-ACK feedback, the first part of the third DAI indicates the total number of PDSCHs to be fed back by the first HARQ-ACK sub-codebook for the first PDSCH group.

3) The first part of the third DAI indicates M/2 MSBs of the second DAI in the current DCI. If the currently scheduled PDSCH is TB-level HARQ-ACK feedback, the second part of the third DAI indicates the total number of PDSCHs to be fed back by the second HARQ-ACK sub-codebook for the first PDSCH group. If the currently scheduled PDSCH is CBG-level HARQ-ACK feedback, the second part of the third DAI indicates the total number of PDSCHs to be fed back by the first HARQ-ACK sub-codebook for the first PDSCH group.

4) The second part of the third DAI indicates M/2 MSBs of the second DAI in the current DCI. If the currently scheduled PDSCH is TB-level HARQ-ACK feedback, the first part of the third DAI indicates the total number of PDSCHs to be fed back by the second HARQ-ACK sub-codebook for the first PDSCH group. If the currently scheduled PDSCH is CBG-level HARQ-ACK feedback, the first part of the third DAI indicates the total number of PDSCHs to be fed back by the first HARQ-ACK sub-codebook for the first PDSCH group.

5) The first part of the third DAI indicates M/2 MSBs of the first DAI in the current DCI. The second part of the third DAI indicates M/2 MSBs of the second DAI in the current DCI.

6) The second part of the third DAI indicates M/2 MSBs of the first DAI in the current DCI. The first part of the third DAI indicates M/2 MSBs of the second DAI in the current DCI.

Alternatively, the fifth method is used, that is, the first part of the third DAI indicates M/2 MSBs of the first DAI in the current DCI and the second part of the third DAI indicates M/2 MSBs of the second DAI in the current DCI.

Alternatively, the number of bits corresponding to the PDSCH for TB-level HARQ-ACK feedback is 1 and the number of bits corresponding to the PDSCH for CBG-level HARQ-ACK feedback is 4.

PDSCH1 is scheduled in the downlink time unit 1 to be fed back in the uplink time unit 1. The downlink scheduling DCI1 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1 (the binary value in the DCI is indicated as 00), the second DAI is 1 (the binary value in the DCI is indicated as 00), and the first NFI is 1. DCI1 is the first downlink scheduling DCI, which schedules the TB-level HARQ-ACK feedback, for the PDSCH group 0. Then, the first NFI is inverted, which means that the first DAI and the second DAI are recounted. There is one PDSCH for TB-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0000.

The UE receives the DCI1 successfully.

PDSCH2 is scheduled in the downlink time unit 2 to be fed back in the uplink time unit 1. The downlink scheduling DCI2 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 2 (the binary value in the DCI is indicated as 01), the second DAI is 2 (the binary value in the DCI is indicated as 01), and the first NFI is 1. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0000.

PDSCH3 is scheduled in the downlink time unit 3 to be fed back in the uplink time unit 1. The downlink scheduling DCI3 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 3 (the binary value in the DCI is indicated as 10), the second DAI is 6 (the binary value in the DCI is indicated as 01), and the first NFI is 1. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0001.

PDSCH4 is scheduled in the downlink time unit 3 to be fed back in the uplink time unit 1. The downlink scheduling DCI4 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 4 (the binary value in the DCI is indicated as 11), the second DAI is 6 (the binary value in the DCI is indicated as 01), and the first NFI is 1. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0001.

PDSCH5 is scheduled in the downlink time unit 3 to be fed back in the uplink time unit 1. The downlink scheduling DCI5 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 5 (the binary value in the DCI is indicated as 00), the second DAI is 6 (the binary value in the DCI is indicated as 01), and the first NFI is 1. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0101.

The UE fails to receive DCI2, DCI3, DC4 and DCI5.

PDSCH6 is scheduled in the downlink time unit 3 to be fed back in the uplink time unit 1. The downlink scheduling DCI6 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 6 (the binary value in the DCI is indicated as 01), the second DAI is 6 (the binary value in the DCI is indicated as 01), and the first NFI is 1. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The first part of the third DAI indicates M/2 MSBs of the first DAI in the current DCI, and the second part of the third DAI indicates M/2 MSBs of the second DAI in the current DCI. The binary value of the third DAI in the DCI is indicated as 0101.

The UE receives the DCI6 successfully.

The first NFI in the DCI6 is the same as the first NFI in the DCI1. The first DAI and the second DAI are not recounted. The UE can determine, according to the indication information in the DCI6, that there are total 6 PDSCHs to be fed back in the PDSCH group 0, and 4 DCIs are missed between the DCI1 and the DCI6. Then, the HARQ-ACK codebook has 6 bits. The first bit indicates the HARQ-ACK feedback for PDSCH1, the sixth bit indicates the HARQ-ACK feedback for PDSCH6, and the other 4 bits indicate NACK.

Compared with the existing solutions, by this solution, it is helpful for the UE to find the missing of DCIs, without increasing the number of bits of DCIs. The reliability of the HARQ-ACK codebook is improved.

Method 5

It is configured by higher layer signaling that the HARQ-ACK group codebook for each PDSCH group may include at most two HARQ-ACK sub-codebooks. It is stipulated by specifications that or it is configured by higher layer signaling that there are two PDSCH groups. It is stipulated by specifications that or it is configured by higher layer signaling that the HARQ-ACK sub-codebook indication information for the second PDSCH group in the downlink scheduling DCI is 0 bit.

The indication information of the third DAI may be configured by higher layer signaling or stipulated by specifications. The indication information of the third DAI may be associated with the HARQ-ACK group codebook indication information for the PDSCH group. In this embodiment, the third DAI field has 2 bits.

When the HARQ-ACK group codebook indication information for the PDSCH group indicates that HARQ-ACK is to be fed back for both two PDSCH groups, the third DAI indicates the total number of PDSCHs to be fed back by one HARQ-ACK sub-codebook for the second PDSCH group. The type of the HARQ-ACK sub-codebook is determined by the HARQ-ACK feedback type indication information for the currently scheduled PDSCH. It may be stipulated that the type of this HARQ-ACK sub-codebook is the same as the HARQ-ACK feedback type for the currently scheduled PDSCH, or that the type of this HARQ-ACK sub-codebook is different from the HARQ-ACK feedback type for the currently scheduled PDSCH. In this embodiment, it is stipulated that the type of this HARQ-ACK sub-codebook is the same as the HARQ-ACK feedback type for the currently scheduled PDSCH. Whether the third DAI is recounted is indicated by the second NFI. When the second NFI is inverted, the third DAI is recounted; and when the second NFI is not inverted, the third DAI is not recounted.

When the HARQ-ACK group codebook indication information for the PDSCH group indicates that HARQ-ACK is to be fed back only for the PDSCH group including the currently scheduled PDSCH, the third DAI indicates the total number of PDSCHs, which have different HARQ-ACK feedback type from that for the currently scheduled PDSCH, to be fed back by the HARQ-ACK sub-codebook for the first PDSCH group. When the HARQ-ACK feedback type for the currently scheduled PDSCH is TB-level HARQ-ACK feedback, the third DAI indicates the total number of PDSCHs to be fed back by the second HARQ-ACK sub-codebook for the first PDSCH group. When the HARQ-ACK feedback type for the currently scheduled PDSCH is CBG-level HARQ-ACK feedback, the third DAI indicates the total number of PDSCHs to be fed back by the first HARQ-ACK sub-codebook for the first PDSCH group. Whether the third DAI is recounted is indicated by the first NFI. When the first NFI is inverted, the third DAI is recounted; and when the first NFI is not inverted, the third DAI is not recounted. Alternatively, whether the third DAI is recounted is indicated by the second NFI. When the second NFI is inverted, the third DAI is recounted; and when the second NFI is not inverted, the third DAI is not recounted.

In this embodiment, there are two PDSCH groups, and the HARQ-ACK feedback type for the PDSCHs in each PDSCH group may be TB-level or CBG-level HARQ-ACK feedback.

PDSCH1 is scheduled in the downlink time unit 1 to be fed back in the uplink time unit 1. The downlink scheduling DCI1 indicates that the first PDSCH group number is 0 and the group number of the scheduled PDSCH is 0. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1, the second DAI is 1, and the first NFI is 1. DCI1 is the first downlink scheduling DCI, which schedules the TB-level HARQ-ACK feedback, for the PDSCH group 0. Then, the first NFI is inverted, which means that the first DAI and the second DAI are recounted. There is one PDSCH for TB-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The third DAI indicates the total number of PDSCHs to be fed back by the second HARQ-ACK sub-codebook for the first PDSCH group. The third DAI is 0; and the first NFI is inverted, which indicates that the third DAI is recounted. The HARQ-ACK codebook determined according to the downlink time unit 1 has 1 bit. It is the first HARQ-ACK sub-codebook for the first PDSCH group, corresponding to the TB-level HARQ-ACK feedback for PDSCH1 scheduled in the downlink time unit 1. The second HARQ-ACK sub-codebook for the first PDSCH group has 0 bit. The HARQ-ACK group codebook for the second PDSCH group has 0 bit.

PDSCH2 is scheduled in the downlink time unit 2 to be fed back in the uplink time unit 1. The downlink scheduling DCI2 indicates that the first PDSCH group number is 0 and the group number of the scheduled PDSCH is 0. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1, the second DAI is 1, and the first NFI is 1. Compared with the default value, the first NFI is inverted. DCI2 is the first downlink scheduling DCI, which schedules the CBG-level HARQ-ACK feedback, for the PDSCH group 0. Then, the first NFI is inverted, which means that the first DAI and the second DAI are recounted. There is one PDSCH for CBG-level HARQ-ACK feedback in the PDSCH group 0. Then, the PDSCH group 0 is the first PDSCH group and the PDSCH group 1 is the second PDSCH group. The HARQ-ACK group codebook indication information for the PDSCH group indicates that HARQ-ACK is to be fed back only for the PDSCH group including the currently scheduled PDSCH. The third DAI indicates the total number of PDSCHs to be fed back by the first HARQ-ACK sub-codebook for the first PDSCH group. Then, the first DPSCH group is the PDSCH group 0. The third DAI is 1, and compared with the first NFI for the DCI1, the first NFI is not inverted, which indicates that the third DAI is not recounted. The HARQ-ACK codebook determined according to the downlink time unit 2 has 5 bits, i.e., the first HARQ-ACK sub-codebook and the second HARQ-ACK sub-codebook for the first PDSCH group. The first HARQ-ACK sub-codebook for the first PDSCH group has 1 bit, corresponding to the TB-level HARQ-ACK feedback for PDSCH1 scheduled in the downlink time unit 1. The second HARQ-ACK sub-codebook for the first PDSCH group has 4 bits, corresponding to the CBG-level HARQ-ACK feedback for PDSCH2 scheduled in the downlink time unit 2. The HARQ-ACK group codebook for the second PDSCH group has 0 bit.

Compared with the existing solutions, by this solution, the reliability of the HARQ-ACK codebook can be improved without increasing the number of bits of DCIs. If the UE finds the missing of a DCI in the downlink time unit 1, according to the existing solutions, the base station will not indicate the number of PDSCHs to be fed back by the first HARQ-ACK sub-codebook for the first PDSCH group and the UE will merely indicate that the second HARQ-ACK sub-codebook for the first PDSCH group has 4 bits. In contrast, by this solution, the UE can find the missing of any DCI, and can determine, by the third DAI, that the total number of PDSCHs to be fed back by the first HARQ-ACK sub-codebook for the first PDSCH group is 1.

The base station does not receive the HARQ-ACK codebook, transmitted by the UE, in the uplink time unit 1.

PDSCH3 is scheduled in the downlink time unit 3 to be fed back in the uplink time unit 2. The downlink scheduling DCI3 indicates that the first PDSCH group number is 1 and the group number of the scheduled PDSCH is 1. The HARQ-ACK feedback type indication information for the currently scheduled PDSCH indicates that the PDSCH is TB-level HARQ-ACK feedback. The number of bits corresponding to the PDSCH for TB-level HARQ-ACK feedback is 1. The first DAI is 1, the second DAI is 1, and the first NFI is 1. DCI3 is the first downlink scheduling DCI, which schedules the TB-level HARQ-ACK feedback, for the PDSCH group 1. Then, the first NFI is inverted, which means that the first DAI and the second DAI are recounted. There is one PDSCH for TB-level HARQ-ACK feedback in the PDSCH group 1. Then, the PDSCH group 1 is the first PDSCH group and the PDSCH group 0 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by one HARQ-ACK sub-codebook for the second PDSCH group. The type of this HARQ-ACK sub-codebook is determined by the HARQ-ACK feedback type indication information for the currently scheduled PDSCH. The type of this HARQ-ACK sub-codebook is the same as the HARQ-ACK feedback type for the currently scheduled PDSCH. This HARQ-ACK sub-codebook is the first HARQ-ACK sub-codebook. The third DAI is 1, and the second NFI is 1. Compared with the previous downlink scheduling DCI for the PDSCH group 0 which schedules the TB-level HARQ-ACK feedback, i.e., the first NFI in the DCI1, the NFI is not inverted. The total number of PDSCHs to be fed back by the first HARQ-ACK sub-codebook for the PDSCH group 0 is 1. The total number of PDSCHs to be fed back by the second HARQ-ACK sub-codebook for the PDSCH group 0 is determined by the first DAI and/or second DAI for the previous downlink scheduling DCI which schedules the CBG-level HARQ-ACK feedback for the PDSCH group 0, or by the third DAI which indicates the total number of PDSCHs to be fed back by the second HARQ-ACK sub-codebook for the PDSCH group 0. That is, it is determined by the first DAI and/or second DAI for the DCI2. The total number of PDSCHs to be fed back by the second HARQ-ACK sub-codebook for the PDSCH group 0 is 1. The corresponding number of bits is 4. The HARQ-ACK codebook consists of two HARQ-ACK group codebooks. The HARQ-ACK group codebook for the PDSCH group 0 consists of two HARQ-ACK sub-codebooks. The first HARQ-ACK sub-codebook has 1 bit, corresponding to the TB-level HARQ-ACK feedback for PDSCH1 scheduled by the DCI1. The second HARQ-ACK sub-codebook has 4 bits, corresponding to the CBG-level HARQ-ACK feedback for PDSCH2 scheduled by the DCI2. The HARQ-ACK group codebook for the PDSCH group 1 consists of a first HARQ-ACK sub-codebook having 1 bit, corresponding to the TB-level HARQ-ACK feedback for PDSCH3 scheduled by the DCI3.

The downlink scheduling DCI4 indicates that the first PDSCH group number is 1 and the group number of the scheduled PDSCH is 1. The HARQ-ACK feedback type indication information for the currently scheduled PDSCH indicates that the PDSCH is CBG-level HARQ-ACK feedback. The number of bits corresponding to the PDSCH for CBG-level HARQ-ACK feedback is 4. The first DAI is 1, the second DAI is 1, and the first NFI is 1. DCI4 is the first downlink scheduling DCI, which schedules the CBG-level HARQ-ACK feedback, for the PDSCH group 1. Then, the first NFI is inverted, which means that the first DAI and the second DAI are recounted. There is one PDSCH for CBG-level HARQ-ACK feedback in the PDSCH group 1. Then, the PDSCH group 1 is the first PDSCH group and the PDSCH group 0 is the second PDSCH group. The HARQ-ACK group codebook indication information for the PDSCH group indicates that HARQ-ACK is to be fed back for both the first PDSCH group and the second PDSCH group. The third DAI indicates the total number of PDSCHs to be fed back by one HARQ-ACK sub-codebook for the second PDSCH group. The type of this HARQ-ACK sub-codebook is determined by the HARQ-ACK feedback type indication information for the currently scheduled PDSCH. The type of this HARQ-ACK sub-codebook is the same as the HARQ-ACK feedback type for the currently scheduled PDSCH. This HARQ-ACK sub-codebook is the second HARQ-ACK sub-codebook. The third DAI is 1, and the second NFI is 1. Compared with the previous downlink scheduling DCI for the PDSCH group 0 which schedules the CBG-level HARQ-ACK feedback, i.e., the first NFI in the DCI2, the NFI is not inverted. The total number of PDSCHs to be fed back by the second HARQ-ACK sub-codebook for the PDSCH group 0 is 1. The total number of PDSCHs to be fed back by the first HARQ-ACK sub-codebook for the PDSCH group 0 is determined by the first DAI and/or second DAI for the previous downlink scheduling DCI which schedules the TB-level HARQ-ACK feedback for the PDSCH group 0, or by the third DAI which indicates the total number of PDSCHs to be fed back by the first HARQ-ACK sub-codebook for the PDSCH group 0. That is, it is determined by the third DAI for the DCI3. The total number of PDSCHs to be fed back by the first HARQ-ACK sub-codebook for the PDSCH group 0 is 1. The corresponding number of bits is 1. The HARQ-ACK codebook consists of two HARQ-ACK group codebooks. The HARQ-ACK group codebook for the PDSCH group 0 consists of two HARQ-ACK sub-codebooks. The first HARQ-ACK sub-codebook has 1 bit, corresponding to the TB-level HARQ-ACK feedback for PDSCH scheduled by the DCI1. The second HARQ-ACK sub-codebook has 4 bits, corresponding to the CBG-level HARQ-ACK feedback for PDSCH scheduled by the DCI2. The HARQ-ACK group codebook for the PDSCH group 1 consists of two HARQ-ACK sub-codebooks. The first HARQ-ACK sub-codebook has 1 bit, corresponding to the TB-level HARQ-ACK feedback for PDSCH scheduled by the DCI3. The second HARQ-ACK sub-codebook has 4 bits, corresponding to the CBG-level HARQ-ACK feedback for PDSCH scheduled by the DCI4.

Method 6

It is configured by higher layer signaling that the HARQ-ACK group codebook for each PDSCH group may include at most three HARQ-ACK sub-codebooks. The third HARQ-ACK sub-codebook is the HARQ-ACK feedback of an SPS PDSCH activating DCI.

It is stipulated by specifications that or it is configured by higher layer signaling that there is one PDSCH group. It is stipulated by specifications that or it is configured by higher layer signaling that the HARQ-ACK sub-codebook indication information for the second PDSCH group in the downlink scheduling DCI is 0 bit.

The principle of the NFI is the same as that described in the above embodiment. In this embodiment, the NFI is not inverted.

The number of bits corresponding to the PDSCH for TB-level HARQ-ACK feedback is 1, the number of bits corresponding to the PDSCH for CBG-level HARQ-ACK feedback is 4, and the number of bits corresponding to the SPS PDSCH activating DCI is 2.

When the downlink SCS is greater than the uplink SCS and the SPS PDSCH has a short period, for example one slot, multiple SPS PDSCHs will feed back HARQ-ACK in a same uplink time unit after the SPS PDSCHs are activated by one SPS PDSCH activating DCI. When multiple SPS PDSCHs are activated by one SPS PDSCH activating DCI to feed back HARQ-ACK in a same uplink time unit, one SPS PDSCH activating DCI corresponds to multi-bit HARQ-ACK feedback.

When multiple SPS PDSCHs are activated by one SPS PDSCH activating DCI to feed back HARQ-ACK in a same uplink time unit, the HARQ-ACK may be ordered in chronological order or according to the serial number of the SPS PDSCH configurations.

The SPS PDSCH configuration set 1 is activated by the SPS PDSCH activating DCI1 in the downlink time unit 1 to feed back HARQ-ACK in the uplink time unit 1. The first DAI is 1 and the second DAI is 1. The UE does not receive the DCI1.

The SPS PDSCH configuration set 2 is activated by the SPS PDSCH activating DCI1 in the downlink time unit 2 to feed back HARQ-ACK in the uplink time unit 1. The first DAI is 2 and the second DAI is 2. The UE receives the DCI2 successfully.

The HARQ-ACK codebook fed back by the UE is the third HARQ-ACK sub-codebook having 4 bits. The first and second bits indicate NACK, the third bit indicates the HARQ-ACK feedback for the first SPS PDSCH in the SPS PDSCH configuration set 2, and the fourth bit indicates the HARQ-ACK feedback for the second SPS PDSCH in the SPS PDSCH configuration set 2.

Similarly, for the third HARQ-ACK sub-codebook, the base station may configure, when only one PDSCH group is the feedback of HARQ-ACK, that the third DAI indicates the first DAI and/or the second DAI for the third HARQ-ACK sub-codebook for the first PDSCH group. In carrier aggregation scenarios, when only one carrier is configured with CBG-level HARQ-ACK feedback, the downlink scheduling DCI schedules the PDSCH in this carrier and this PDSCH is CBG-level HARQ-ACK feedback. It may be stipulated by specifications that or configured, by higher layer signaling that the second DAI is used to indicate the first DAI and/or the second DAI for the third HARQ-ACK sub-codebook for the first PDSCH group.

Compared with the existing solutions, by this solution, the probability for finding the missing of SPS PDSCH activating DCIs can be increased. Thus, the consistency of understanding the size of the HARQ-ACK codebook by the UE and the base station is ensured, and the reliability of the HARQ-ACK codebook is improved.

Embodiment 2

Alternatively, the receiving-side device is a user equipment (UE) and the transmitting-side device is a base station.

Alternatively, the transmitting-side device is a user equipment (UE) and the receiving-side device is a base station.

Alternatively, the receiving-side device and the transmitting-side device may be applied in V2X communication (vehicle to vehicle/infrastructure/pedestrian/network, collectively referred to as V2X).

Figure 5:
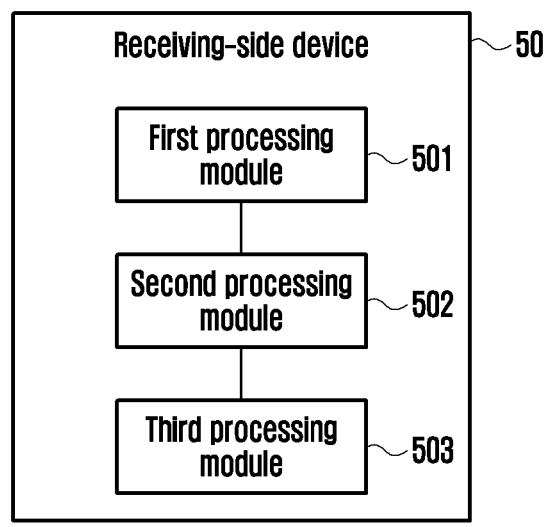
FIG. 5 is a schematic structure diagram of a receiving-side device according to an embodiment of the present application.

Based on the same inventive concept as the above embodiment, this embodiment of the present application further provides a receiving-end device. The schematic structure diagram of the receiving-end device is shown in FIG. 5. The receiving-end device 50 includes a first processing module 501, a second processing module 502 and the third processing module 503.

The first processing module 501 is configured to receive, in a downlink time unit, a physical downlink shared channel PDSCH and control signaling, which are transmitted by a transmitting side;

the second processing module 502 is configured to determine, according to the control signaling, an uplink time unit configured to feed back HARQ-ACK corresponding to the received PDSCH and an HARQ-ACK codebook corresponding to the uplink time unit, the size of the HARQ-ACK codebook being determined by at least one of a first downlink assignment index (DAI), a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for TB-level HARQ-ACK feedback, and the number of bits corresponding to a PDSCH for CBG-level HARQ-ACK feedback;

the third processing module 503 is configured to transmit HARQ-ACK information corresponding to the HARQ-ACK codebook over a physical uplink control channel (PUCCH) or physical uplink shared channel (PUSCH) in the uplink time unit.

Alternatively, the HARQ-ACK sub-codebook indication information for a second PDSCH group indicates at least one of the number of HARQ-ACK sub-codebooks for the second PDSCH group and the type of HARQ-ACK sub-codebooks included in the HARQ-ACK group codebooks for the second PDSCH group, the HARQ-ACK sub-codebooks including at least one of a first HARQ-ACK sub-codebook and a second HARQ-ACK sub-codebook.

Alternatively, the HARQ-ACK codebook includes at least one of an HARQ-ACK group codebook for a first PDSCH group and an HARQ-ACK group codebook for a second PDSCH group; the HARQ-ACK group codebook for the second PDSCH group includes at least one of a first HARQ-ACK sub-codebook and a second HARQ-ACK sub-codebook; and the number for the second PDSCH group is indicated by a first PDSCH group number in downlink control information DCI configured to schedule a PDSCH in the second PDSCH group.

Alternatively, the way of determining the HARQ-ACK group codebook for the second PDSCH group includes:

configuring, by a base station and through higher layer signaling that the HARQ-ACK group codebook for the second PDSCH group includes one HARQ-ACK sub-codebook; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the type of the HARQ-ACK sub-codebook included in the HARQ-ACK group codebook for the second PDSCH group, the third DAI being indicative of the total number of PDSCHs to be fed back by the HARQ-ACK sub-codebook.

Alternatively, the way of determining the HARQ-ACK group codebook for the second PDSCH group includes:

configuring, by the base station and through higher layer signaling that the HARQ-ACK group codebook for the second PDSCH group includes one HARQ-ACK sub-codebook or two HARQ-ACK sub-codebooks; and configuring, by the base station and through higher layer signaling that the HARQ-ACK sub-codebook indication information for the second PDSCH group in the DCI is 1 bit, the HARQ-ACK sub-codebook indication information for the second PDSCH group being indicative of the number of HARQ-ACK sub-codebooks for the second PDSCH group, the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the way of determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by one HARQ-ACK sub-codebook included in the HARQ-ACK group codebook for the second PDSCH group, the type of the HARQ-ACK sub-codebook being determined by the HARQ-ACK feedback type indication information for the currently scheduled PDSCHs.

Alternatively, the way of determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit (or, configuring, by the base station and through higher layer signaling that there is no HARQ-ACK sub-codebook indication information for the second PDSCH group in the DCI), the third DAI being indicative of the total number of PDSCHs to be fed back by a first HARQ-ACK sub-codebook included in the HARQ-ACK group codebook for the second PDSCH group and the total number of PDSCHs to be fed back by a second HARQ-ACK sub-codebook included in the HARQ-ACK group codebook for the second PDSCH group.

Alternatively, the way of determining the HARQ-ACK group codebook for the second PDSCH group includes:

configuring, by the base station and through higher layer signaling that the HARQ-ACK group codebook for the second PDSCH group may include zero HARQ-ACK sub-codebook, one first HARQ-ACK sub-codebook, one second HARQ-ACK sub-codebook or two HARQ-ACK sub-codebooks; and configuring, by the base station and through higher layer signaling that the HARQ-ACK sub-codebook indication information for the second PDSCH group in the DCI is 2 bits, the HARQ-ACK sub-codebook indication information for the second PDSCH group being indicative of the number and type of HARQ-ACK sub-codebooks for the second PDSCH group, the third DAI being indicative of the total number of PDSCHs to be fed back by one or two HARQ-ACK sub-codebooks included in the HARQ-ACK group codebook for the second PDSCH group, and when there is one HARQ-ACK sub-codebook, the type of the HARQ-ACK sub-codebook being determined by the HARQ-ACK feedback type indication information for the currently scheduled PDSCHs.

Alternatively, the way of determining the HARQ-ACK group codebook for the second PDSCH group includes:

configuring, by the base station and through higher layer signaling that the HARQ-ACK group codebook for the second PDSCH group includes two HARQ-ACK sub-codebooks; and configuring, by the base station and through higher layer signaling that the HARQ-ACK sub-codebook indication information for the second PDSCH group in the DCI is 0 bit, the third DAI being indicative of the total number of PDSCHs to be fed back by both a first HARQ-ACK sub-codebook and a second HARQ-ACK sub-codebook included in the HARQ-ACK group codebook for the second PDSCH group.

The content, not detailed in the description of the receiving-end device in this embodiment of the present application, may refer to the description of the method for transmitting HARQ-ACK. The beneficial effects that can be achieved by the receiving-end device in this embodiment of the present application are the same as those achieved by the method for transmitting HARQ-ACK, and will not be repeated here.

This embodiment of the present invention at least has the following beneficial effects.

The determination of an HARQ-ACK codebook corresponding to an uplink time unit is realized, and thus the effective utilization of uplink control channel resources is ensured.

Figure 6:
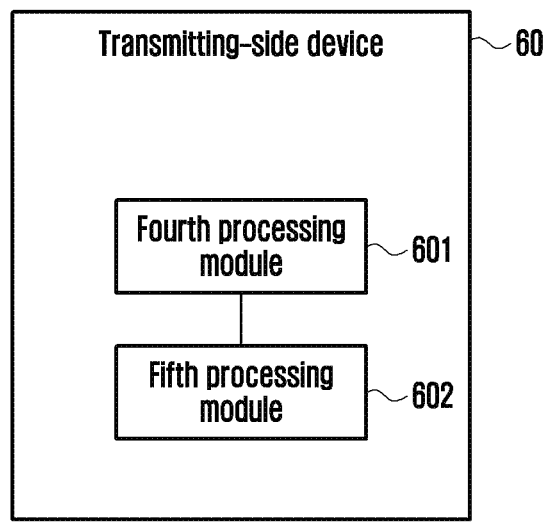
FIG. 6 is a schematic structure diagram of a transmitting-side device according to an embodiment of the present application.

Based on the same inventive concept as the above embodiment, this embodiment of the present application further provides a transmitting-end device. The schematic structure diagram of the transmitting-end device is shown in FIG. 6. The transmitting-end device 60 includes a fourth processing module 601 and a fifth processing module 602.

The fourth processing module 601 is configured to transmit a PDSCH and control signaling to a receiving-side device, the control signaling including at least one of HARQ-ACK timing information, a first DAI, a second DAI, a third DAI, a first PDSCH group number, a first NFI, a second NFI, HARQ-ACK group codebook indication information for a PDSCH group, HARQ-ACK feedback type indication information for currently scheduled PDSCHs, HARQ-ACK sub-codebook indication information for a second PDSCH group, the number of bits corresponding to a PDSCH for TB-level HARQ-ACK feedback, and the number of bits corresponding to a PDSCH for CBG-level HARQ-ACK feedback; and the fifth processing module 602 is configured to receive HARQ-ACK information corresponding to an HARQ-ACK codebook transmitted by the receiving-side device.

The content, not detailed in the description of the transmitting-end device in this embodiment of the present application, may refer to the description of the method for transmitting HARQ-ACK. The beneficial effects that can be achieved by the transmitting-end device in this embodiment of the present application are the same as those achieved by the method for transmitting HARQ-ACK, and will not be repeated here.

This embodiment of the present invention at least has the following beneficial effects.

The determination of an HARQ-ACK codebook corresponding to an uplink time unit is realized, and thus the effective utilization of uplink control channel resources is ensured.

Embodiment 3

Figure 7:
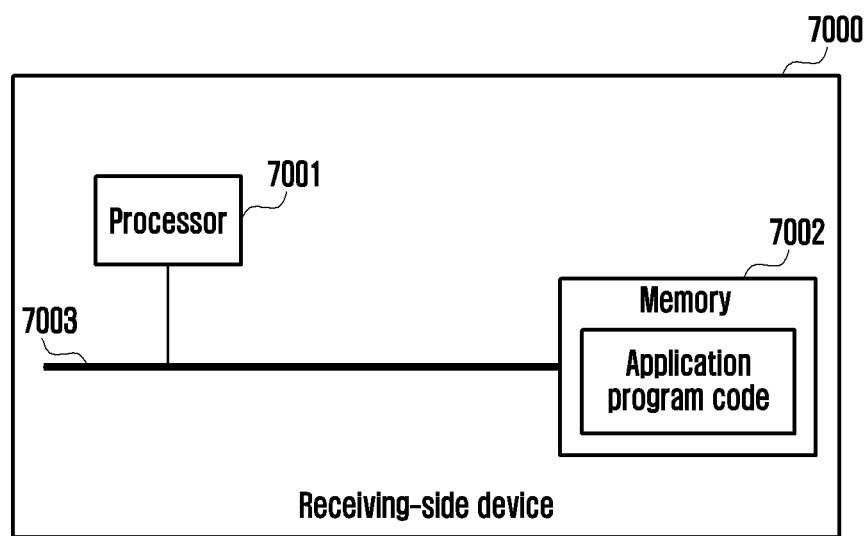
FIG. 7 is a schematic structure diagram of a receiving-side device according to an embodiment of the present application.

Based on the same inventive concept, this embodiment of the present application further provides a receiving-side device. The schematic structure diagram of the receiving-side device is shown in FIG. 7. The receiving-side device 7000 includes at least one processor 7001, a memory 7002 and a bus 7003. The at least one processor 7001 is electrically connected to the memory 7002. The memory 7002 is configured to store at least one computer-executable instruction. The processor 7001 is configured to execute the at least one computer-executable instruction, so as to execute steps of any method for transmitting HARQ-ACK as provided in any embodiment or any optional implementation in Embodiment 1 of the present application.

Further, the processor 7001 may be a field-programmable gate array (FPGA) or other devices having a logic processing capability, for example, a microcontroller unit (MCU), a central process unit (CPU).

This embodiment of the present invention at least has the following beneficial effects.

The determination of an HARQ-ACK codebook corresponding to an uplink time unit is realized, and thus the effective utilization of uplink control channel resources is ensured.

Figure 8:
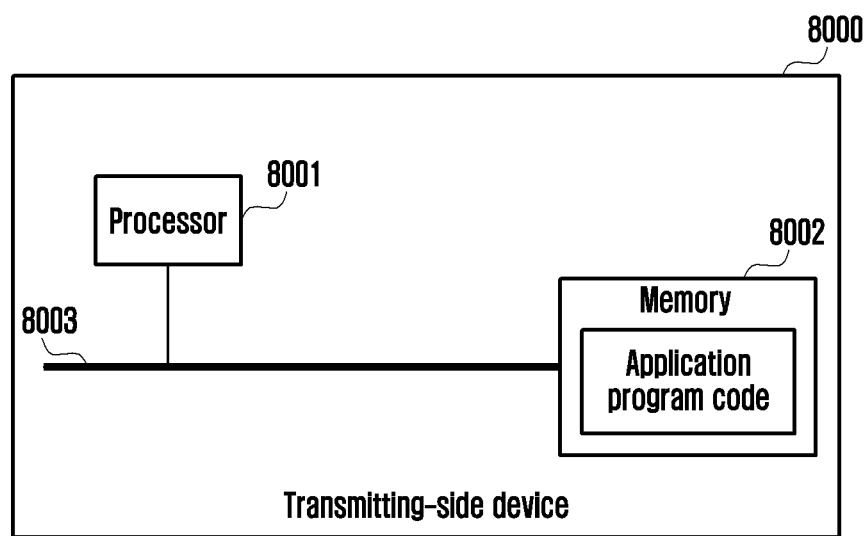
FIG. 8 is a schematic structure diagram of a transmitting-side device according to an embodiment of the present application.

Based on the same inventive concept, this embodiment of the present application further provides a transmitting-side device. The schematic structure diagram of the transmitting-side device is shown in FIG. 8. The transmitting-side device 8000 includes at least one processor 8001, a memory 8002 and a bus 8003. The at least one processor 8001 is electrically connected to the memory 8002. The memory 8002 is configured to store at least one computer-executable instruction. The processor 8001 is configured to execute the at least one computer-executable instruction, so as to execute steps of any method for transmitting HARQ-ACK as provided in any embodiment or any optional implementation in Embodiment 1 of the present application.

Further, the processor 8001 may be a field-programmable gate array (FPGA) or other devices having a logic processing capability, for example, a microcontroller unit (MCU), a central process unit (CPU).

This embodiment of the present invention at least has the following beneficial effects.

The determination of an HARQ-ACK codebook corresponding to an uplink time unit is realized, and thus the effective utilization of uplink control channel resources is ensured.

Figure 9:
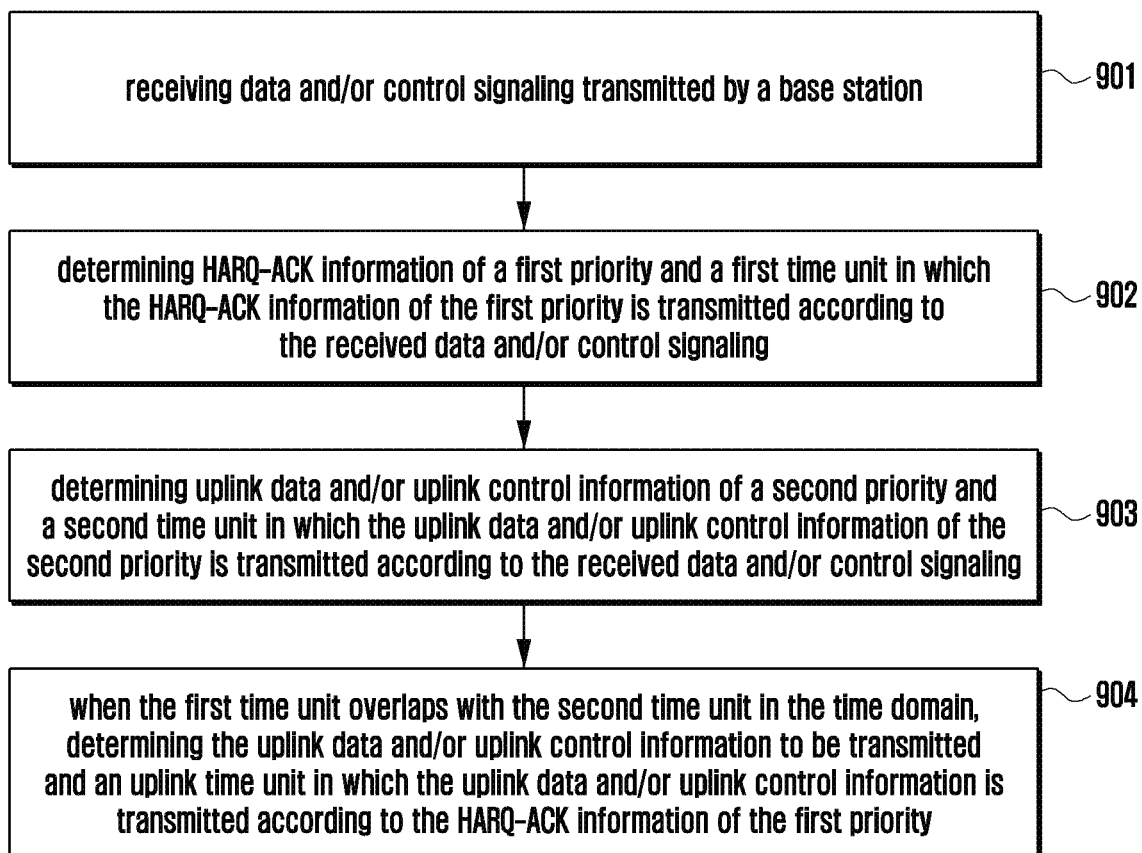
FIG. 9 is a flowchart of an uplink transmission method according to an embodiment of the present disclosure.

FIG. 9 is a flowchart of a transmission method according to an embodiment of the present disclosure.

In the present disclosure, a first transceiver node may be a UE (User Equipment), and a second transceiver node may be a BS (Base Station). In the following example, the UE is taken as an example to illustrate the first transceiver node (but which is not limited thereto), and the BS is taken as an example to illustrate the second transceiver node (but which is not limited thereto), but this is only exemplary, and the method of the present disclosure can be applied to communications between various same and/or different transceiver nodes.

First information may be data and/or control signaling transmitted by the second transceiver node to the first transceiver node. In the following example, downlink data and/or control signaling is taken as an example to illustrate the first information (but which is not limited thereto). The downlink data carried by a PDSCH (Physical Downlink Shared CHannel) is taken as an example to illustrate data in the first information (but which is not limited thereto). The downlink control signaling is taken as an example to illustrate control signaling in the first information (but which is not limited thereto). The downlink control signaling may be DCI (Downlink control information) carried by a PDCCH (Physical Downlink Control CHannel) and/or control signaling carried by a PDSCH (Physical Downlink Shared CHannel). For downlink data scheduling based on a TB (Transport Block) level, each TB corresponds to 1-bit HARQ-ACK information; for downlink data scheduling based on a CBG (Code Block Group) level, each CBG corresponds to 1-bit HARQ-ACK information; and for DCI indicating SPS (Semi-Persistent Scheduling) PDSCH release, each DCI corresponds to 1-bit HARQ-ACK information. When the HARQ-ACK information is fed back for the downlink data and/or the DCI indicating SPS PDSCH release in the same uplink time unit, a HARQ-ACK codebook is generated according to the HARQ-ACK information fed back for the downlink data and/or the DCI indicating the SPS PDSCH release in the same uplink time unit.

Second information may be data and/or control signaling transmitted by the first transceiver node to the second transceiver node. In the following example, uplink data and/or control signaling is taken as an example to illustrate the second information (but which is not limited thereto). The uplink data carried by a PUSCH (Physical Uplink Shared CHannel) is taken as an example to illustrate data in the second information (but which is not limited thereto). The uplink control signaling is taken as an example to illustrate control signaling in the second information (but which is not limited thereto. The uplink control signaling may be UCI (Uplink control information) carried by a PUCCH (Physical Uplink Control CHannel) and/or control signaling carried by a PUSCH (Physical Uplink Shared CHannel). The uplink control information may be SR (Scheduling Request) information, and/or HARQ-ACK information, and/or CSI (Chanel State Information). The HARQ-ACK information is a set of HARQ-ACK information of all of PDSCH(s) and/or DCI(s), and the HARQ-ACK information contains a HARQ-ACK codebook.

A first priority can be specified by a protocol or configured by higher layer signaling. The first priority can be a high priority, and the first priority can also be a low priority.

A second priority can be specified by a protocol or configured by higher layer signaling. The second priority can be a high priority, and the second priority can also be a low priority.

The first priority may be higher than the second priority, or the first priority may be equal to the second priority.

A time unit can be one or more slots, one or more sub-slots, one or more OFDM (Orthogonal Frequency Division Multiplexing) symbols, or one or more sub-frames. The time unit may contain a first time unit and a second time unit.

The first time unit may be a time unit in which the first transceiver node transmits the second information of the first priority. In the following example, the first time unit is illustrated by taking the time unit in which the UE transmits the second information of the first priority as an example (but is not limited thereto).

The second time unit may be a time unit in which the first transceiver node transmits the second information of the second priority. In the following example, the second time unit is illustrated by taking the time unit in which the UE transmits the second information of the second priority as an example (but is not limited thereto).

The first time unit and the second time unit may adopt the same time granularity, or may also adopt different time granularities. For example, the units of the first time unit and the second time unit may both be a slot. For another example, the unit of the first time unit may be a sub-slot, and the unit of the second time unit may be a slot.

Depending on a network type, the term "base station" or "BS" can refer to any component (or a set of components) that is configured to provide wireless access to a network, such as a transmission point (TP), a transmission-reception point (TRP), an enhanced base station (eNodeB or eNB), a 5G base station (gNB), a macro cell, a femto cell, a WiFi access point (AP) or other wirelessly enabled devices. The base station can provide wireless access according to one or more wireless communication protocols, for example, 5G 3GPP New Radio Interface/Access (NR), Long Term Evolution (LTE), Advanced LTE (LTE-A), High Speed Packet Access (HSPA), Wi-Fi 802.11a/b/g/n/ac, etc. For convenience, the terms "BS" and "TRP" can be used interchangeably in the present patent document to refer to network infrastructure components that provide wireless access for remote terminals. In addition, depending on the network type, the term "user equipment" or "UE" can refer to any of the following components, such as "a mobile station", "a subscriber station", "a remote terminal", "a wireless terminal", "a reception point", "a user equipment" or simply "a terminal". For convenience, the term "user equipment" or "UE" is used in the present patent document to refer to a remote wireless device that wirelessly accesses the BS, regardless of whether the UE is a mobile device (such as a mobile phone or a smart phone) or is a generally-considered fixed device (for example, a desktop computers or a vending machine).

Referring to FIG. 9, the specific steps of the present disclosure are as follows.

At step 901, a UE receives data and/or control signaling transmitted by a base station.

At step 902, the UE determines HARQ-ACK information of a first priority and a first time unit in which the HARQ-ACK information of the first priority is transmitted, according to the received data and/or control signaling transmitted by the base station.

At step 903, the UE determines uplink data and/or uplink control information of a second priority and a second time unit in which the uplink data and/or uplink control information of the second priority is transmitted, according to the received data and/or control signaling transmitted by the base station.

At step 904, when the first time unit overlaps with the second time unit in the time domain, the UE may determine uplink data and/or uplink control information to be transmitted and an uplink time unit in which the uplink data and/or uplink control information is transmitted, according to the HARQ-ACK information of the first priority. For example, through configuration by higher layer signaling or dynamic indication by DCI (Downlink Control Information), the UE can be notified of the determined the uplink data and/or uplink control information to be transmitted and the uplink time unit of the uplink data and/or the uplink control information to be transmitted according to the HARQ-ACK information of the first priority. However, the above notification method is only exemplary, but is not used to limit the present disclosure. Therefore, in the embodiments of the present disclosure, any appropriate predetermined method may be adopted to notify the UE of the determined the uplink data and/or uplink control information to be transmitted and the uplink time unit of the uplink data and/or uplink control information to be transmitted according to the HARQ-ACK information of the first priority. As those skilled in the art will understand, any existing methods and any possible notification methods generated with the development of technology are all included in the scope of the present disclosure.

Figure 10:
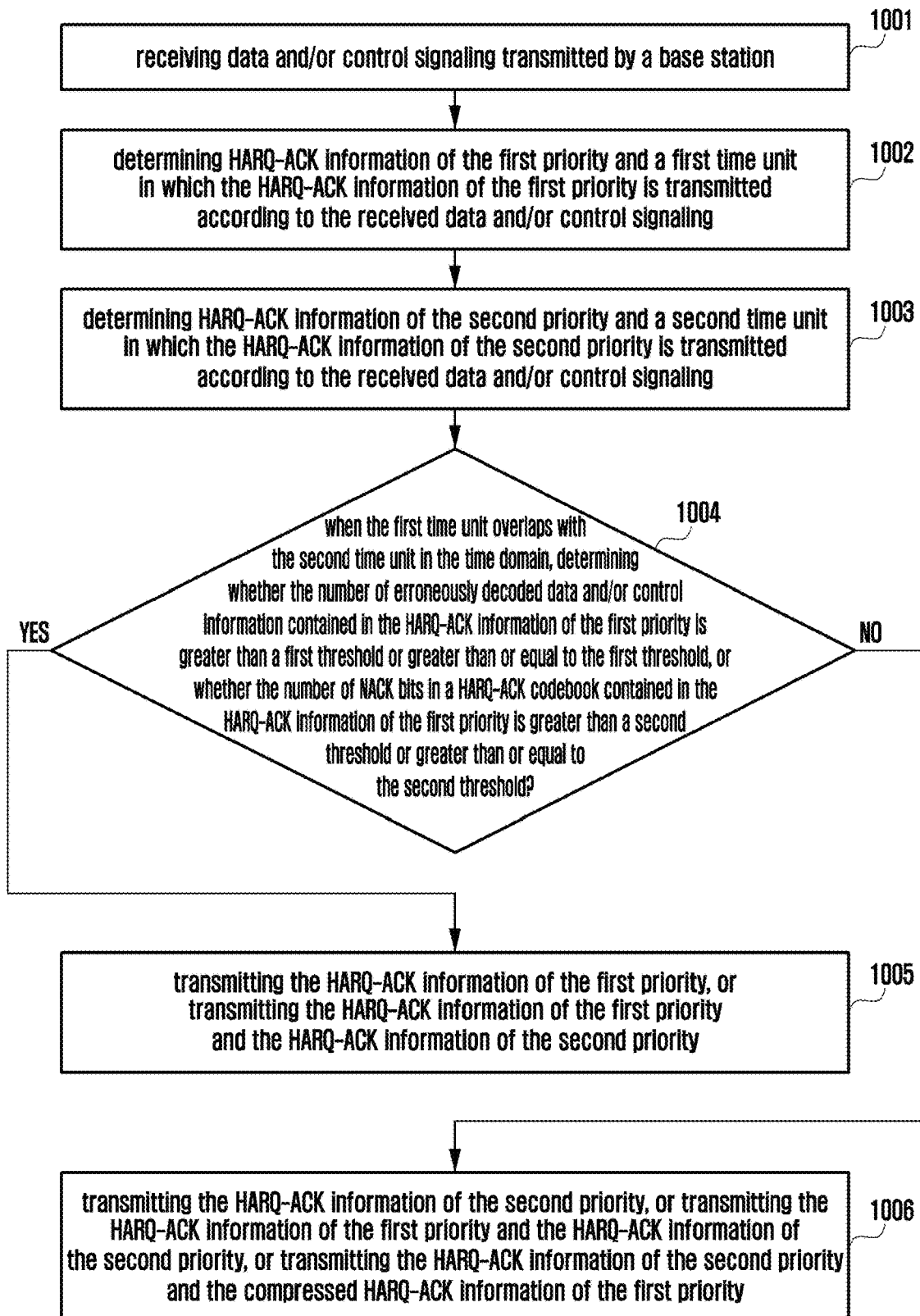
FIG. 10 is a flowchart of a transmission method according to another embodiment of the present disclosure.

FIG. 10 is a flowchart of a transmission method according to another embodiment of the present disclosure. Hereinafter, the another exemplary embodiment according to the present disclosure will be described with reference to FIG. 10.

In the present embodiment, a first priority is a high priority, and a second priority is a low priority.

At step 1001, a UE receives data and/or control signaling transmitted by a base station.

At step 1002, the UE determines HARQ-ACK information of the first priority and a first time unit in which the HARQ-ACK information of the first priority is transmitted, according to the received data and/or control signaling transmitted by the base station. At this time, the first time unit in which the HARQ-ACK information of the first priority is transmitted is the OFDM symbols 4 and 5 of the slot 0.

At step 1003, the UE determines HARQ-ACK information of the second priority and a second time unit in which the HARQ-ACK information of the second priority is transmitted, according to the received data and/or control signaling transmitted by the base station. At this time, the second time unit in which the HARQ-ACK information of the second priority is transmitted is the OFDM symbols 4, 5, 6 and 7 of the slot 0.

At step 1004, when the first time unit overlaps with the second time unit in the time domain, the UE may determine the HARQ-ACK information to be transmitted and an uplink time unit in which the HARQ-ACK information is transmitted, according to the HARQ-ACK information of the first priority. The determined HARQ-ACK information to be transmitted may be the HARQ-ACK information of the first priority; the determined HARQ-ACK information to be transmitted may also be the HARQ-ACK information of the second priority; the determined HARQ-ACK information to be transmitted may also be the HARQ-ACK information of the first priority and the HARQ-ACK information of the second priority.

In the prior art, when the first time unit in which the HARQ-ACK information of the first priority is transmitted overlaps with the second time unit in which the HARQ-ACK information of the second priority is transmitted in the time domain, the HARQ-ACK information of high priority will be transmitted, and the HARQ-ACK information of low priority will not be transmitted. Such manner will cause the performance loss of services of the low priority. For example, the transmission latency of the services of the low priority is increased. Such manner will also cause a decrease in the system's spectrum efficiency. For example, when a PDSCH of the low priority is successfully received, the HARQ-ACK information that the UE feeds back to the base station is an ACK. Since there is a conflict with the HARQ-ACK information of the high priority, the UE only transmits the HARQ-ACK information of the high priority, but does not transmit the HARQ-ACK information of the low priority. The base station will think that the PDSCH has not been successfully transmitted, so retransmit the PDSCH, thereby reducing the spectrum efficiency.

In a communication system, a HARQ-based retransmission is an important mechanism to ensure data transmission, and HARQ-ACK information is an important part of the retransmission mechanism of the HARQ, and belongs to information that needs to be transmitted preferentially. The importance of the positive acknowledgement ACK information and the negative acknowledgement NACK information in the HARQ-ACK information is different from each other. After a PDSCH is successfully received, regardless of whether the base station receives the ACK transmitted by the UE, the UE can transmit information of the received PDSCH to a higher layer. Whether the base station receives the ACK transmitted by the UE does not affect the user plane latency of the downlink data and the reliability of the downlink data transmission. Whether the base station receives the NACK transmitted by the UE will directly affect the user plane latency of the downlink data and the reliability of the downlink data transmission. At the same time, in a scenario of the URLLC in a NR system, in order to ensure ultra-high reliability, the correct decoding rate of data transmission has been as high as 99.99999%. Based on the above knowledge, when solving the above technical problems, the inventor of the present application, while considering the high priority of URLLC services, further treated the ACK information and the NACK information in the HARQ-ACK information differently. Therefore, the inventor of the present application proposes that different overlapping conflict solutions are employed by adopting a predefined manner according to different contents of the HARQ-ACK information, for example, according to whether the number of erroneously decoded data and/or control information contained in the HARQ-ACK information is greater than a predetermined threshold or greater than or equal to the predetermined threshold. For another example, according to whether the number of correctly decoded data and/or control information contained in the HARQ-ACK information is greater than a predetermined threshold or greater than or equal to the predetermined threshold, different overlapping conflict solutions are adopted. For another example, according to whether the number of NACK bits (for example, bit 0 can be used to represent a NACK bit in a codebook in the art) in a HARQ-ACK codebook contained in the HARQ-ACK information is greater than a predetermined threshold number or greater than or equal to the predetermined threshold number, different overlapping conflict solutions are adopted. For another example, according to whether the number of ACK bits (for example, bit 1 can be used to represent an ACK bit in the codebook in the art) in the HARQ-ACK codebook contained in the HARQ-ACK information is greater than a predetermined threshold number or greater than or equal to the predetermined threshold number, different overlapping conflict solutions are adopted. For example, specifically, in step 1004, different overlapping conflict solutions can be used according to whether the number of erroneously decoded data and/or control information contained in the HARQ-ACK information is greater than a predetermined threshold. When the predetermined threshold is 0, the HARQ-ACK information can be divided into two types, one is that all the data and/or control information are decoded correctly, and the other is that not all the data and/or control information are decoded correctly. When the predetermined threshold is 1, the HARQ-ACK information can be divided into two types, one is that at most one piece of data and/or control information is decoded erroneously, and the other is that at least two pieces of data and/or control information are decoded erroneously. For example, specifically, in step 1004, different overlapping conflict solutions may be used according to whether the number of NACKs in the HARQ-ACK codebook contained in the HARQ-ACK information is greater than or equal to the predetermined threshold. When the predetermined threshold is 1, the HARQ-ACK information can be divided into two types, one is that all pieces of bit information in the HARQ-ACK codebook are ACKs, and the other is that at least one piece of the bit information in the HARQ-ACK codebook is NACK. When the predetermined threshold is 2, the HARQ-ACK information can be divided into two types, one is that at most one piece of the bit information in the HARQ-ACK codebook is NACK, and the other is that at least two pieces of the bit information in the HARQ-ACK codebook are NACKs. It should be noted that the specific numerical value examples of respective predetermined thresholds disclosed above are only used to illustrate the idea of the present disclosure, but do not to limit the scope of the present disclosure. In the present disclosure, the above-mentioned plurality of predetermined thresholds may adopt any appropriate numerical values, and these numerical values may be the same or different. In addition, any appropriate predetermined method can be used to provide these predetermined thresholds to the UE. For example, they can be specified by a protocol, or can be configured by higher layer signaling, or can be dynamically indicated by DCI, and so on, and these predetermined thresholds can be provided in the same parameter or signaling, or can also be provided in different parameters or signaling. However, the above manners are only exemplary, but are not used to limit the present disclosure. Any existing manners and any possible manners generated with the development of technology are all included in the scope of the present disclosure.

When at least one bit of the information bits in the HARQ-ACK codebook of the first priority is NACK or when not all the data and/or control information that need to be fed back are decoded correctly, any appropriate predetermined method can be adopted to notify the UE of the manner of transmitting the uplink information. For example, one of the following two manners can be adopted in step 1005. Which manner of transmitting the uplink information is to be adopted specifically can be notified by a method such as specification by a protocol, or configuration by higher layer signaling, or dynamic indication by DCI. However, the above notification methods are only exemplary, but are not used to limit the present disclosure. Any existing methods and any possible notification methods generated with the development of technology are all included in the scope of the present disclosure.

Manner 1

The UE transmits the HARQ-ACK information of the first priority in the first time unit. The UE may not transmit the HARQ-ACK information of the second priority, and the UE may also delay transmitting the HARQ-ACK information of the second priority.

Manner 2

The UE simultaneously transmits the HARQ-ACK information of the first priority and the HARQ-ACK information of the second priority. The HARQ-ACK information of the first priority and the HARQ-ACK information of the second priority can be combined into one piece of HARQ-ACK information of a third priority in a manner of multiplexing. The third priority may be the same as the first priority, and the third priority may also be the same as the second priority. The HARQ-ACK information of the third priority may be transmitted in the first time unit or the second time unit. Whether the HARQ-ACK information of the third priority is transmitted in the first time unit or the second time unit may be specified by a protocol, or may be configured by higher layer signaling, or may be dynamically indicated by DCI.

When all the information bits in the HARQ-ACK codebook of the first priority are ACKs or when all the data and/or control information that need to be fed back are decoded correctly, any appropriate predetermined methods may be adopted to notify the UE of the manner of transmitting the uplink information. For example, in step 1006, one of the following three manners of transmitting the uplink information may be adopted. Which manner of transmitting the uplink information is to be adopted specifically can be notified by a method such as specification by a protocol, or configuration by higher layer signaling, or dynamic indication by DCI. However, the above notification methods are only exemplary and but are not used to limit the present disclosure. Any existing methods and any possible notification methods generated with the development of technology are all included in the scope of the present disclosure.

Manner 1

The UE transmits the HARQ-ACK information of the second priority in the second time unit. The UE may not transmit the HARQ-ACK information of the first priority, and the UE may also delay transmitting the HARQ-ACK information of the first priority.

Manner 2

The UE simultaneously transmits the HARQ-ACK information of the first priority and the HARQ-ACK information of the second priority. The HARQ-ACK information of the first priority and the HARQ-ACK information of the second priority can be combined into one piece of HARQ-ACK information of the third priority in a manner of multiplexing. The third priority may be the same as the first priority, and the third priority may also be the same as the second priority. The HARQ-ACK information of the third priority may be transmitted in the first time unit or the second time unit. Whether the HARQ-ACK information of the third priority is transmitted in the first time unit or the second time unit may be specified by a protocol, or may be configured by higher layer signaling, or may be dynamically indicated by DCI.

Manner 3

The UE simultaneously transmits the HARQ-ACK information of the second priority and the compressed HARQ-ACK information of the first priority. The compressed HARQ-ACK information of the first priority can be a 1-bit ACK (using a manner of bundling), the compressed HARQ-ACK information of the first priority can also be the number of bits of the HARQ-ACK codebook of the first priority, and the compressed HARQ-ACK information of the first priority may also be the X Least Significant Bits (LSB) of the number of bits of the HARQ-ACK codebook of the first priority. By simultaneously transmitting the HARQ-ACK information of the second priority and the compressed HARQ-ACK information of the first priority, channel resources are effectively utilized while the communication quality is ensured and the communication delay is reduced.

It should be explained that the first time unit corresponds to uplink physical resources of the first priority, and the second time unit corresponds to uplink physical resources of the second priority. The uplink physical resources may be PUCCH resources, and the uplink physical resources may also be PUSCH resources.

In the present embodiment, the HARQ-ACK information of the first priority conflicts with the HARQ-ACK information of the second priority in the time domain. By selecting the HARQ-ACK information to be transmitted according to the HARQ-ACK information of the first priority, the spectrum efficiency of the system may be improved and the average latency of the system may be reduced on the premise of ensuring the transmission of the HARQ-ACK information of the first priority. The present embodiment also provides many solutions. The network can select specific solution through configuration by higher layer signaling, thereby increasing a flexibility of network scheduling.

Figure 11:
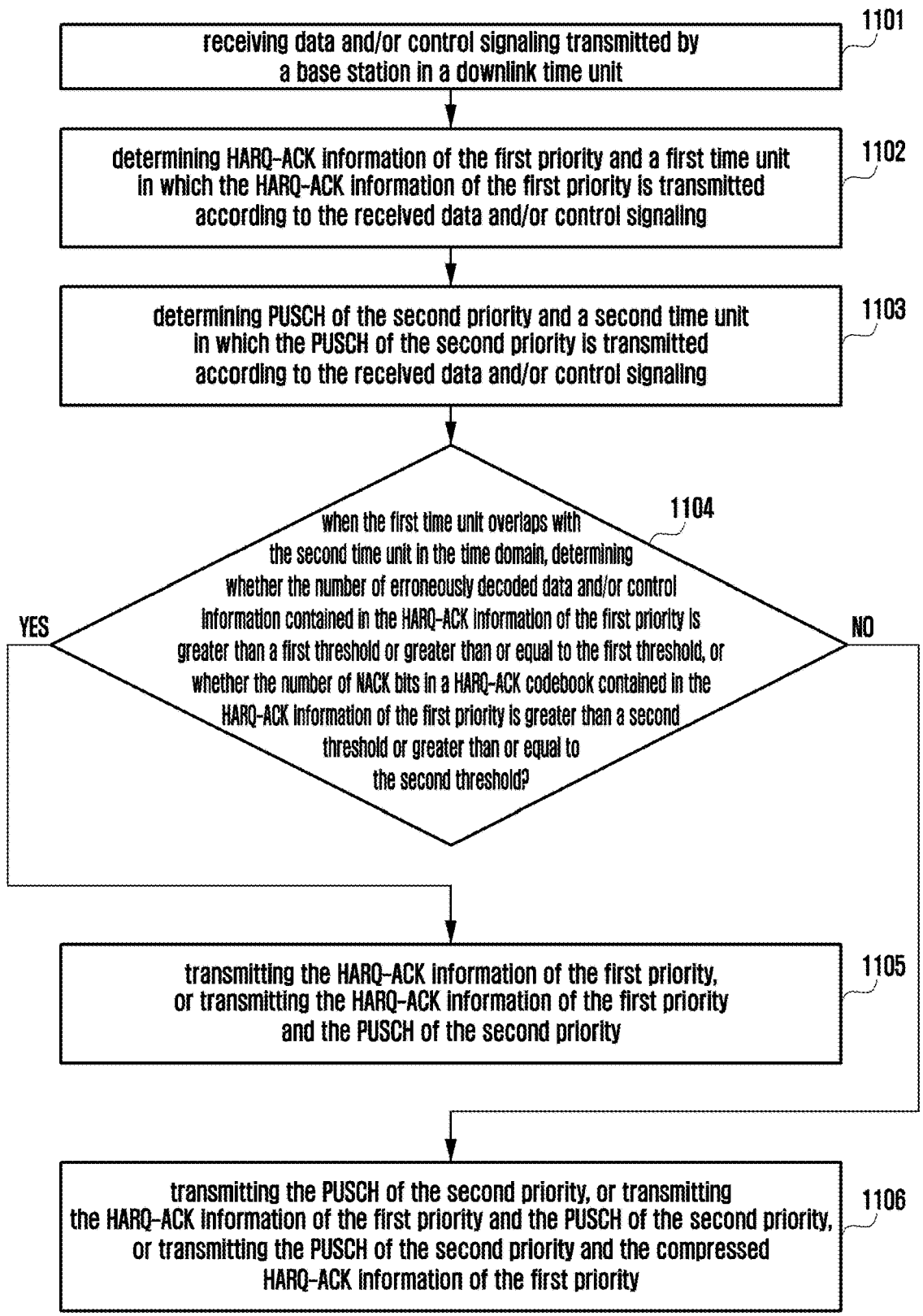
FIG. 11 is a flowchart of a transmission method according to another embodiment of the present disclosure.

FIG. 11 is a flowchart of a transmission method according to another embodiment of the present disclosure. Hereinafter, the another exemplary embodiment according to the present disclosure will be described with reference to FIG. 11.

In the present embodiment, a first priority is a high priority, a second priority is a low priority, or the second priority is a high priority.

At step 1101, a UE receives data and/or control signaling transmitted by a base station in a downlink time unit.

At step 1102, the UE determines HARQ-ACK information of the first priority and a first time unit in which the HARQ-ACK information of the first priority is transmitted, according to the received data and/or control signaling transmitted by the base station. At this time, the first time unit in which the HARQ-ACK information of the first priority is transmitted is the OFDM symbols 4 and 5 of the slot 0.

At step 1103, the UE determines a PUSCH of the second priority and a second time unit in which the PUSCH of the second priority is transmitted, according to the received data and/or control signaling transmitted by the base station. At this time, the second time unit in which the PUSCH of the second priority is transmitted is the OFDM symbols 4, 5, 6 and 7 of the slot 0.

At step 1104, when the first time unit overlaps with the second time unit in the time domain, the UE may determine the HARQ-ACK information and/or a PUSCH to be transmitted and a time unit in which the HARQ-ACK information and/or the PUSCH according to the HARQ-ACK information of the first priority is transmitted. According to the inventive idea of the present disclosure, different overlapping conflict solutions can be adopted according to different contents of the HARQ-ACK information, for example, according to the number of ACK bits and/or NACK bits and/or whether all the HARQ-ACK information are ACKs. For example, according to whether the number of erroneously decoded data and/or control information contained in the HARQ-ACK information is greater than a predetermined threshold or greater than or equal to the predetermined threshold, different overlapping conflict solutions are employed. For another example, according to whether the number of correctly decoded data and/or control information contained in the HARQ-ACK information is greater than a predetermined threshold or greater than or equal to the predetermined threshold, different overlapping conflict solutions are adopted. For another example, according to whether the number of NACK bits (for example, bit 0 can be used to represent a NACK bit in a codebook in the art) in a HARQ-ACK codebook contained in the HARQ-ACK information is greater than a predetermined threshold number or greater than or equal to the predetermined threshold number, different overlapping conflict solutions are adopted. For another example, according to whether the number of ACK bits (for example, bit 1 can be used to represent an ACK bit in the codebook in the art) in the HARQ-ACK codebook contained in the HARQ-ACK information is greater than a predetermined threshold number or greater than or equal to the predetermined threshold number, different overlapping conflict solutions are adopted. For example, specifically, in step 1104, different overlapping conflict solutions can be used according to whether the number of erroneously decoded data and/or control information contained in the HARQ-ACK information is greater than a predetermined threshold. When the predetermined threshold is 0, the HARQ-ACK information can be divided into two types, one is that all the data and/or control information are decoded correctly, and the other is that not all the data and/or control information are decoded correctly.

When the predetermined threshold is 1, the HARQ-ACK information can be divided into two types, one is that at most one piece of data and/or control information is decoded erroneously, and the other is that at least two pieces of data and/or control information are decoded erroneously. For example, specifically, in step 1104, different overlapping conflict solutions may be used according to whether the number of NACKs in the HARQ-ACK codebook contained in the HARQ-ACK information is greater than or equal to the predetermined threshold. When the predetermined threshold is 1, the HARQ-ACK information can be divided into two types, one is that all pieces of bit information in the HARQ-ACK codebook are ACKs, and the other is that at least one piece of the bit information in the HARQ-ACK codebook is NACK. When the predetermined threshold is 2, the HARQ-ACK information can be divided into two types, one is that at most one piece of the bit information in the HARQ-ACK codebook is NACK, and the other is that at least two pieces of the bit information in the HARQ-ACK codebook are NACKs. It should be noted that the specific numerical value examples of respective predetermined thresholds disclosed above are only used to illustrate the idea of the present disclosure, but do not to limit the scope of the present disclosure. In the present disclosure, the above-mentioned plurality of predetermined thresholds may adopt any appropriate numerical values, and these numerical values may be the same or different. In addition, any appropriate predetermined method can be used to provide these predetermined thresholds to the UE. For example, they can be specified by a protocol, or can be configured by higher layer signaling, or can be dynamically indicated by DCI, and so on, and these predetermined thresholds can be provided in the same parameter or signaling, or can also be provided in different parameters or signaling. However, the above manners are only exemplary, but are not used to limit the present disclosure. Any existing manners and any possible manners generated with the development of technology are all included in the scope of the present disclosure.

In the present embodiment, higher layer signaling configures the HARQ-ACK codebook of the first priority as a dynamic codebook (3GPP TS38.213 Dynamic/Type-2 HARQ-ACK codebook).

For example, when at least one information bit in the HARQ-ACK codebook of the first priority is NACK, any appropriate predetermined method may be adopted to notify the UE of the manner of transmitting uplink information. For example, one of the following two manners can be adopted in step 1105. Which manner of transmitting the uplink information is to be adopted specifically can be notified by a method, such as specification by a protocol, or configuration by higher layer signaling, or dynamic indication by DCI. However, the above notification methods are only exemplary but are not used to limit the present disclosure. Any existing methods and any possible notification methods generated with the development of technology are all included in the scope of the present disclosure.

Manner 1

The UE transmits the HARQ-ACK information of the first priority in the first time unit. The UE may not transmit the PUSCH of the second priority, and the UE may also delay transmitting the PUSCH of the second priority.

Manner 2

The UE simultaneously transmits the HARQ-ACK information of the first priority and the PUSCH of the second priority. A manner of multiplexing is adopted for the HARQ-ACK information of the first priority and the PUSCH of the second priority.

A set of offsets beta-offsets related to the manner of multiplexing can be configured by higher layer signaling or specified by a protocol. The beta-offset is used to indicate the code rate ratio of the uplink control information to the uplink data and/or uplink control information. For example, the set of beta-offsets is configured by higher layer signaling, and an index of the set of beta-offsets is dynamically indicated by uplink scheduling DCI. For another example, a value of the beta-offset is configured by higher layer signaling.

The HARQ-ACK information of the first priority and the PUSCH of the second priority may be transmitted in the first time unit or the second time unit. Whether the HARQ-ACK information of the first priority and the PUSCH of the second priority are transmitted in the first time unit or the second time unit may be specified by a protocol, or may be configured by higher layer signaling, or may be dynamically indicated by DCI.

And, for example, when in the HARQ-ACK codebook of the first priority all are ACKs, any appropriate predetermined method may be adopted to notify the UE of the manner of transmitting the uplink information. For example, in step 1106, one of the following three manners of transmitting the uplink information may be adopted. Which manner of transmitting the uplink information is to be adopted specifically can be notified by methods such as specification by a protocol, or configuration by higher layer signaling, or dynamic indication by DCI. However, the above notification methods are only exemplary but are not used to limit the present disclosure. Any existing methods and any possible notification methods generated with the development of technology are all included in the scope of the present disclosure.

Manner 1

The UE transmits the PUSCH of the second priority in the second time unit. The UE may not transmit the HARQ-ACK information of the first priority, and the UE may also delay transmitting the HARQ-ACK information of the first priority.

Manner 2

The UE simultaneously transmits HARQ-ACK information of the first priority and the PUSCH of the second priority. A manner of multiplexing is adopted for the HARQ-ACK information of the first priority and the PUSCH of the second priority.

A set of offsets beta-offsets related to the manner of multiplexing can be configured by higher layer signaling or specified by a protocol. An index of the set of beta-offsets is dynamically indicated by the uplink scheduling DCI.

The HARQ-ACK information of the first priority and the PUSCH of the second priority may be transmitted in the first time unit or the second time unit. Whether the HARQ-ACK information of the first priority and the PUSCH of the second priority are transmitted in the first time unit or the second time unit may be specified by a protocol, or may be configured by higher layer signaling, or may be dynamically indicated by DCI.

Manner 3

The UE simultaneously transmits the PUSCH of the second priority and the compressed HARQ-ACK information of the first priority. The compressed HARQ-ACK information of the first priority can be a 1-bit ACK (using a manner of bundling), the compressed HARQ-ACK information of the first priority can also be the number of bits of the HARQ-ACK codebook of the first priority, and the compressed HARQ-ACK information of the first priority may also be the X Least Significant Bits (LSB) of the number of bits of the HARQ-ACK codebook of the first priority. By simultaneously transmitting the PUSCH of the second priority and the compressed HARQ-ACK information of the first priority, channel resources are effectively utilized while the communication quality is ensured and the communication delay is reduced.

A set of offsets beta-offsets related to the manner of multiplexing can be configured by higher layer signaling or specified by a protocol. An index of the set of beta-offsets is dynamically indicated by uplink scheduling DCI.

A value of the beta-offset can also be configured by higher layer signaling.

The HARQ-ACK information of the first priority and the PUSCH of the second priority may be transmitted in the first time unit or the second time unit. Whether the HARQ-ACK information of the first priority and the PUSCH of the second priority are transmitted in the first time unit or the second time unit may be specified by a protocol, or may be configured by higher layer signaling, or may be dynamically indicated by DCI.

It should be explained that the first time unit corresponds to uplink physical resources of the first priority, and the second time unit corresponds to uplink physical resources of the second priority. The uplink physical resources may be PUCCH resources, and the uplink physical resources may also be PUSCH resources.

It should be explained that the PUSCH may or may not contain CSI.

In the present embodiment, the HARQ-ACK information of the first priority conflicts with the PUSCH of the second priority in the time domain. By selecting the HARQ-ACK information and/or the PUSCH of the second priority to be transmitted according to the HARQ-ACK information of the first priority, the spectrum efficiency of the system may be improved and the average latency of the system may be reduced on the premise of ensuring the transmission of the HARQ-ACK information of the first priority. The present embodiment also provides many solutions. The network can select specific solution through configuration by higher layer signaling, thereby increasing a flexibility of network scheduling.

Figure 12:
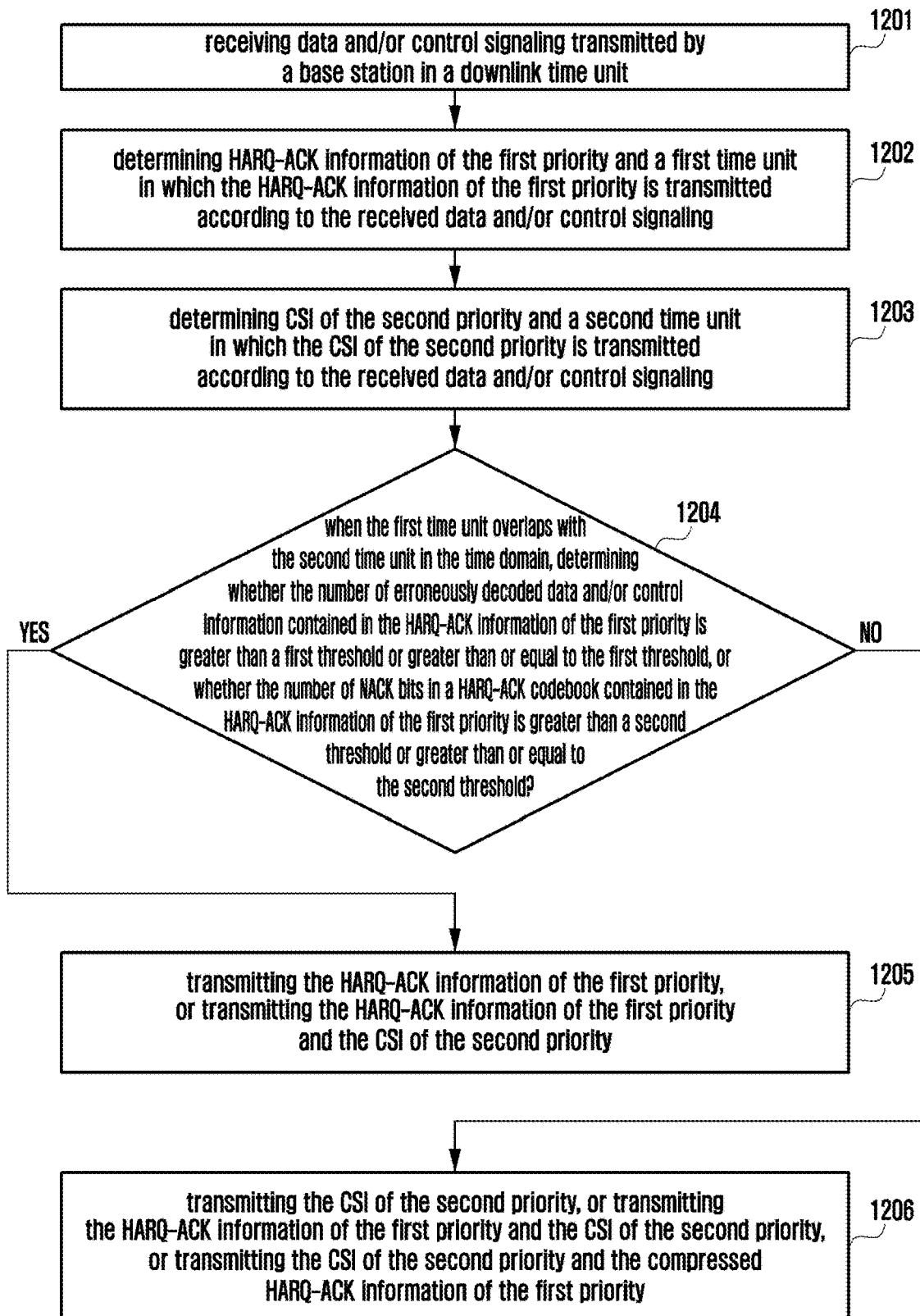
FIG. 12 is a flowchart of a transmission method according to another embodiment of the present disclosure.

FIG. 12 is a flowchart of a transmission method according to another embodiment of the present disclosure. Hereinafter, the another exemplary embodiment according to the present disclosure will be described with reference to FIG. 12.

In the present embodiment, a first priority is a high priority, and a second priority is a low priority, or the second priority is a high priority.

At step 1201, a UE receives data and/or control signaling transmitted by a base station in a downlink time unit.

At step 1202, the UE determines HARQ-ACK information of the first priority and a first time unit in which the HARQ-ACK information of the first priority is transmitted, according to the received data and/or control signaling transmitted by the base station.

At step 1203, the UE determines CSI of the second priority and a second time unit in which the CSI of the second priority is transmitted, according to the received data and/or control signaling transmitted by the base station. The CSI of the second priority is transmitted on a PUCCH resource.

At step 1204, when the first time unit overlaps with the second time unit in the time domain, the UE may determine the HARQ-ACK information and/or the CSI to be transmitted and an uplink time unit in which the HARQ-ACK information and/or the CSI is transmitted, according to the HARQ-ACK information of the first priority. According to the inventive idea of the present disclosure, different overlapping conflict solutions can be adopted according to different contents of the HARQ-ACK information, for example, according to whether the number of erroneously decoded data and/or control information contained in the HARQ-ACK information is greater than a predetermined threshold or greater than or equal to the predetermined threshold. For another example, according to whether the number of correctly decoded data and/or control information contained in the HARQ-ACK information is greater than a predetermined threshold or greater than or equal to the predetermined threshold, different overlapping conflict solutions are adopted. For another example, according to whether the number of NACK bits (for example, bit 0 can be used to represent a NACK bit in a codebook in the art) in a HARQ-ACK codebook contained in the HARQ-ACK information is greater than a predetermined threshold number or greater than or equal to the predetermined threshold number, different overlapping conflict solutions are adopted. For another example, according to whether the number of ACK bits (for example, bit 1 can be used to represent an ACK bit in the codebook in the art) in the HARQ-ACK codebook contained in the HARQ-ACK information is greater than a predetermined threshold number or greater than or equal to the predetermined threshold number, different overlapping conflict solutions are adopted. For example, specifically, in step 1204, different overlapping conflict solutions can be used according to whether the number of erroneously decoded data and/or control information contained in the HARQ-ACK information is greater than a predetermined threshold. When the predetermined threshold is 0, the HARQ-ACK information can be divided into two types, one is that all the data and/or control information are decoded correctly, and the other is that not all the data and/or control information are decoded correctly. When the predetermined threshold is 1, the HARQ-ACK information can be divided into two types, one is that at most one piece of data and/or control information is decoded erroneously, and the other is that at least two pieces of data and/or control information are decoded erroneously. For example, specifically, in step 1204, different overlapping conflict solutions may be used according to whether the number of NACKs in the HARQ-ACK codebook contained in the HARQ-ACK information is greater than or equal to the predetermined threshold. When the predetermined threshold is 1, the HARQ-ACK information can be divided into two types, one is that all pieces of bit information in the HARQ-ACK codebook are ACKs, and the other is that at least one piece of the bit information in the HARQ-ACK codebook is NACK. When the predetermined threshold is 2, the HARQ-ACK information can be divided into two types, one is that at most one piece of the bit information in the HARQ-ACK codebook is NACK, and the other is that at least two pieces of the bit information in the HARQ-ACK codebook are NACKs. It should be noted that the specific numerical value examples of respective predetermined thresholds disclosed above are only used to illustrate the idea of the present disclosure, but do not to limit the scope of the present disclosure. In the present disclosure, the above-mentioned plurality of predetermined thresholds may adopt any appropriate numerical values, and these numerical values may be the same or different. In addition, any appropriate predetermined method can be used to provide these predetermined thresholds to the UE. For example, they can be specified by a protocol, or can be configured by higher layer signaling, or can be dynamically indicated by DCI, and so on, and these predetermined thresholds can be provided in the same parameter or signaling, or can also be provided in different parameters or signaling. However, the above manners are only exemplary, but are not used to limit the present disclosure. Any existing manners and any possible manners generated with the development of technology are all included in the scope of the present disclosure.

In the present embodiment, higher layer signaling configures the HARQ-ACK codebook of the first priority as a semi-static codebook (3GPP TS38.213 Semi-static/Type-1 HARQ-ACK codebook). Downlink data scheduling is based on TB-level HARQ-ACK feedback.

When at least one of all the TBs and/or the DCI indicating the SPS PDSCH release that need to be fed back is erroneously decoded, any appropriate predetermined method may be used to notify the UE of a plurality of manners of transmitting uplink information. For example, one of the following two manners can be used in step 1205. Which manner of transmitting the uplink information is to be adopted specifically can be notified by methods such as specification by a protocol, or configuration by higher layer signaling, or dynamic indication by DCI. However, the above notification methods are only exemplary, but are not used to limit the present disclosure. Any existing methods and any possible notification methods generated with the development of technology are all included in the scope of the present disclosure.

Manner 1

The UE transmits the HARQ-ACK information of the first priority in the first time unit. The UE may not transmit the CSI of the second priority, and the UE may also delay transmitting the CSI of the second priority.

Manner 2

The UE simultaneously transmits the HARQ-ACK information of the first priority and the CSI of the second priority. A manner of multiplexing is adopted for the HARQ-ACK information of the first priority and the CSI of the second priority. The HARQ-ACK information of the first priority and the CSI of the second priority may be transmitted in the first time unit or the second time unit. Whether the HARQ-ACK information of the first priority and the CSI of the second priority are transmitted in the first time unit or the second time unit may be specified by a protocol, or may be configured by higher layer signaling, or may be dynamically indicated by DCI.

And, for example, when all the TBs and/or the DCI indicating the SPS PDSCH release that need to be fed back are decoded correctly, any appropriate predetermined method may be adopted to notify the UE of multiple manners of transmitting uplink information. For example, in step 1206, one of the following three manners of transmitting the uplink information may be adopted. Which manner of transmitting the uplink information is to be adopted specifically can be notified by methods such as specifying by protocol, or configuration by higher layer signaling, or dynamic indication by DCI. However, the above notification methods are only exemplary, but are not used to limit the present disclosure. Any existing methods and any possible notification methods generated with the development of technology are all included in the scope of the present disclosure.

Manner 1

The UE transmits the CSI of the second priority in the second time unit. The UE may not transmit the HARQ-ACK information of the first priority, and the UE may also delay transmitting the HARQ-ACK information of the first priority.

Manner 2

The UE simultaneously transmits the HARQ-ACK information of the first priority and the CSI of the second priority. A manner of multiplexing is adopted for the HARQ-ACK information of the first priority and the PUSCH of the second priority.

The HARQ-ACK information of the first priority and the CSI of the second priority may be transmitted in the first time unit or the second time unit. Whether the HARQ-ACK information of the first priority and the CSI of the second priority are transmitted in the first time unit or the second time unit may be specified by a protocol, or may be configured by higher layer signaling, or may be dynamically indicated by DCI.

Manner 3

The UE simultaneously transmits the CSI of the second priority and the compressed HARQ-ACK information of the first priority. The compressed HARQ-ACK information of the first priority can be a 1-bit ACK (using a manner of bundling), the compressed HARQ-ACK information of the first priority can also be the number of bits of the HARQ-ACK codebook of the first priority, and the compressed HARQ-ACK information of the first priority may also be the X Least Significant Bits (LSB) of the number of bits of the HARQ-ACK codebook of the first priority. By simultaneously transmitting the CSI of the second priority and the compressed HARQ-ACK information of the first priority, channel resources are effectively utilized while the communication quality is ensured and the communication delay is reduced.

The HARQ-ACK information of the first priority and the CSI of the second priority may be transmitted in the first time unit or the second time unit.

It should be explained that the first time unit corresponds to uplink physical resources of the first priority, and the second time unit corresponds to uplink physical resources of the second priority. The uplink physical resources may be PUCCH resources, and the uplink physical resources may also be PUSCH resources.

In the present embodiment, the HARQ-ACK information of the first priority conflicts with the CSI of the second priority in the time domain. By selecting the HARQ-ACK information and/or the CSI of the second priority to be transmitted according to the HARQ-ACK information of the first priority, the spectrum efficiency of the system may be improved and the average latency of the system may be reduced on the premise of ensuring the transmission of the HARQ-ACK information of the first priority. The present embodiment also provides many solutions. The network can select specific solution through configuration by higher layer signaling, thereby increasing a flexibility of network scheduling.

Figure 13:
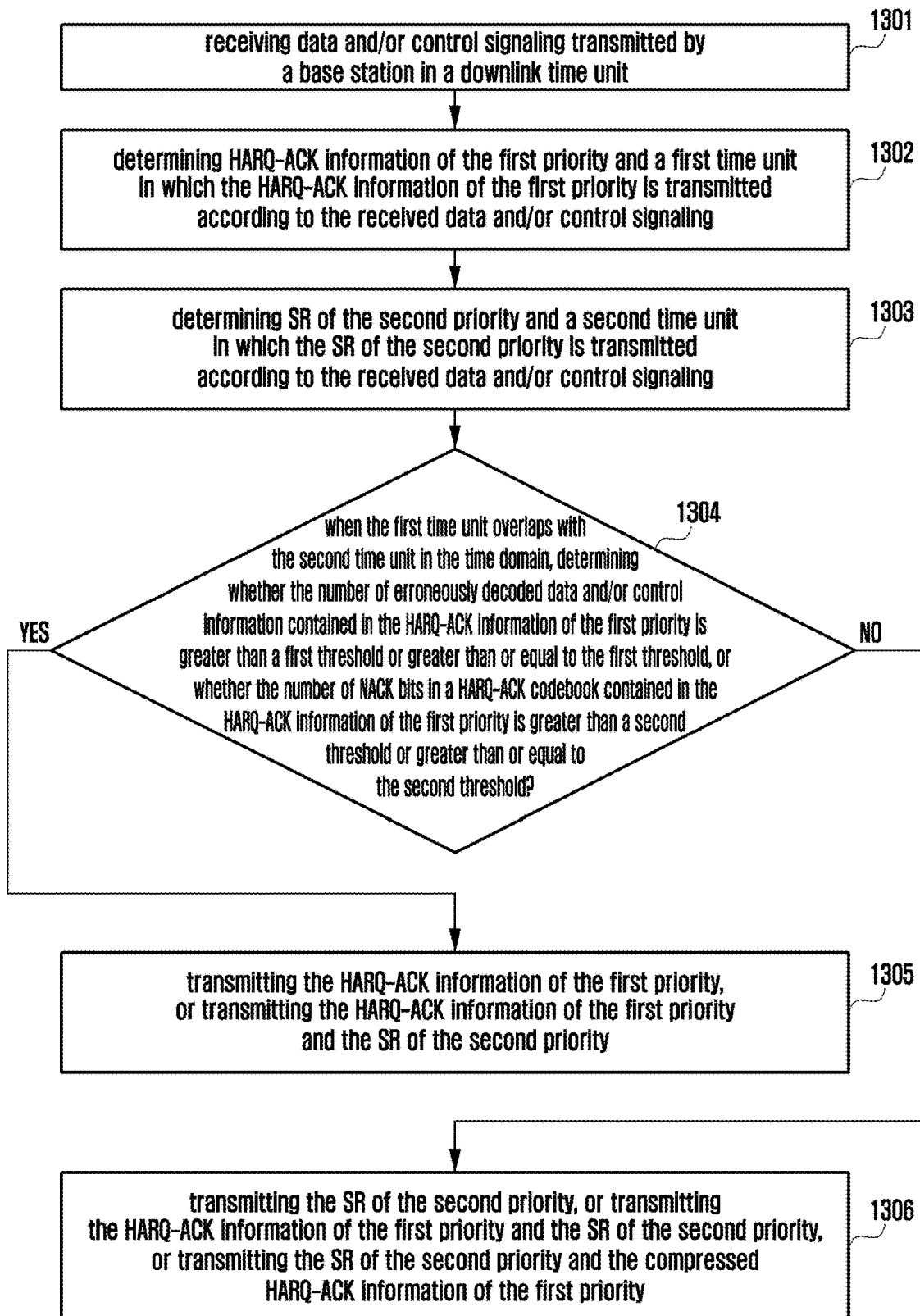
FIG. 13 is a flowchart of a transmission method according to another embodiment of the present disclosure.

FIG. 13 is a flowchart of a transmission method according to another embodiment of the present disclosure. Hereinafter, the another exemplary embodiment according to the present disclosure will be described with reference to FIG. 13.

In the present embodiment, a first priority is a high priority, a second priority is a low priority, or the second priority is a high priority.

At step 1301, a UE receives data and/or control signaling transmitted by a base station in a downlink time unit.

At step 1302, the UE determines HARQ-ACK information of the first priority and a first time unit in which the HARQ-ACK information of the first priority is transmitted, according to the received data and/or control signaling transmitted by the base station.

At step 1303, the UE determines an SR of the second priority and a second time unit in which the SR of the second priority is transmitted, according to the received data and/or control signaling transmitted by the base station.

At step 1304, when the first time unit overlaps with the second time unit in the time domain, the UE may determine the HARQ-ACK information and/or the SR to be transmitted and an uplink time unit in which the HARQ-ACK information and/or the SR is transmitted, according to the HARQ-ACK information of the first priority. According to the inventive idea of the present disclosure, different overlapping conflict solutions can be adopted according to different contents of the HARQ-ACK information, for example, according to whether the number of erroneously decoded data and/or control information contained in the HARQ-ACK information is greater than a predetermined threshold or greater than or equal to the predetermined threshold. For another example, according to whether the number of correctly decoded data and/or control information contained in the HARQ-ACK information is greater than a predetermined threshold or greater than or equal to the predetermined threshold, different overlapping conflict solutions are adopted. For another example, according to whether the number of NACK bits (for example, bit 0 can be used to represent a NACK bit in a codebook in the art) in a HARQ-ACK codebook contained in the HARQ-ACK information is greater than a predetermined threshold number or greater than or equal to the predetermined threshold number, different overlapping conflict solutions are adopted. For another example, according to whether the number of ACK bits (for example, bit 1 can be used to represent an ACK bit in the codebook in the art) in the HARQ-ACK codebook contained in the HARQ-ACK information is greater than a predetermined threshold number or greater than or equal to the predetermined threshold number, different overlapping conflict solutions are adopted. For example, specifically, in step 1304, different overlapping conflict solutions can be used according to whether the number of erroneously decoded data and/or control information contained in the HARQ-ACK information is greater than a predetermined threshold. When the predetermined threshold is 0, the HARQ-ACK information can be divided into two types, one is that all the data and/or control information are decoded correctly, and the other is that not all the data and/or control information are decoded correctly. When the predetermined threshold is 1, the HARQ-ACK information can be divided into two types, one is that at most one piece of data and/or control information is decoded erroneously, and the other is that at least two pieces of data and/or control information are decoded erroneously. For example, specifically, in step 1304, different overlapping conflict solutions may be used according to whether the number of NACKs in the HARQ-ACK codebook contained in the HARQ-ACK information is greater than or equal to the predetermined threshold. When the predetermined threshold is 1, the HARQ-ACK information can be divided into two types, one is that all pieces of bit information in the HARQ-ACK codebook are ACKs, and the other is that at least one piece of the bit information in the HARQ-ACK codebook is NACK. When the predetermined threshold is 2, the HARQ-ACK information can be divided into two types, one is that at most one piece of the bit information in the HARQ-ACK codebook is NACK, and the other is that at least two pieces of the bit information in the HARQ-ACK codebook are NACKs. It should be noted that the specific numerical value examples of respective predetermined thresholds disclosed above are only used to illustrate the idea of the present disclosure, but do not to limit the scope of the present disclosure. In the present disclosure, the above-mentioned plurality of predetermined thresholds may adopt any appropriate numerical values, and these numerical values may be the same or different. In addition, any appropriate predetermined method can be used to provide these predetermined thresholds to the UE. For example, they can be specified by a protocol, or can be configured by higher layer signaling, or can be dynamically indicated by DCI, and so on, and these predetermined thresholds can be provided in the same parameter or signaling, or can also be provided in different parameters or signaling. However, the above manners are only exemplary, but are not used to limit the present disclosure. Any existing manners and any possible manners generated with the development of technology are all included in the scope of the present disclosure.

In the present embodiment, the higher layer signaling configures the HARQ-ACK codebook of the HARQ-ACK of the first priority as a semi-static codebook (3GPP TS38.213 Semi-static/Type-1 HARQ-ACK codebook). Downlink data scheduling is based on CBG-level HARQ-ACK feedback.

For example, when at least one of all the CBGs and/or the DCI indicating the SPS PDSCH release that need to be fed back is decoded erroneously, any appropriate predetermined method may be adopted to notify the UE of a plurality of manners of transmitting uplink information. For example, in step 1305, one of the following two manners may be adopted. Which manner of transmitting the uplink information is to be adopted specifically can be notified by a method such as specification by a protocol, configuration by higher layer signaling, or dynamic indication by DCI. However, the above notification methods are only exemplary and are not used to limit the present disclosure. Any existing methods and any possible notification methods generated with the development of technology are all included in the scope of the present disclosure.

Manner 1

The UE transmits the HARQ-ACK information of the first priority in the first time unit. The UE may not transmit the SR of the second priority, and the UE may also delay transmitting the SR of the second priority.

Manner 2

The UE simultaneously transmits the HARQ-ACK information of the first priority and the SR of the second priority. A manner of multiplexing are adopted for the HARQ-ACK information of the first priority and the SR of the second priority. The HARQ-ACK information of the first priority and the SR of the second priority may be transmitted in the first time unit or the second time unit. Whether the HARQ-ACK information of the first priority and the SR of the second priority are transmitted in the first time unit or the second time unit may be specified by a protocol, or may be configured by higher layer signaling, or may be dynamically indicated by DCI.

And, for example, when all the CBGs and/or the DCI indicating the SPS PDSCH release that need to be fed back are decoded correctly, any appropriate predetermined method may be adopted to notify the UE of a manner of transmitting uplink information. For example, at step 1306, one of the following three manners may be adopted. Which manner of transmitting the uplink information is to be adopted specifically can be notified by a method such as specification by a protocol, or configuration by higher layer signaling, or dynamic indication by DCI. However, the above notification methods are only exemplary and are not used to limit the present disclosure. Any existing methods and any possible notification methods generated with the development of technology are all included in the scope of the present disclosure.

Manner 1

The UE transmits the SR of the second priority in the second time unit. The UE may not transmit the HARQ-ACK information of the first priority, and the UE may also delay transmitting the HARQ-ACK information of the first priority.

Manner 2

The UE simultaneously transmits the HARQ-ACK information of the first priority and the SR of the second priority. The HARQ-ACK information of the first priority and the SR of the second priority adopt a manner of multiplexing.

The HARQ-ACK information of the first priority and the SR of the second priority may be transmitted in the first time unit or the second time unit. Whether the HARQ-ACK information of the first priority and the SR of the second priority are transmitted in the first time unit or the second time unit may be specified by protocol, may be configured by higher layer signaling, or may be dynamically indicated by DCI.

Manner 3

The UE simultaneously transmits the SR of the second priority and the compressed HARQ-ACK information of the first priority. The compressed HARQ-ACK information of the first priority can be a 1-bit ACK (using a manner of bundling), the compressed HARQ-ACK information of the first priority can also be the number of bits of the HARQ-ACK codebook of the first priority, and the compressed HARQ-ACK information of the first priority may also be the X Least Significant Bits (LSB) of the number of bits of the HARQ-ACK codebook of the first priority. By simultaneously transmitting the SR of the second priority and the compressed HARQ-ACK information of the first priority, channel resources are effectively utilized while the communication quality is ensured and the communication delay is reduced.

The HARQ-ACK information of the first priority and the SR of the second priority may be transmitted in the first time unit or the second time unit.

It should be noted that the first time unit corresponds to an uplink physical resources of the first priority, and the second time unit corresponds to an uplink physical resources of the second priority. The uplink physical resources may be a PUCCH resources, and the uplink physical resources may also be a PUSCH resources.

In the present embodiment, the HARQ-ACK information of the first priority conflicts with the SR of the second priority in the time domain. By selecting the HARQ-ACK information and/or the SR of the second priority to be transmitted according to the HARQ-ACK information of the first priority, the spectrum efficiency of the system may be improved and the average latency of the system may be reduced on the premise of ensuring the transmission of the HARQ-ACK information of the first priority. The present embodiment also provides many solutions. The network can select specific solution through configuration by higher layer signaling, thereby increasing a flexibility of network scheduling.

It should be explained that all embodiments of the present disclosure are applicable to scenarios where the second information of the first priority contains the HARQ-ACK and other information, and the other information may include at least one of SR, CSI or data. When the second information of the first priority contains the HARQ-ACK and other information, by implementing the method of the present disclosure, the system spectrum can be more fully utilized, the system spectrum efficiency can be further improved, and the service scheduling and allocation are more flexible at the same time, thereby optimizing performances of services.

In another embodiment of the present disclosure, in order to improve the transmission performance of a PUSCH, the PUSCH may contain multiple repetition transmissions, and each repetition is called a nominal repetition. When a nominal repetition transmission is across a slot boundary or an uplink-downlink switching point, a nominal repetition transmission may be divided into at least two parts, and each part is called an actual repetition transmission. Since the SCS (Sub-carrier-Spacing) of UCI may be different from that of a PUSCH, the slots where UCI is located may correspond to the slots where multiple PUSCHs are located. When one nominal repetition transmission is divided into at least two actual repetition transmissions, it may also cause the slots where UCI is located to correspond to one or more PUSCH repetitions.

A first PUSCH that meets a timing condition is selected from multiple PUSCHs that overlap with UCI in the time domain. The PUSCH may contain one or more nominal repetition transmissions, and each nominal repetition transmission contains one or more actual repetition transmissions. The PUSCH transmission may be in one or more slots. Or, all PUSCHs that meet the timing condition are selected from the multiple PUSCHs that overlap with the UCI in the time domain. Each PUSCH may contain one or more nominal repetition transmissions, and each nominal repetition transmission contains one or more actual repetition transmissions. The PUSCH transmission may be in one or more slots.

Method 1

An actual repetition transmission is selected for each slot where the PUSCH transmission is located. The actual repetition transmission can be the first actual repetition transmission in the present slot, or the actual repetition transmission is an actual repetition transmission with the most number of OFDM symbols in the present slot. If the number of actual repetition transmissions with the most number of OFDM symbols in the present slot is greater than 1, then the first one is selected. Optionally, the selected actual repetition transmission needs to meet certain restrictions, for example, the number of symbols is greater than N1 or greater than or equal to N1, and for example, the number of REs (resource elements) is greater than M1 or greater than or equal to M1.

Method 2

A nominal repetition transmission is selected for each slot where the PUSCH transmission is located. The nominal repetition transmission can be the first nominal repetition transmission in the present slot, or the nominal repetition transmission is a nominal repetition transmission containing the most number of OFDM symbols in the present slot. If the number of nominal repetition transmissions with the most number of OFDM symbols in the present slot is greater than 1, then the first one is selected. Optionally, the selected nominal repetition transmission needs to meet certain restrictions, for example, the number of symbols is greater than N2 or greater than or equal to N2, and for example, the number of REs (resource elements) is greater than M2 or greater than or equal to M2.

If the nominal repetition transmission is divided into at least two actual repetition transmissions, an actual repetition transmission is further selected. The actual repetition transmission can be the first actual repetition transmission of the nominal repetition transmission, or the actual repetition transmission is an actual repetition transmission with the most number of OFDM symbols of the nominal repetition transmission. If the number of actual repetition transmissions with the most number of OFDM symbols of the nominal repetition transmission is greater than 1, then the first one is selected. If multiple actual repetition transmissions contained in the nominal repetition transmission are in different slots, for example, 2 slots, it is possible to select an actual repetition transmission in each slot, respectively, or to select only an actual repetition transmission in the first slot, according to the above methods. Optionally, the selected actual repetition transmission needs to meet certain restrictions, for example, the number of symbols is greater than N3 or greater than or equal to N3, and for example, the number of REs (resource elements) is greater than M3 or greater than or equal to M3.

Method 3

A nominal repetition transmission is selected for each slot where the PUSCH transmission is located. The nominal repetition transmission can be the first nominal repetition transmission in the present slot, or the nominal repetition transmission is a nominal repetition transmission with the most number of OFDM symbols in the present slot. If the number of nominal repetition transmissions with the most number of OFDM symbols in the present slot is greater than 1, then the first one is selected. Optionally, the selected nominal repetition transmission needs to meet certain restrictions, for example, the number of symbols is greater than N3 or greater than or equal to N3, and for example, the number of REs (resource elements) is greater than M3 or greater than or equal to M3.

Method 4

All the nominal repetition transmissions are selected, or all the nominal repetition transmissions that overlap with the UCI in the time domain are selected.

If the nominal repetition transmission is divided into at least two actual repetition transmissions, an actual repetition transmission is further selected. The actual repetition transmission can be the first actual repetition transmission of the nominal repetition transmission, or the actual repetition transmission is an actual repetition transmission with the most number of OFDM symbols of the nominal repetition transmission. If the number of actual repetition transmissions with the most number of OFDM symbols of the nominal repetition transmission is greater than 1, then the first one is selected. If multiple actual repetition transmissions contained in the nominal repetition transmission are in different slots, for example, 2 slots, it is possible to select an actual repetition transmission in each slot, respectively, or to select only an actual repetition transmission in the first slot, according to the above methods. Optionally, the selected actual repetition transmission needs to meet certain restrictions, for example, the number of symbols is greater than N4 or greater than or equal to N4, and for example, the number of REs (resource elements) is greater than M4 or greater than or equal to M4.

In all the above methods, the UCI mapping starts from the selected first actual repetition transmission, and the UCI is mapped sequentially according to the actual repetition transmission order. Specifically, if all UCI information can be mapped to the selected first actual repetition transmission, the mapping ends; otherwise, the UCI information that is not mapped continues to be mapped to the selected next actual repetition transmission until all UCI information is mapped.

It should be explained that in all the above methods, it can be further specified that the selected actual repetition transmission cannot be an Orphan symbol. If there is an Orphan symbol, the Orphan symbol is excluded first, and then the selection is performed according to the above methods.

In another embodiment of the present disclosure, when UCI is multiplexed to multiple actual repetition transmissions of the PUSCH, the number of OFDM symbols occupied by each actual repetition transmission may be different.

In the following, the HARQ-ACK is taken as an example to specifically illustrate the method of multiplexing the UCI to the PUSCH. The number of HARQ-ACK symbols per layer is $Q'_{ACK}$, which is obtained according to the following formula:

$$Q'_{ACK} = \min\{A, B\} \quad (1)$$

$$A = \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil \quad (2)$$

$$B = \left\lceil \alpha \cdot \sum_{l=l_0}^{N_{symb,all}^{PUSCH}-1} M_{sc}^{UCI}(l) \right\rceil \quad (3)$$

where $Q'_{ACK}$ is the number of HARQ-ACK bits;

$L_{ACK}$ is the number of CRC bits;

$\beta_{offset}^{PUSCH} = \beta_{offset}^{HARQ-ACK}$ is the beta offset parameter of HARQ-ACK;

$C_{UL-SCH}$ is the number of code blocks for the PUSCH;

$K_r$ is the rth code block size, and is 0 if the code block is not transmitted;

$M_{SC}^{PUSCH}$ is the bandwidth of the PUSCH transmission, the unit thereof is subcarrier;

$M_{SC}^{PT-RS}(l)$ is the number of subcarriers of OFDM symbol l that carries PTRS in PUSCH;

$M_{SC}^{UCi}(l)$ is the number of REs that can be used for transmission of UCI on OFDM symbol l of PUSCH, $l=0, 1, 2, \ldots, N_{symb,all}^{PUSCH}-1$, $N_{sumb,all}^{PUSCH}$ is the total number of OFDM symbols of the PUSCH, including OFDM symbols used for DMRS;

for any OFDM symbol that carries DMRS, $M_{SC}^{UCi}(l)=0$;

for any OFDM symbol that does not carries DMRS, $M_{SC}^{UCi}(l)=M_{SC}^{PUSCH}-M_{SC}^{PT-RS}(l)$;

α is scaling parameter configured by higher layer signaling;

$l_O$ is the first OFDM symbol that does not carry DMRS, after the first DRMS symbol(s) in the PUSCH.

It should be explained that $N_{symb,all}^{PUSCH}$ may be the number of symbols of the nominal repetition transmission, and may also be the number of symbols of the actual repetition transmission.

When the numbers of symbols of multiple actual repetition transmissions that need to multiplex the same UCI are different, REs occupied by the UCI in each actual repetition transmission may be the same or different. For REs occupied by the UCI in each actual repetition transmission being the same, the number of REs can be determined according to the minimum value of B calculated by formula (3) or determined according to the minimum value of $Q'_{ACK}$ calculated by formulas (1), (2), (3), based on different actual repetition transmissions. For REs occupied by the UCI in each actual repetition transmission being different, the number of REs is calculated according to formulas (1), (2), (3) respectively for each actual repetition transmission.

It should be explained that the parameters N1, N2, N3, N4, M1, M2, M3, M4 in the above methods can be configured by higher layer signaling, can also be specified by a protocol, or can also be calculated by formulas specified by protocol in connection with parameters configured by higher layer signaling. Specifically, the counts of M1, M2, M3 and M4 can be obtained by formula (4).

$$M = \left\lceil \alpha \cdot \sum_{l=l_0}^{P-1} M_{sc}^{UCI}(l) \right\rceil \quad (4)$$

where P can be configured by higher layer signaling, or can also be specified by a protocol. P can also be equal to the number of OFDM symbols of the nominal repetition transmission.

For the other count of the UCI, the above method can also be adopted.

The present embodiment shows the method of how to select a PUSCH for multiplexing when UCI and multiple PUSCHs are repeated. By selecting suitable parameters, the reliability of UCI transmission can be ensured, meanwhile the base station and the UE can be ensured to understand the UCI multiplexing in consistence with each other, and the transmission latency of UCI can also be ensured. Through reasonably scheduling by the base station, the network spectrum efficiency can be further optimized and the network performance can be improved.

Figure 14:
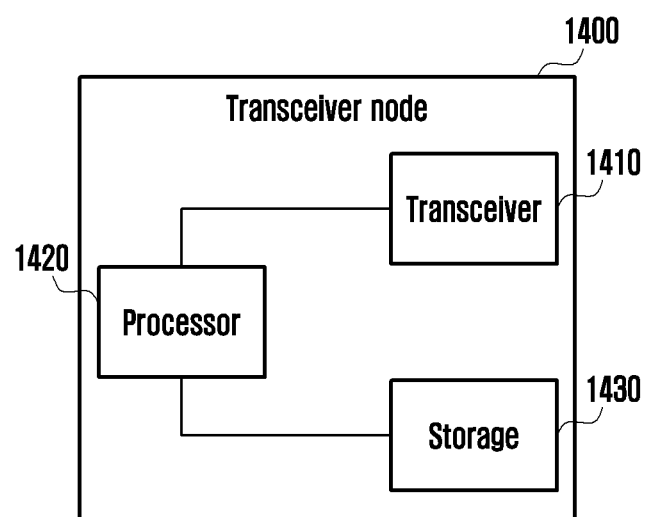
FIG. 14 is a block diagram of a transceiver node performing a transmission method according to another embodiment of the present disclosure.

FIG. 14 is a block diagram showing a transceiver node according to an embodiment of the present disclosure.

As shown in FIG. 14, a transceiver node 1400 may include a transceiver 1410, a processor 1420 and storage 1430. However, not all the shown components are necessary. The transceiver node 1400 may be implemented by more or fewer components than those shown in FIG. 14. For example, according to another embodiment, the transceiver 1410, the processor 1420 and the storage 1430 may be implemented as a single chip. In the present disclosure, the processor 1420 may be defined as a circuit, an application specific integrated circuit, or at least one processor.

The transceiver 1410 can transmit signals to or receive signals from any other network entity. For example, the transceiver 1410 may receive system information, synchronization signals, or reference signals from a base station.

According to an embodiment of the present disclosure, the processor 1420 may control the overall operation of the transceiver node. For example, the processor 1420 may control the signal flow between corresponding blocks to perform the operations of the above-mentioned flowcharts. Specifically, in an embodiment according to the present disclosure, the processor 1420 may control to: receive the first information from another transceiver node; based on the first information, determine second information of a first priority and a first time unit in which the second information of the first priority is transmitted; based on the first information, determine the second information of a second priority and a second time unit in which the second information of the second priority is transmitted; and the second information of the first priority includes Hybrid Automatic Repeat request-Acknowledgement (HARQ-ACK) information of the first priority, when the first time unit conflicts with the second time unit, determine the second information to be transmitted according to the HARQ-ACK information of the first priority. And, the processor 1420 may control and perform any steps of various embodiments according to the present disclosure.

The storage 1430 may store at least one of information transmitted/received by the transceiver 1410 and information created by the processor 1420. For example, the storage 1430 may store information received by the transceiver node from the base station, information determined by the processor and the like.

Figure 15:
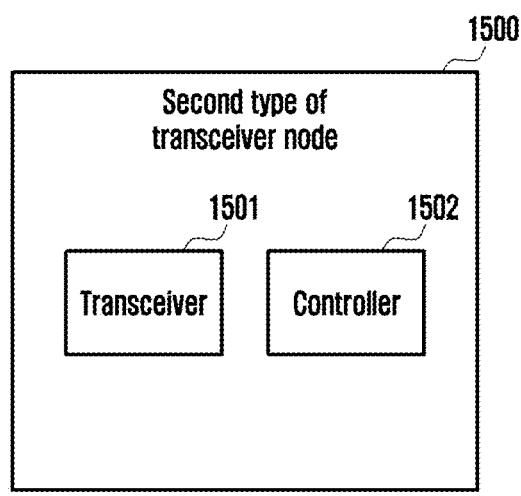
FIG. 15 shows a block diagram of a second type of transceiver node according to an embodiment of the present disclosure.

FIG. 15 shows a block diagram of a second type of transceiver node according to an embodiment of the present disclosure.

Referring to FIG. 15, the second type of transceiver node 1500 may include a transceiver 1501 and a controller 1502.

The transceiver 1501 may be configured to receive a first type of data and/or a first type of control signaling from a first type of transceiver node and transmit a HARQ-ACK codebook to the first type of transceiver node in a determined time unit.

The controller 1502 may be a circuit-specific integrated circuit or at least one processor. The controller 1502 may be configured to control an overall operation of the second type of transceiver node, and control the second type of transceiver node to implement the method proposed in the present disclosure. In particular, the controller 1502 may be configured to determine the HARQ-ACK codebook and the time unit for transmitting the HARQ-ACK codebook based on the first type of data and/or the first type of control signaling, and control the transceiver 1501 to transmit the HARQ-ACK codebook to the first type of transceiver node in the determined time unit.

In the present disclosure, the first type of transceiver node may be a BS (Base Station), and the second type of transceiver node may be a UE (User Equipment). In the following examples, a BS is taken as an example (but not limited thereto) to describe the first type of transceiver node, and a UE is taken as an example (but not limited thereto) to describe the second type of transceiver node.

The first type of data may be data transmitted by the first type of transceiver node to the second type of transceiver node. In the following examples, downlink data carried by the PDSCH (Physical Downlink Shared Channel) is taken as an example (but not limited thereto) to describe the first type of data.

The second type of data may be data transmitted by the second type of transceiver node to the first type of transceiver node. In the following examples, the PUSCH (Physical Uplink Shared Channel) is taken as an example (but not limited thereto) to describe the second type of data.

The first type of control signaling may be control signaling transmitted by the first type of transceiver node to the second type of transceiver node. In the following examples, downlink control signaling is taken as an example (but not limited thereto) to describe the first type of control signaling. The downlink control signaling may be DCI (Downlink Control Information) carried by the PDCCH (Physical Downlink Control Channel) and/or control signaling carried by the PDSCH (Physical Downlink Shared Channel).

The second type of control signaling may be control signaling transmitted by the second type of transceiver node to the first type of transceiver node. In the following examples, uplink control signaling is taken as an example (but not limited thereto) to describe the second type of control signaling. The uplink control signaling may be UCI (Uplink Control Information) carried by the PUCCH (Physical Uplink Control Channel) and/or control signaling carried by the PUSCH (Physical Uplink Shared Channel). The UCI may include the HARQ-ACK codebook.

A first type of time unit is a time unit where the first type of transceiver node transmits the first type of data and/or the first type of control signaling. In the following examples, a downlink time unit is taken as an example (but not limited thereto) to describe the first type of time unit.

A second type of time unit is a time unit where the second type of transceiver node transmits the second type of data and/or the second type of control signaling. In the following examples, an uplink time unit is taken as an example (but not limited thereto) to describe the second type of time unit.

The first type of time unit and the second type of time unit may be one or more slots, one or more sub-slots, one or more OFDM (Orthogonal Frequency Division Multiplexing) symbols, and one or more sub-frames.

Depending on a network type, the term "base station" or "BS" may refer to any component (or set of components) configured to provide wireless access to the network, such as a transmission point (TP), a transmission-reception point (TRP), an enhanced base station (eNodeB or eNB), a 5G base station (gNB), a macro cell, a femto cell, a WiFi access point (AP) or other wirelessly enabled devices. The Base station may provide wireless access based on one or more wireless communication standard specifications, for example, 5G 3GPP New Radio Interface/Access (NR), Long Term Evolution (LTE), Advanced LTE (LTE-A), High Speed Packet Access (HSPA), Wi-Fi 802.11a/b/g/n/ac, etc. For convenience, the terms "BS" and "TRP" may be used interchangeably in this patent document to refer to network infrastructure components that provide wireless access to remote terminals. In addition, depending on the network type, the term "user equipment" or "UE" may refer to any of the following components, such as a "mobile station", a "subscriber station", a "remote terminal", a "wireless terminal", a "reception point", a "user equipment" or simply a "terminal". For convenience, the term "user equipment" or "UE" is used in this patent document to refer to a remote wireless device that wirelessly accesses the BS, whether the UE is a mobile device (such as a mobile phone or a smart phone), or a generally considered fixed equipment (for example, a desktop computer or a vending machine).

Figure 16:
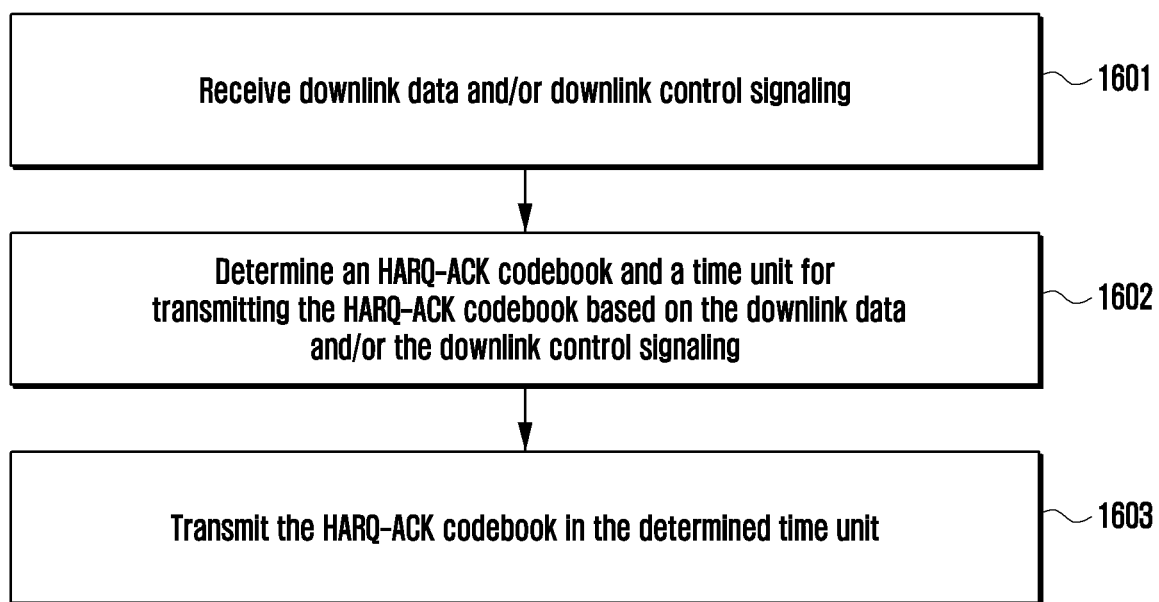
FIG. 16 shows a flowchart of a method performed by UE according to an embodiment of the present disclosure.

FIG. 16 shows a flowchart of a method performed by UE according to an embodiment of the present disclosure.

First, at step 1601, UE receives downlink data and/or downlink control signaling from the BS.

At step 1602, UE determines a HARQ-ACK codebook and an uplink time unit for transmitting the HARQ-ACK codebook based on the downlink data and/or the downlink control signaling.

Optionally, the uplink time unit for transmitting the HARQ-ACK codebook may be determined according to HARQ-ACK timing information included in the downlink control signaling, and the HARQ-ACK timing information may be configured by dynamic indication and/or higher layer signaling.

At step 1603, the UE transmits the HARQ-ACK codebook to the BS in the determined uplink time unit.

Optionally, the HARQ-ACK codebook determined in step 1602 includes HARQ-ACK information for PDSCH associated with the HARQ-ACK codebook and/or HARQ-ACK information for DCI indicating a SPS (Semi-Persistent Scheduling) PDSCH releases.

If the base station does not successfully receive the HARQ-ACK information transmitted in step 1602, the base station cannot determine whether the UE has correctly received the PDSCH and/or the DCI indicating SPS PDSCH release, and thus cannot make an appropriate scheduling decision. In order to reduce impact of failed reception of the HARQ-ACK information on scheduling, a HARQ-ACK retransmission mechanism may be adopted. For example, the base station may trigger the UE to retransmit the HARQ-ACK information that the base station has not successfully received. According to an implementation, the base station may trigger the UE to transmit HARQ-ACK information for all HARQ procedures. In addition, requirements for HARQ-ACK feedback are also different for services with different performance requirements, such as eMBB and URLLC. Different performance requirements may be satisfied by configuring various HARQ-ACK feedback parameters, such as indexes of the HARQ-ACK codebook, priority of the HARQ-ACK codebook, the type of the HARQ-ACK codebook, HARQ-ACK timing, and resources for feeding back HARQ-ACK and the like.

HARQ-ACK feedback parameters may be indicated if the base station triggers the UE to transmit HARQ-ACK for HARQ procedures. Alternatively, the HARQ-ACK feedback parameters may be indicated if the base station configures PDSCH transmission, for example, the base station configures the HARQ-ACK feedback parameters while configuring SPS (Semi-Persistent Scheduling) PDSCH information.

The HARQ-ACK feedback parameters include at least HARQ-ACK codebook information, for example, priority of the HARQ-ACK codebook. A triggered HARQ-ACK codebook may be a HARQ-ACK codebook based on all HARQ procedures. For example, for a serving cell c, all HARQ procedures may be configured by the base station. Optionally, the base station may configure different HARQ procedures for HARQ-ACK codebooks with different priorities. Optionally, the base station may configure HARQ procedures by configuring the maximum number of available HARQ procedures and/or HARQ procedure offsets. If the base station does not perform configuration, the number of downlink HARQ procedures may be determined according to a default value specified in the standard. For example, the standard specifies that the default total number of downlink HARQ procedures is 8, and available downlink HARQ procedures are 0, 1, 2, 3, 4, 5, 6, 7.

According to an embodiment of the present disclosure, HARQ-ACK codebooks with different priorities may be triggered by way of explicit indication or implicit indication.

The way of explicit indication may indicate a priority of the triggered HARQ-ACK codebook by 1 bit in the DCI. If the DCI schedules one PDSCH or indicates SPS PDSCH release, the priority of the triggered HARQ-ACK codebook may be the same as a priority of the PDSCH scheduled by the DCI or a priority of the SPS PDSCH release indicated by the DCI, or the priority of the triggered HARQ-ACK codebook may be different from the priority of the PDSCH scheduled by the DCI or the priority of the SPS PDSCH release indicated by the DCI. Whether the priority of the HARQ-ACK codebook is the same as the priority of the PDSCH scheduled by the DCI or the priority of the SPS PDSCH release indicated by the DCI may be configured through higher layer signaling or specified by standards.

This method triggers HARQ-ACK codebooks with different priorities by explicit indication, which increases flexibility of network scheduling, as well as ensuring a consistent understanding of the HARQ-ACK codebook between the network and the UE and increasing reliability of HARQ-ACK codebook transfer.

According to an embodiment of the present disclosure, the way of implicit indication may be implicitly indicating the priority of the triggered HARQ-ACK codebook through DCI formats. For example, if the DCI format is DCI format 1, the priority of the triggered HARQ-ACK codebook is low; if the DCI format is DCI format 2, the priority of the triggered HARQ-ACK codebook is high. The DCI format 1 may be one of DCI format 1_0, and/or DCI format 1_1, and/or DCI format 1_2. The DCI format 2 may be one of DCI format 1_0, and/or DCI format 1_1, and/or DCI format 1_2. Specifically, for a certain priority or a default priority, a DCI format for downlink scheduling may be configured as one or more of DCI format 1_0, and/or DCI format 1_1, and/or DCI format 1_2 through standard specifications.

This method triggers HARQ-ACK codebooks with different priorities by implicit indication, which increases flexibility of network scheduling and improves spectrum efficiency of the network, without increasing DCI signaling overhead.

According to an embodiment of the present disclosure, the implicit indication may indicate the priority of the triggered HARQ-ACK codebook through an RNTI (Radio Network Temporary Identity). For example, the priority of the HARQ-ACK codebook triggered by DCI scrambled by a first type of RNTI is low, and the priority of the HARQ-ACK codebook triggered by DCI scrambled by a second type of RNTI is high. The first type of RNTI may be C-RNTI, and/or MCS-C-RNTI, and/or CS-RNT. The second type of RNTI may be C-RNTI, and/or MCS-C-RNTI, and/or CS-RNT. Specifically, for a certain priority or a default priority, a RNTI scrambling a DCI for downlink scheduling may be specified as a C-RNTI, and/or MCS-C-RNTI, and/or CS-RNT by standards.

This method triggers HARQ-ACK codebooks with different priorities by implicit indication, which increases flexibility of network scheduling and improves spectrum efficiency of the network, without increasing DCI signaling overhead.

In another embodiment, HARQ-ACK information for DCI indicating SPS PDSCH release contained in the triggered HARQ-ACK codebook may be specified by standards or configured through higher layer signaling. For Rel-15, one PUCCH group includes at most one SPS PDSCH, and 1 bit may be added after or before the HARQ-ACK codebook to represent the HARQ-ACK information for the DCI indicating SPS PDSCH release.

According to an embodiment of the present disclosure, in the case where one or more SPS PDSCHs may be configured for a serving cell, for each serving cell, the number of bits of HARQ-ACK information for DCI indicating SPS PDSCH release contained in the triggered HARQ-ACK codebook may be specified by standards or configured through higher layer signaling. The numbers of bits of HARQ-ACK information for DCI indicating SPS PDSCH releases for respective serving cells may be the same or different.

According to an embodiment of the present disclosure, regarding to several serving cells, for a serving cell c, the number of bits of HARQ-ACK information for DCI indicating SPS PDSCH release on the serving cell c may be equal to the number of SPS PDSCH configurations for the serving cell c. Specifically, the number of the SPS PDSCH configurations for the serving cell c is M, and indexes of the SPS PDSCH configurations for the serving cell c are 0, 1, 2, M−1, respectively. The number of bits of the HARQ-ACK information for DCI indicating SPS PDSCH release on the serving cell c is M, which in turn corresponds to DCI indicating SPS PDSCH release with the SPS PDSCH configurations with the indexes 0, 1, 2, M−1 of the serving cell c, respectively. In this embodiment, the numbers of bits of HARQ-ACK information for DCI indicating SPS PDSCH releases on respective serving cells may be the same or different.

According to an embodiment of the present disclosure, regarding to several serving cells, for a serving cell c, the number of bits of HARQ-ACK information for DCI indicating SPS PDSCH release on the serving cell c may be indicated by the number of bits of a field indicating a HARQ procedure in a DCI format of the serving cell c, and the DCI format may be DCI format 1_0, and/or DCI format 1_1, and/or DCI format 1_2. Specifically, the number of bits of a field indicating a HARQ procedure in a DCI format of the serving cell c is N, and the indexes of the SPS PDSCH configurations for the serving cell c are 0, 1, 2, 2N−1, respectively. The number of bits of the HARQ-ACK information for DCI indicating SPS PDSCH release on the serving cell c is 2N, which in turn corresponds to DCI indicating SPS PDSCH release with the SPS PDSCH configurations with the indexes 0, 1, 2, 2N−1 of the serving cell c, respectively. In this embodiment, the numbers of bits of HARQ-ACK information for DCI indicating SPS PDSCH releases on respective serving cells may be the same or different.

According to an embodiment of the present disclosure, with regard to each serving cell, for a serving cell c, multiple bits of HARQ-ACK information for DCI indicating SPS PDSCH release in the HARQ-ACK codebook may be located after or before HARQ-ACK information bits of respective HARQ procedures of the serving cell c. In the HARQ-ACK codebook, multiple bits of HARQ-ACK information for DCI indicating SPS PDSCH release on each serving cell may also be located after or before HARQ-ACK information bits of respective HARQ procedures of all serving cells, and plurality of bits of HARQ-ACK information for DCI indicating SPS PDSCH releases on different serving cells may be sorted in ascending or descending order of indexes of the serving cells. Multiple bits of HARQ-ACK information for DCI indicating SPS PDSCH release on a same serving cell may be sorted in ascending or descending order of indexes of SPS PDSCH configurations.

According to an embodiment of the present disclosure, with regard to each serving cell, for a serving cell c, the number of bits of HARQ-ACK information for DCI indicating SPS PDSCH release on the serving cell c may also be equal to the number of configurations indicating one or more SPS PDSCH releases on the serving cell c. Specifically, the number of configurations indicating one or more SPS PDSCH releases on the serving cell c is P, and indexes of the configurations indicating the one or more SPS PDSCH releases on the serving cell c is 0, 1, 2, P−1, respectively. The number of bits of HARQ-ACK information for DCI indicating SPS PDSCH release on the serving cell c is P, which in turn corresponds to DCI indicating SPS PDSCH release with the configurations with the indexes 0, 1, 2, P−1 indicating the one or more SPS PDSCH releases of the serving cell c, respectively. In this embodiment, the numbers of bits of HARQ-ACK information for DCI indicating SPS PDSCH releases on respective serving cells may be the same or different.

According to an embodiment of the present disclosure, with regard to each serving cell, for a serving cell c, P bits of HARQ-ACK information for DCI indicating SPS PDSCH release in the HARQ-ACK codebook may be located after or before HARQ-ACK information bits of respective HARQ procedures of the serving cell c. In the HARQ-ACK codebook, P bits of HARQ-ACK information for DCI indicating SPS PDSCH release on each serving cell may also be located after or before HARQ-ACK information bits of respective HARQ procedures of all serving cells, and P bits of HARQ-ACK information for DCI indicating SPS PDSCHs release on different serving cells may be sorted in ascending or descending order of indexes of the serving cells. P bits of HARQ-ACK information for DCI indicating SPS PDSCH release on a same serving cell may be sorted in ascending or descending order of indexes of SPS PDSCH configurations.

According to an embodiment of the present disclosure, with regard to each serving cell, for a serving cell c, the number of bits of HARQ-ACK information for DCI indicating SPS PDSCH release on the serving cell c may be configured as Qc through higher layer signaling. Specifically, the HARQ-ACK information for DCI indicating SPS PDSCH release on the serving cell c may indicate HARQ-ACK information for the latest Qc DCI indicating SPS PDSCH releases received before transmission of the HARQ-ACK codebook. Optionally, the HARQ-ACK information for DCI indicating SPS PDSCH release should satisfy a requirement of UE processing capability, that is, satisfy a certain timeline requirement. In this embodiment, the Qc configured by higher layer signaling may be the same or different for various serving cells.

According to an embodiment of the present disclosure, with regard to each serving cell, for a serving cell c, Qc bits of HARQ-ACK information for DCI indicating SPS PDSCH release in the HARQ-ACK codebook may be located after or before HARQ-ACK information bits of respective HARQ procedures of the serving cell c. In the HARQ-ACK codebook, multiple bits of HARQ-ACK information for DCI indicating SPS PDSCH release on each serving cell may also be located after or before HARQ-ACK information bits of respective HARQ procedures of all serving cells, and plurality of bits of HARQ-ACK information for DCI indicating SPS PDSCH releases on different serving cells may be sorted in ascending or descending order of indexes of the serving cells. Multiple bits of HARQ-ACK information for DCI indicating SPS PDSCH release on a same serving cell may be sorted in ascending or descending order of indexes of SPS PDSCH configurations.

This method provides explicit and implicit ways to indicate the number of bits of HARQ-ACK information for DCI indicating SPS PDSCH release on each serving cell, which may ensure a consistent understanding of the HARQ-ACK codebook between the base station and the UE, and this method can trigger to transmit HARQ-ACK information for DCI indicating SPS PDSCH release while feeding back HARQ-ACK information of downlink data, and increase flexibility of scheduling. This method may reduce a time delay of feeding back corresponding HARQ-ACK information for DCI indicating SPS PDSCH release, and may also reduce physical layer signaling overhead of separately feeding back corresponding HARQ-ACK information for DCI indicating SPS PDSCH release, which increase spectrum efficiency of the system.

According to an embodiment of the present disclosure, with regard to each serving cell, for a serving cell c, state lists indicating SPS PDSCH releases may also be configured separately according to different priorities of the HARQ-ACK codebook of SPS PDSCH releases. Specifically, a HARQ-ACK codebook indicating SPS PDSCH releases can be of two different priorities, that is, priority 0 and priority 1, respectively. Priority 1 is higher than priority 0. A state list 0 indicating SPS PDSCH releases may be configured associated with priority 0. The state list 0 indicating SPS PDSCH releases includes one or more states indicating SPS PDSCH releases, and each state for SPS PDSCH release includes indexes of one or more SPS configurations. A state list 1 indicating SPS PDSCH releases may be configured associated with priority 1. The state list 1 indicating SPS PDSCH releases includes one or more states indicating SPS PDSCH releases, and each state for SPS PDSCH release includes indexes of one or more SPS configurations.

Each SPS PDSCH configuration may have one parameter indicating a HARQ-ACK codebook corresponding to a SPS PDSCH, and the HARQ-ACK codebook has a corresponding priority; or each SPS PDSCH configuration has one parameter indicating the priority of the HARQ-ACK codebook corresponding to the SPS PDSCH. A priority of SPS included in a state for each SPS PDSCH release in the state list 0 indicating SPS PDSCH releases should be 0, or the priority of the HARQ-ACK codebook corresponding to the SPS PDSCH is 0; a priority of SPS included in a state for each SPS PDSCH release in the state list 1 indicating SPS PDSCH releases should be 1, or the priority of the HARQ-ACK codebook corresponding to the SPS PDSCH is 1.

If there is a priority field in certain DCI indicating SPS PDSCH release, the priority field in the DCI is used to indicate a state list with the same priority indicating SPS PDSCH releases. Specifically, if the priority field in the DCI indicating the SPS PDSCH release indicates that the priority is 0, it indicates a state indicating SPS PDSCH release in the state list 0 indicating SPS PDSCH releases; if the priority field in the DCI indicating the SPS PDSCH release indicates that the priority is 1, it indicates a state indicating SPS PDSCH release in the state list 1 indicating SPS PDSCH releases.

If there is no priority field in certain DCI indicating SPS PDSCH release, a priority may be specified for the DCI format. Specifically, if the DCI indicating SPS PDSCH release is DCI format 1_0, it corresponds to priority 0, which indicates a state indicating SPS PDSCH release in the state list 0 indicating SPS PDSCH releases. Similarly, a priority may also be fixed for other DCI format. For example, priorities of different DCI formats may be specified by standards, or priorities of different DCI formats may also be configured through higher layer signaling.

This method distinguishes state lists with different priorities indicating SPS PDSCH releases, which reduces the number of bits in DCI. For example, priority 0 has 4 states that indicate SPS PDSCH releases, priority 1 has 4 states that indicate SPS PDSCH releases, and a total of 8 indication statues. If it is indicated in DCI, 3 bits are needed to indicate. The present disclosure can use 2 bits to indicate, which saves signaling overhead by one bit. In the case where DCI overhead is the same, this method can indicate more statues that indicate SPS PDSCH releases. For example, for a same 3-bit scenario, this method can respectively indicate 8 states with priority 0 indicating SPS PDSCH releases and 8 states with priority 1 indicating SPS PDSCH releases. Therefore, the present disclosure increases flexibility of scheduling.

According to an embodiment of the present disclosure, if the HARQ-ACK codebook contains HARQ-ACK information for DCI indicating SPS PDSCH release, a time relationship that a time when the DCI indicating SPS PDSCH release is received and a time of transmitting the HARQ-ACK codebook containing the HARQ-ACK information for the DCI indicating SPS PDSCH release should satisfies may be specified by standards or configured through higher layer signaling. For example, a time interval between reception of the DCI and transmission of the HARQ-ACK codebook is no more than X slots or sub-slots or OFDM symbols, and the time interval between the reception of the DCI and the transmission of the HARQ-ACK codebook is no less than Y slots or sub-slots or OFDM symbols.

This method may feed back HARQ-ACK information corresponding to DCI indicating SPS PDSCH releases at the same time in the HARQ-ACK codebook, may reduce a time delay of feeding back the HARQ-ACK information corresponding to the DCI indicating SPS PDSCH releases, and may also reduce a physical layer signaling overhead for separately feeding back the HARQ-ACK information corresponding to the DCI indicating SPS PDSCH releases, which increases spectrum efficiency of the system.

In another embodiment, it may be specified by standards and/or configured through higher layer signaling, so that the triggered HARQ-ACK codebook includes HARQ-ACK information for DCI indicating SPS PDSCH release, which replaces HARQ-ACK information for a HARQ procedure in the HARQ-ACK codebook. A specific HARQ procedure corresponding to DCI indicating SPS PDSCH release may be configured through higher layer signaling. For example, for a serving cell of respective serving cells, the higher layer signaling configures DCI indicating SPS PDSCH release of the serving cell c, to replace HARQ-ACK information for a HARQ procedure 0 of the serving cell c. A specific HARQ procedure corresponding to DCI indicating SPS PDSCH release may also be calculated by a formula. For example, bits of a HARQ procedure in the HARQ-ACK codebook corresponding to a most recently received SPS PDSCH may be used to feed back HARQ-ACK information for DCI indicating SPS PDSCH release.

This method may feed back HARQ-ACK information corresponding to DCI indicating SPS PDSCH release at the same time in the HARQ-ACK codebook without increasing the number of bits in the HARQ-ACK codebook, may reduce a time delay of feeding back the HARQ-ACK information corresponding to the DCI indicating SPS PDSCH release, and may also reduce a physical layer signaling overhead for separately feeding back the HARQ-ACK information corresponding to the DCI indicating SPS PDSCH release, which increases spectrum efficiency of the system.

According to an embodiment of the present disclosure, CS-RNTI scrambled DCI indicating SPS PDSCH release may be used to trigger transmission of a HARQ-ACK codebook for all configured HARQ procedures. At this time, all bits in a frequency domain resource assignment field are 1. In the DCI, 1 bit may be used to explicitly indicate whether to trigger the transmission of the HARQ-ACK codebook for all configured HARQ procedures. If the 1 bit in the DCI is 1, it indicates to trigger the transmission of the HARQ-ACK codebook for all configured HARQ procedures. If the 1 bit in the DCI is 0, it indicates not to trigger the transmission of the HARQ-ACK codebook for all configured HARQ procedures. Alternatively, if the 1 bit in the DCI is 0, it indicates to trigger the transmission of the HARQ-ACK codebook for all configured HARQ procedures. If the 1 bit in the DCI is 1, it indicates not to trigger the transmission of the HARQ-ACK codebook for all configured HARQ procedures. HARQ-ACK information bits corresponding to the DCI may be located after or before the HARQ-ACK codebook for all configured HARQ procedures.

This method may trigger the transmission of the HARQ-ACK codebook for all configured HARQ procedures by the DCI indicating SPS PDSCH release, which may improve flexibility of network scheduling and reduce a time delay of feeding back HARQ-ACK information for all configured HARQ procedures, and increase spectrum efficiency of the system.

According to an embodiment of the present disclosure, the triggered HARQ-ACK codebook includes HARQ-ACK information for DCI indicating SPS PDSCH release, which replaces HARQ-ACK information for a HARQ procedure in the HARQ-ACK codebook. A specific HARQ procedure corresponding to DCI indicating SPS PDSCH release may be configured through higher layer signaling, for example, the higher layer signaling configures that DCI indicating SPS PDSCH release corresponds to a HARQ procedure 0 of the serving cell c. A HARQ procedure specifically corresponding to DCI indicating SPS PDSCH release may also be calculated by a formula. For example, HARQ-ACK information for DCI indicating SPS PDSCH release may be fed back according to bits of a HARQ procedure in the HARQ-ACK codebook corresponding to a most recently received SPS PDSCH corresponding to the DCI indicating the SPS PDSCH release.

This method may feedback HARQ-ACK information for DCI indicating SPS PDSCH release while feeding back HARQ-ACK information for all HARQ-ACK codebook procedures, without increasing a HARQ-ACK codebook, which increases flexibility of scheduling. This method may reduce a time delay of feeding back HARQ-ACK information corresponding to DCI indicating SPS PDSCH release, and may also reduce a physical layer signaling overhead of separately feeding back the HARQ-ACK information corresponding to the DCI indicating SPS PDSCH release, which increases spectrum efficiency of the system.

In another embodiment, a DCI scrambled by a RNTI for dynamic data scheduling may be used to trigger transmission of a HARQ-ACK codebook for all configured HARQ procedures. The RNTI for dynamic data scheduling may be a C-RNTI or a MCS-C-RNTI. In the DCI, 1 bit may be used to explicitly indicate whether to trigger the transmission of the HARQ-ACK codebook for all configured HARQ procedures. If the 1 bit in the DCI is 1, it indicates to trigger the transmission of the HARQ-ACK codebook for all configured HARQ procedures. If the 1 bit in the DCI is 0, it indicates not to trigger the transmission of the HARQ-ACK codebook for all configured HARQ procedures. Alternatively, if the 1 bit in the DCI is 0, it indicates to trigger the transmission of the HARQ-ACK codebook for all configured HARQ procedures. If the 1 bit in the DCI is 1, it indicates not to trigger the transmission of the HARQ-ACK codebook for all configured HARQ procedures. Moreover, at this time, a frequency domain resource assignment field may be used to indicate whether the DCI schedules a PDSCH at the same time. If the frequency domain resource assignment field indicates an effective frequency domain resource, it is considered that the DCI schedules a PDSCH at the same time. If the frequency domain resource assignment field indicates an invalid frequency domain resource, it is considered that the DCI does not schedule a PDSCH. Specifically, if frequency domain resource allocation adopts type 0, that is, a bitmap mode, all bits of the frequency domain resource assignment field in the DCI being 0 may be used to indicate that there is no PDSCH scheduling; if frequency domain resource allocation adopts type 1, that is, if a starting RB (Resource Block) of a frequency domain resource and the length of the RB are indicated, all bits of the frequency domain resource assignment field in the DCI being 1 may be used to indicate that there is no PDSCH scheduling.

This method may indicate whether to trigger HARQ-ACK feedback of all HARQ procedures through a time domain allocation resource field in DCI without downlink data scheduling, and at this time, the field of frequency domain resource allocation is an invalid frequency domain resource indication. This method increases flexibility of scheduling.

In another embodiment, in the case where SPS PDSCH releasing is indicated by DCI scrambled by one CS-RNTI, even if the DCI includes 1 bit indicating whether to trigger transmission of the HARQ-ACK codebook for all configured HARQ procedures, the transmission of the HARQ-ACK codebook for all configured HARQ procedures is not triggered. That is, the UE does not expect that feedback of HARQ-ACK information for all HARQ procedures is triggered by DCI indicating SPS PDSCH releasing.

This method specifies that DCI indicating SPS PDSCH releasing cannot trigger HARQ-ACK feedback for all HARQ procedures at the same time, which ensures a consistent understanding of scheduling between the base station and the UE, and standardizes behavior of the UE.

In another embodiment, enhancement is performed on the basis of a 3GPP TS 38.213 Type-1 HARQ-ACK codebook. The 3GPP TS 38.213 Type-1 HARQ-ACK codebook (semi-static HARQ-ACK codebook) determines the size of the HARQ-ACK codebook according to parameters of semi-static configurations. For a serving cell c, on its active BWP (band width part), the number of PDSCHs that would be fed back in a downlink slot i is determined by the maximum value of the number of PDSCHs that do not overlap in the downlink slot i. Time domain resource occupied by a PDSCH is determined by a certain row, which is dynamically indicated by DCI, of the time domain resource allocation table, which is configured by higher layer signaling. Specifically, the first row of the time domain resource allocation table indicates the starting OFDM symbol of 0 and an OFDM symbol length of 4, the second row of the time domain resource allocation table indicates the starting OFDM symbol of 4 and an OFDM symbol length of 4, and the third row of the time domain resource allocation table indicates the starting OFDM symbol of 7 and an OFDM symbol length of 4. A downlink scheduled PDSCH may be indicated with any row of the time domain resource allocation table. In this embodiment, if all OFDM symbols in the downlink slot i are downlink symbols, the maximum value of the number of PDSCHs that do not overlap in the downlink slot i is 2. At this time, the Type-1 HARQ-ACK codebook would transmit HARQ-ACK information for 2 PDSCHs. In R15, PDSCH repetitive transmissions take 1 downlink slot as the period, time domain resources and frequency domain resources occupied in each downlink slot are the same, and the number of repetitive transmissions is configured through higher layer signaling. At this time, the position of HARQ-ACK information for PDSCH repetitive transmissions in the Type-1 HARQ-ACK codebook is determined according to the last PDSCH of the PDSCH repetitive transmissions. A time interval between the last PDSCH of the PDSCH repetitive transmissions and a PUCCH feeding back HARQ-ACK is K1 uplink slots. In R16, since PDSCHs can be with intra slot repetitive transmissions, if the position of HARQ-ACK information for PDSCHs in the Type-1 HARQ-ACK codebook is determined according to time resources for the last PDSCH, it may happen that the last PDSCH does not have a corresponding position for the HARQ-ACK information in the 3GPP TS 38.213 Type-1 HARQ-ACK codebook. Specifically, in this embodiment, downlink scheduling DCI 1 schedules one PDSCH indicating the second row of the time domain resource allocation table, which repeats transmission twice in downlink slot i, and a time domain interval between the two PDSCH repetitive transmissions is 0 OFDM symbol. A first PDSCH repetitive transmission is located at OFDM symbols 4-7 in the slot i; and a second PDSCH repetitive transmission is located at OFDM symbols 8-11 in the slot i. The time domain interval of the two PDSCH repetitive transmissions may also be configured as other values in units of OFDM symbols through higher layer signaling. According to existing PUCCH slot determination methods for the 3GPP TS 38.213 Type-1 HARQ-ACK codebook and HARQ-ACK, in the 3GPP TS 38.213 Type-1 HARQ-ACK codebook, there is no position for HARQ-ACK information corresponding to time domain resources occupied by the second PDSCH repetitive transmission. It may be specified by standards and/or configured through higher layer signaling that, in the 3GPP TS 38.213 Type-1 HARQ-ACK codebook, an uplink slot used for HARQ-ACK feedback of a PDSCH repetitive transmission in a slot is determined by the first PDSCH of the PDSCH intra slot repetitive transmissions. That is, for downlink scheduling DCI, K1 indicates a time interval between the first PDSCH of the PDSCH intra slot repetitive transmissions and a PUCCH feeding back HARQ-ACK, and the position of HARQ-ACK information for this PDSCH in the Type-1 HARQ-ACK codebook is determined according to the time resource of the first PDSCH of the PDSCH intra slot repetitive transmissions. In this embodiment, the position of HARQ-ACK information for a PDSCH scheduled by DCI 1 in the 3GPP TS 38.213 Type-1 HARQ-ACK codebook is determined by the starting OFDM symbol being 4 and the OFDM symbol length being 4 of the slot i.

In another embodiment, the 3GPP TS 38.213 Type-1 HARQ-ACK codebook may also be determined by an extended time domain resource allocation table. A position of HARQ-ACK information for PDSCH repetitive transmissions in the type-1 HARQ-ACK codebook is determined according to time domain resources for the last PDSCH of the PDSCH repetitive transmissions. A time interval between the last PDSCH of the PDSCH repetitive transmissions and a PUCCH feeding back HARQ-ACK is K1 uplink slots. Specifically, the first row of the time domain resource allocation table indicates the starting OFDM symbol of 0 and an OFDM symbol length of 4, the second row of the time domain resource allocation table indicates the starting OFDM symbol of 4 and an OFDM symbol length of 4, and the third row of the time domain resource allocation table indicates the starting OFDM symbol of 7 and an OFDM symbol length of 4. A downlink scheduled PDSCH may be indicated with any row of the time domain resource allocation table. In this embodiment, if all OFDM symbols in the downlink slot i are downlink symbols, the maximum value of the number of PDSCHs that do not overlap in the downlink slot i is 2. Specifically, in this embodiment, DCI 1 for downlink scheduling schedules one PDSCH indicating the second row of the time domain resource allocation table, which repeats transmission twice in downlink slot i, and a time domain interval between the two PDSCH repetitive transmissions is 0 OFDM symbol. A first PDSCH repetitive transmission is located at OFDM symbols 4, 5, 6, 7 in the slot i; and a second PDSCH repetitive transmission is located at OFDM symbols 8, 9, 10, 11 in the slot i. Possible time domain resources for all PDSCHs in the slot i are: OFDM symbols 0-3, OFDM symbols 4-7, OFDM symbols 8-11, and OFDM symbols 7-10. If a PDSCH repetitive transmission exceeds the last OFDM symbol in the slot, this PDSCH is an invalid PDSCH. That is, in this embodiment, the base station does not allow a PDSCH scheduling the third row of the time domain resource allocation table to be with intra slot repetitive transmissions. In this embodiment, the maximum value of the number of PDSCHs that do not overlap in the downlink slot i is 3. The position of HARQ-ACK information for a PDSCH scheduled by DCI 1 in the 3GPP TS 38.213 Type-1 HARQ-ACK codebook is determined by the starting OFDM symbol being 8 and the OFDM symbol length being 4 of the slot i. Optionally, this embodiment may also feed back HARQ-ACK information at corresponding positions of HARQ-ACK information in the 3GPP TS 38.213 Type-1 HARQ-ACK codebook for positions of all PDSCH transmissions.

This solution may ensure a consistent understanding of the HARQ-ACK codebook between the base station and the UE, and improve reliability of HARQ-ACK codebook transmission. In addition, the way of generating the HARQ-ACK codebook is determined by higher layer signaling configurations, which may increase flexibility of the HARQ-ACK codebook.

In another embodiment, it may be specified by standards that higher layer signaling does not allow simultaneously configuring PDSCH intra slot repetitive transmissions and type-1 HARQ-ACK codebook (semi-static HARQ-ACK codebook). This solution may ensure a consistent understanding of the HARQ-ACK codebook between the base station and the UE by configuration, and improve reliability of HARQ-ACK codebook transmission.

In another embodiment, the UE is configured with multiple activated SPS PDSCH configurations on a serving cell c. Optionally, a SPS PDSCH configuration #i is configured with the number Ni of inter slot repetitive transmissions, where Ni is an integer greater than or equal to 1, and if not configured, it is 1 by default. Optionally, a SPS PDSCH configuration #i is configured with a period Pi, where the unit of Pi is a slot, Pi is an integer greater than or equal to 1, and if not configured, it is 1 by default. Optionally, a SPS PDSCH configuration #i may also be configured with the number Mi of intra slot repetitive transmissions, where Mi is an integer greater than or equal to 1, for example, Mi is 2, and if not configured, it is 1 by default. For SPS PDSCHs with HARQ-ACK information to be transmitted in a same uplink slot, the HARQ-ACK information thereof would be multiplexed in a same HARQ-ACK codebook.

If the HARQ-ACK codebook only contains HARQ-ACK information for SPS PDSCHs, and each SPS PDSCH has no associated PDCCH, that is, the HARQ-ACK codebook does not include HARQ-ACK feedback for a dynamically scheduled PDSCH, nor does it include HARQ-ACK feedback for DCI indicating SPS PDSCH release, or HARQ-ACK feedback for a first activated SPS PDSCH, the UE generates the HARQ-ACK codebook according to the following method.

If the UE is configured with multiple serving cells, each serving cell generates its own HARQ-ACK first-level sub-codebook for SPS PDSCHs, and the HARQ-ACK first-level sub-codebook of each serving cell composes the HARQ-ACK codebook in ascending order of indexes of the serving cells.

A HARQ-ACK second-level sub-codebook of each serving cell is sorted in ascending order of indexes of activated SPS PDSCH configurations configured for the serving cell.

A HARQ-ACK third-level sub-codebook for each SPS PDSCH is sorted in order of time sequences of downlink slots in which SPS PDSCHs are located. For example, if a downlink SCS (Sub-Carrier-Spacing) is greater than an uplink SCS, that is, the length of an uplink slot is equal to the length of multiple downlink slots. If a SPS PDSCH period is small, multiple data packets of a same SPS PDSCH configuration will be fed back in a same uplink slot. For example, the uplink SCS is 15 kHz, and the downlink SCS is 30 kHz. A period of a SPS PDSCH configuration #1 is 1 slot, and the number of inter slot repetitive transmissions of the SPS PDSCH configuration #1 is 1. For each uplink slot, there will be two data of the SPS PDSCH configuration #1 for which HARQ-ACK information would be fed back.

A HARQ-ACK fourth-level sub-codebook for each SPS PDSCH configuration in a downlink slot is sorted in order of time sequences of SPS PDSCHs. For example, an uplink SCS and a downlink SCS are the same. A period of a SPS PDSCH configuration #2 is 1 slot, and the number of inter slot repetitive transmissions of the SPS PDSCH configuration #2 is 1. The number of intra slot repetitive transmissions is configured as 2 for the SPS PDSCH configuration #2. For each downlink slot, there will be data of two SPS PDSCH configuration #2 for which HARQ-ACK information would be fed back.

Optionally, it may be specified by standards and/or configured through higher layer signaling that, if transmission of a SPS PDSCH and/or inter slot repetitive transmissions of a SPS PDSCH (including inter slot repetitive transmissions, and/or intra slot repetitive transmissions) conflicts with a dynamic SFI (Slot Format Indication), that is, at least one of OFDM symbols occupied by the SPS PDSCH is indicated as uplink by the dynamic SFI, the UE would not receive the SPS PDSCH at this time, or it is specified that the UE would receive the SPS PDSCH at this time.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with an uplink dynamically scheduled PUSCH, that is, at least one of OFDM symbols occupied by the SPS PDSCH is the same as an OFDM symbol occupied by the dynamically scheduled PUSCH, the UE would not receive the SPS PDSCH at this time, or it is specified that the UE would receive the SPS PDSCH at this time.

If at least two of SPS PDSCHs that the UE would receive in a slot overlap in the time domain, the UE only receives the SPS PDSCH with the smallest SPS PDSCH configuration index in the slot. If the UE receives at least one repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH. Alternatively, it may also be specified that, if the UE receives the last repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH.

If the HARQ-ACK codebook is a semi-static HARQ-ACK codebook, for example, a 3GPP TS 38.213 Type-1 HARQ-ACK codebook, in addition to HARQ-ACK information for SPS PDSCHs, the HARQ-ACK codebook further includes HARQ-ACK feedback for dynamically scheduled PDSCHs, or HARQ-ACK feedback for DCI indicating SPS PDSCH releases, or HARQ-ACK feedback for the first activated SPS PDSCH. The UE generates the HARQ-ACK codebook in accordance with the method of generating the 3GPP TS 38.213 Type-1 HARQ-ACK codebook.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with a dynamic SFI (Slot Format Indication), that is, at least one of OFDM symbols occupied by the SPS PDSCH is indicated as uplink by the dynamic SFI, the UE would not receive the SPS PDSCH at this time, or it is specified that the UE would receive the SPS PDSCH at this time.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with an uplink dynamically scheduled PUSCH, that is, at least one of OFDM symbols occupied by the SPS PDSCH is the same as an OFDM symbol occupied by the dynamically scheduled PUSCH, the UE would not receive the SPS PDSCH at this time, or it is specified that the UE would receive the SPS PDSCH at this time.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with a downlink dynamically scheduled PUSCH, that is, at least one of OFDM symbols occupied by the SPS PDSCH is the same as an OFDM symbol occupied by the dynamically scheduled PUSCH, the UE would not receive the SPS PDSCH at this time, or it is specified that the UE would receive the SPS PDSCH at this time.

Optionally, it may be specified by standards and/or configured through higher layer signaling that, if the UE receives a DCI indicating a SPS PDSCH release, the UE would not receive data of the SPS PDSCH configuration which is Q1 symbols after the DCI indicating the SPS PDSCH release. Q1 may be defined as a symbol interval between the end of the last symbol of the DCI indicating the SPS PDSCH release and the start of the first symbol of the SPS PDSCH. Q1 may also be defined as a symbol interval between the start of the first symbol of the DCI indicating the SPS PDSCH release and the start of the first symbol of the SPS PDSCH.

Optionally, it may be specified by standards and/or configured through higher layer signaling that, if the UE receives a DCI indicating a SPS PDSCH release, the UE would not receive data of the SPS PDSCH configuration which is W1 slots after the DCI indicating the SPS PDSCH release. W1 may be defined as a slot interval between a downlink slot where the DCI indicating the SPS PDSCH release is located and a downlink slot where the SPS PDSCH is located. W1 may also be equal to a time interval between the DCI indicating the SPS PDSCH release and HARQ-ACK feedback thereof.

If at least two of SPS PDSCHs that the UE would receive in a slot overlap in the time domain, the UE only receives the SPS PDSCH with the smallest SPS PDSCH configuration index in the slot. If the UE receives at least one repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH. Alternatively, it may also be specified that, if the UE receives the last repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH. Alternatively, it may also be specified that, if the UE receives at least one repetitive transmission of multiple repetitive transmissions (including inter slot repetitive transmissions and/or intra slot repetitive transmissions) of a SPS PDSCH, and a corresponding position of the SPS PDSCH in the HARQ-ACK codebook is not occupied by another dynamically scheduled PDSCHs and/or another SPS PDSCHs with smaller index, the UE would transmit HARQ-ACK information for the SPS PDSCH; otherwise, UE would not transmit HARQ-ACK information for the SPS PDSCH.

If the HARQ-ACK codebook is a dynamic HARQ-ACK codebook, for example, a 3GPP TS 38.213 Type-2 HARQ-ACK codebook. In addition to HARQ-ACK information for SPS PDSCHs, the HARQ-ACK codebook further includes HARQ-ACK feedback for dynamically scheduled PDSCHs, or HARQ-ACK feedback for DCI indicating SPS PDSCH releases, or HARQ-ACK feedback for the first activated SPS PDSCH. The UE generates the HARQ-ACK codebook in accordance with the method of generating the 3GPP TS 38.213 Type-2 HARQ-ACK codebook. A TB-level HARQ-ACK sub-codebook in the HARQ-ACK codebook is divided into two parts: a first part is the HARQ-ACK codebook for those with dynamical scheduling DCI(s), and a second part is the HARQ-ACK codebook for those without dynamical scheduling DCI(s). The second part that is the HARQ-ACK codebook for those without dynamical scheduling DCI(s) is generated according to the following method.

If the UE is configured with multiple serving cells, each serving cell generates its own HARQ-ACK first-level sub-codebook for SPS PDSCHs, and the HARQ-ACK first-level sub-codebook of each serving cell composes the HARQ-ACK codebook in ascending order of indexes of the serving cells.

A HARQ-ACK second-level sub-codebook of each serving cell is sorted in ascending order of indexes of activated SPS PDSCH configurations configured for the serving cell.

A HARQ-ACK third-level sub-codebook for each SPS PDSCH is sorted in order of time sequences of downlink slots in which SPS PDSCHs are located. For example, if a downlink SCS (Sub-Carrier-Spacing) is greater than an uplink SCS, that is, the length of an uplink slot is equal to the length of multiple downlink slots. If a SPS PDSCH period is small, multiple data packets of a same SPS PDSCH configuration will be fed back in a same uplink slot. For example, the uplink SCS is 15 kHz, and the downlink SCS is 30 kHz. A period of a SPS PDSCH configuration #1 is 1 slot, and the number of inter slot repetitive transmissions of the SPS PDSCH configuration #1 is 1. For each uplink slot, there will be the data of two SPS PDSCH configuration #1 for which HARQ-ACK information would be fed back.

A HARQ-ACK fourth-level sub-codebook for each SPS PDSCH configuration in a downlink slot is sorted in order of time sequences of SPS PDSCHs. For example, an uplink SCS and a downlink SCS are the same. A period of a SPS PDSCH configuration #2 is 1 slot, and the number of inter slot repetitive transmissions of the SPS PDSCH configuration #2 is 1. The number of intra slot repetitive transmissions is configured as 2 for the SPS PDSCH configuration #2. For each downlink slot, there will be data of two SPS PDSCH configuration #2 for which HARQ-ACK information would be fed back.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with a dynamic SFI (Slot Format Indication), that is, at least one of OFDM symbols occupied by the SPS PDSCH is indicated as uplink by the dynamic SFI, the UE would not receive the SPS PDSCH at this time, or it is specified that the UE would receive the SPS PDSCH at this time.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with an uplink dynamically scheduled PUSCH, that is, at least one of OFDM symbols occupied by the SPS PDSCH is the same as an OFDM symbol occupied by the dynamically scheduled PUSCH, the UE would not receive the SPS PDSCH at this time, or it is specified that the UE would receive the SPS PDSCH at this time.

Optionally, it may be specified by standards and/or configured through higher layer signaling that, if transmission of a SPS PDSCH and/or repetitive transmissions of a SPS PDSCH (including inter slot repetitive transmissions, and/or intra slot repetitive transmissions) conflicts with a downlink dynamically scheduled PUSCH, that is, at least one of OFDM symbols occupied by the SPS PDSCH is the same as an OFDM symbol occupied by the dynamically scheduled PUSCH, the UE would not receive the SPS PDSCH at this time, or it is specified that the UE would receive the SPS PDSCH at this time.

Optionally, it may be specified by standards and/or configured through higher layer signaling that, if the UE receives a DCI indicating a SPS PDSCH release, the UE would not receive data of the SPS PDSCH configuration which is Q2 symbols after the DCI indicating the SPS PDSCH release. Q2 may be defined as a symbol interval between the end of the last symbol of the DCI indicating the SPS PDSCH release and the start of the first symbol of the SPS PDSCH. Q2 may also be defined as a symbol interval between the start of the first symbol of the DCI indicating the SPS PDSCH release and the start of the first symbol of the SPS PDSCH.

Optionally, it may be specified by standards and/or configured through higher layer signaling that, if the UE receives a DCI indicating a SPS PDSCH release, the UE would not receive data of the SPS PDSCH configuration which is W2 slots after the DCI indicating the SPS PDSCH release. W2 may be defined as a slot interval between a downlink slot where the DCI indicating the SPS PDSCH release is located and a downlink slot where the SPS PDSCH is located. W2 may also be equal to a time interval between the DCI indicating the SPS PDSCH release and HARQ-ACK feedback thereof.

Optionally, it may be specified by standards and/or configured through higher layer signaling that, if the UE receives a DCI indicating a SPS PDSCH release, only after transmitting ACK for DCI indicating a SPS PDSCH release, the UE would not receive data of SPS PDSCH configuration indicated by the DCI indicating SPS PDSCH release.

If at least two of SPS PDSCHs that the UE would receive in a slot overlap in the time domain, the UE only receives the SPS PDSCH with the smallest SPS PDSCH configuration index in the slot. If the UE receives at least one repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH. Alternatively, it may also be specified that, if the UE receives the last repetitive transmission of multiple repetitive transmissions (including inter slot repetitive transmissions and/or intra slot repetitive transmissions) of a SPS PDSCH, the UE would transmit HARQ-ACK information for the SPS PDSCH; otherwise, UE would not transmit HARQ-ACK information for the SPS PDSCH.

It should be noted that one HARQ-ACK codebook may be composed of one or more HARQ-ACK first-level sub-codebooks. One HARQ-ACK first-level sub-codebook may be composed of one or more HARQ-ACK second-level sub-codebooks. One HARQ-ACK second-level sub-codebook may be composed of one or more HARQ-ACK third-level sub-codebooks. One HARQ-ACK third-level sub-codebook may be composed of one or more HARQ-ACK fourth-level sub-codebooks.

It should be noted that symbols in this embodiment may be OFDM symbols.

This method defines the method for the UE to generate the HARQ-ACK codebook of SPS PDSCHs, clarifies the way that the UE generates the HARQ-ACK codebook in different situations, ensures a consistent understanding of the HARQ-ACK codebook between the base station and the UE, and improves reliability of the HARQ-ACK codebook. Meanwhile, the base station may increase scheduling flexibility and improve network performance by parameter configuration.

In another embodiment, it may be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE does not expect to receive data of the SPS PDSCH configuration #i which is Q3 OFDM symbols after the DCI indicating the release of the SPS PDSCH configuration #i. Q3 may be defined as a symbol interval between the end of the last OFDM symbol of the DCI indicating the release of the SPS PDSCH configuration #i and the start of the first OFDM symbol of the SPS PDSCH. Q3 may also be defined as a symbol interval between the end of the last OFDM symbol of the DCI indicating the release of the SPS PDSCH configuration #i and the end of the last OFDM symbol of the SPS PDSCH. Q3 may also be defined as a symbol interval between the start of the first OFDM symbol of the DCI indicating the release of the SPS PDSCH configuration #i and the start of the first OFDM symbol of the SPS PDSCH. Q3 may also be defined as a symbol interval between the start of the first OFDM symbol of the DCI indicating the release of the SPS PDSCH configuration #i and the end of the last OFDM symbol of the SPS PDSCH.

It may also be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE does not expect to receive data of the SPS PDSCH configuration #i which is Q4 OFDM symbols after a PUCCH of HARQ-ACK feedback for the DCI indicating the release of the SPS PDSCH configuration #i. Q4 may be defined as a symbol interval between the end of the last OFDM symbol of the PUCCH of the HARQ-ACK feedback for the DCI indicating the release of the SPS PDSCH configuration #i and the start of the first OFDM symbol of the SPS PDSCH. Q4 may also be defined as a symbol interval between the end of the last OFDM symbol of the PUCCH of the HARQ-ACK feedback for the DCI indicating the release of the SPS PDSCH configuration #i and the end of the last OFDM symbol of the SPS PDSCH. Q4 may also be defined as a symbol interval between the start of the first OFDM symbol of the PUCCH of the HARQ-ACK feedback for the DCI indicating the release of the SPS PDSCH configuration #i and the start of the first OFDM symbol of the SPS PDSCH. Q4 may also be defined as a symbol interval between the start of the first OFDM symbol of the PUCCH of the HARQ-ACK feedback for the DCI indicating the release of the SPS PDSCH configuration #i and the end of the last OFDM symbol of the SPS PDSCH. It should be noted that, a behavior of the UE may be different for different types of HARQ-ACK codebooks. Specifically, Q4 of each HARQ-ACK codebook may be specified by standards and/or configured through higher layer signaling.

It may also be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE does not expect to transmit HARQ-ACK information for data of the SPS PDSCH configuration #i which is Q5 OFDM symbols after the DCI indicating the release of the SPS PDSCH configuration #i. Q5 may be defined as a symbol interval between the end of the last OFDM symbol of the DCI indicating the release of the SPS PDSCH configuration #i and the start of the first OFDM symbol of the SPS PDSCH. Q5 may also be defined as a symbol interval between the end of the last OFDM symbol of the DCI indicating the release of the SPS PDSCH configuration #i and the end of the last OFDM symbol of the SPS PDSCH. Q5 may also be defined as a symbol interval between the start of the first OFDM symbol of the DCI indicating the release of the SPS PDSCH configuration #i and the start of the first OFDM symbol of the SPS PDSCH. Q5 may also be defined as a symbol interval between the start of the first OFDM symbol of the DCI indicating the release of the SPS PDSCH configuration #i and the end of the last OFDM symbol of the SPS PDSCH. It should be noted that, a behavior of the UE may be different for different types of HARQ-ACK codebooks. Specifically, Q5 of each HARQ-ACK codebook may be specified by standards and/or configured through higher layer signaling.

It may also be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE does not expect to transmit HARQ-ACK information for data of the SPS PDSCH configuration #i which is Q6 OFDM symbols after a PUCCH of HARQ-ACK feedback for the DCI indicating the release of the SPS PDSCH configuration #i. Q6 may be defined as a symbol interval between the end of the last OFDM symbol of the PUCCH of the HARQ-ACK feedback for the DCI indicating the release of the SPS PDSCH configuration #i and the start of the first OFDM symbol of the SPS PDSCH. Q6 may also be defined as a symbol interval between the end of the last OFDM symbol of the PUCCH of the HARQ-ACK feedback for the DCI indicating the release of the SPS PDSCH configuration #i and the end of the last OFDM symbol of the SPS PDSCH. Q6 may also be defined as a symbol interval between the start of the first OFDM symbol of the PUCCH of the HARQ-ACK feedback for the DCI indicating the release of the SPS PDSCH configuration #i and the start of the first OFDM symbol of the SPS PDSCH. Q6 may also be defined as a symbol interval between the start of the first OFDM symbol of the PUCCH of the HARQ-ACK feedback for the DCI indicating the release of the SPS PDSCH configuration #i and the end of the last OFDM symbol of the SPS PDSCH. It should be noted that, a behavior of the UE may be different for different types of HARQ-ACK codebooks. Specifically, Q6 of each HARQ-ACK codebook may be specified by standards and/or configured through higher layer signaling.

It may also be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE transmits HARQ-ACK information for data of the SPS PDSCH configuration #i which is within Q7 OFDM symbols from the DCI indicating the SPS PDSCH configuration #i release. Q7 may be defined as a symbol interval between the end of the last OFDM symbol of the DCI indicating the release of the SPS PDSCH configuration #i and the start of the first OFDM symbol of the SPS PDSCH. Q7 may also be defined as a symbol interval between the end of the last OFDM symbol of the DCI indicating the release of the SPS PDSCH configuration #i and the end of the last OFDM symbol of the SPS PDSCH. Q7 may also be defined as a symbol interval between the start of the first OFDM symbol of the DCI indicating the release of the SPS PDSCH configuration #i and the start of the first OFDM symbol of the SPS PDSCH. Q7 may also be defined as a symbol interval between the start of the first OFDM symbol of the DCI indicating the release of the SPS PDSCH configuration #i and the end of the last OFDM symbol of the SPS PDSCH. It should be noted that, a behavior of the UE may be different for different types of HARQ-ACK codebooks. Specifically, Q7 of each HARQ-ACK codebook may be specified by standards and/or configured through higher layer signaling.

It may also be specified by standards and/or configured through higher layer signaling that, if the UE receives a DCI indicating a SPS PDSCH release (for example, a DCI indicating a release of a SPS PDSCH configuration #i, where i is an integer greater than or equal to 0), the UE transmit HARQ-ACK information for data of the SPS PDSCH configuration #i which is Q8 OFDM symbols before a PUCCH of HARQ-ACK feedback for the DCI indicating the release of the SPS PDSCH configuration #i. Q8 may be defined as a symbol interval between the end of the last OFDM symbol of the PUCCH of the HARQ-ACK feedback for the DCI indicating the release of the SPS PDSCH configuration #i and the start of the first OFDM symbol of the SPS PDSCH. Q8 may also be defined as a symbol interval between the end of the last OFDM symbol of the PUCCH of the HARQ-ACK feedback for the DCI indicating the release of the SPS PDSCH configuration #i and the end of the last OFDM symbol of the SPS PDSCH. Q8 may also be defined as a symbol interval between the start of the first OFDM symbol of the PUCCH of the HARQ-ACK feedback for the DCI indicating the release of the SPS PDSCH configuration #i and the start of the first OFDM symbol of the SPS PDSCH. Q8 may also be defined as a symbol interval between the start of the first OFDM symbol of the PUCCH of the HARQ-ACK feedback for the DCI indicating the release of the SPS PDSCH configuration #i and the end of the last OFDM symbol of the SPS PDSCH. It should be noted that, a behavior of the UE may be different for different types of HARQ-ACK codebooks. Specifically, Q8 of each HARQ-ACK codebook may be specified by standards and/or configured through higher layer signaling.

It should be noted that, Q3, Q4, Q5, Q6, Q7, and Q8 in this embodiment may take different values according to different UE capabilities and/or different SCSs. In this embodiment, the units of Q3, Q4, Q5, Q6, Q7, and Q8 may also be slots.

It should be noted that a DCI in this embodiment may be carried by a PDCCH, and transmission duration of the DCI in this embodiment may be equal to transmission duration of the PDCCH.

This method defines the behavior of the UE after receiving DCI indicating a SPS PDSCH release, ensures that the understanding of the HARQ-ACK codebook between the base station and the UE is consistent, and increases reliability of the HARQ-ACK codebook. Meanwhile, the base station may increase scheduling flexibility and improve network performance by parameter configuration.

In another embodiment, the UE is configured with an activated SPS PDSCH configuration on a serving cell c. The SPS PDSCH configuration is configured with the number N of inter slot repetitive transmissions (N is an integer greater than or equal to 1). The SPS PDSCH configuration is configured with a period P, and the unit of P is a slot (P is an integer greater than or equal to 1). Optionally, the SPS PDSCH configuration may also be configured with the number M of intra slot repetitive transmissions (M is an integer greater than or equal to 1, for example, M is 2), and if not configured, the number of transmissions is 1 by default.

If N is greater than 1, and/or M is greater than 1, one dynamically scheduled PDSCH can override one or more occasions of repetitive transmissions of the SPS PDSCH. It should be noted that an occasion herein refers to one transmission of the repetitive transmissions of the SPS PDSCH. Optionally, a DCI for dynamically scheduling PDSCH should satisfy a certain timing relationship with a SPS PDSCH overrode by the dynamically scheduled PDSCH.

Specifically, if the dynamically scheduled PDSCH can override one occasion of the SPS PDSCH repetitive transmissions, it may be specified that the DCI for dynamically scheduling the PDSCH should be earlier than the overrode SPS PDSCH occasion by A1 OFDM symbols, that is, the UE is not expected to receive a PDSCH in a serving cell scheduled by a DCI and a SPS PDSCH occasion in the same serving cell if the PDSCHs partially or fully overlap in time except if the DCI scheduling the PDSCH ends at least A1 OFDM symbols before the start of the SPS PDSCH occasion (the occasion herein refers to an occasion that overlaps with the dynamically scheduled PDSCH in the time domain).

Specifically, if the dynamically scheduled PDSCH may override more than one occasion of the repetitive transmissions of the SPS PDSCH, for example, the dynamically scheduled PDSCH is with inter slot repetitive transmissions. It may be specified that the DCI for the dynamically scheduling PDSCH should be earlier than the first overrode SPS PDSCH occasion by A2 OFDM symbols, that is, the UE is not expected to receive a PDSCH in a serving cell scheduled by a DCI and SPS PDSCH occasion(s) in the same serving cell if the PDSCHs partially or fully overlap in time except if the DCI scheduling the PDSCH ends at least A2 OFDM symbols before the start of the first SPS PDSCH occasion (the occasion herein refers to an occasion that overlaps with the dynamically scheduled PDSCH in the time domain).

In the case of a semi-static HARQ-ACK codebook, such as the 3GPP TS 38.213 Type-1 HARQ-ACK codebook, if receiving at least one occasion of SPS PDSCH repetitive transmissions, the UE would transmit HARQ-ACK information for the SPS PDSCH. The UE does not expect that the SPS PDSCH corresponds to the same bits as the dynamically scheduled PDSCH in the HARQ-ACK codebook.

In the case of a dynamic HARQ-ACK codebook, such as the 3GPP TS 38.213 Type-2 HARQ-ACK codebook, if receiving at least one occasion of SPS PDSCH repetitive transmissions, the UE would transmit HARQ-ACK information for the SPS PDSCH.

It should be noted that the time interval in this embodiment may also be defined as a time interval between the start of the DCI and start of the SPS PDSCH; the time interval in this embodiment may also be defined as a time interval between the start of the DCI and the end of the SPS PDSCH; the time interval in this embodiment may also be defined as a time interval between the end of the DCI and the start of the SPS PDSCH. The unit of the time interval in this embodiment may also be a slot.

It should be noted that, A1, A2 and other time intervals in this embodiment may take different values according to different UE capabilities and/or different SCSs. In this embodiment, the units of A1, A2 and other time intervals may also be slots. In this embodiment, A1, A2 and other time intervals may be specified by standards or configured through higher layer signaling.

It should be noted that a DCI in this embodiment may be carried by a PDCCH, and transmission duration of the DCI in this embodiment may be equal to transmission duration of the PDCCH.

This method specifies, in the case where the UE is configured with an activated SPS PDSCH configuration on a serving cell c and when the SPS PDSCH is with repetitive transmissions, a timing relationship that should be satisfied between the DCI for dynamically scheduling PDSCH and the SPS PDSCH, and the behavior of the UE after receiving the DCI of the dynamically scheduled PDSCH, ensures that the understanding of the HARQ-ACK codebook between the base station and the UE is consistent, and increases reliability of the HARQ-ACK codebook. Meanwhile, the base station may increase scheduling flexibility and improve network performance by parameter configuration.

In another embodiment, the UE is configured with an activated SPS PDSCH configuration on a serving cell c. The SPS PDSCH configuration is configured with the number N1 of inter slot repetitive transmissions (N1 is an integer greater than or equal to 1). The SPS PDSCH configuration is configured with a period P1, and the unit of P1 is a slot (P1 is an integer greater than or equal to 1). The UE can only receive one unicast PDSCH in a slot on a serving cell.

If N1 is greater than 1, one dynamically scheduled PDSCH may cancel one occasion of repetitive transmissions of the SPS PDSCH. It should be noted that an occasion herein refers to one transmission of the SPS PDSCH repetitive transmissions. Optionally, a DCI for dynamically scheduling PDSCH should satisfy a certain timing relationship with a SPS PDSCH canceled by the dynamically scheduled PDSCH.

Specifically, if the dynamically scheduled PDSCH may cancel one occasion of the SPS PDSCH repetitive transmissions, it may be specified that the DCI for dynamically scheduling PDSCH should be earlier than the canceled SPS PDSCH occasion by A3 OFDM symbols, that is, if the UE can only receive one unicast PDSCH in a slot on a serving cell, the UE is not expected to receive a PDSCH in a serving cell scheduled by a DCI and a SPS PDSCH occasion in a slot in the same serving cell except if the DCI scheduling the PDSCH ends at least A3 OFDM symbols before the start of the SPS PDSCH occasion (the occasion herein refers to an occasion that overlaps with the dynamically scheduled PDSCH in the time domain), If the DCI for dynamically scheduling PDSCH ends earlier than the start of the SPS PDSCH occasion by A3 OFDM symbols, the UE only receives the dynamically scheduled PDSCH in the slot, and the UE does not receive the SPS PDSCH occasion in the slot.

Specifically, if the dynamically scheduled PDSCH is in the same slot as more than one occasion of the SPS PDSCH repetitive transmissions, for example, the dynamically scheduled PDSCH is with inter slot repetitive transmissions, it may be specified that the DCI for dynamically scheduling PDSCH should be earlier than the first occasion of the canceled SPS PDSCH occasions by A4 OFDM symbols, that is, the UE is not expected to receive a PDSCH in a serving cell scheduled by a DCI and SPS PDSCH occasion (s) in a slot in the same serving cell except if the DCI scheduling the PDSCH ends at least A4 OFDM symbols before the start of the first SPS PDSCH occasion (the occasion herein refers to an occasion that overlaps with the dynamically scheduled PDSCH in the time domain). If the DCI for dynamically scheduling PDSCH ends earlier than the start of the first occasion of the SPS PDSCH occasions by A4 OFDM symbols, the UE only receives the dynamically scheduled PDSCH and does not receive the SPS PDSCH in these slots.

In the case of a semi-static HARQ-ACK codebook, such as the 3GPP TS 38.213 Type-1 HARQ-ACK codebook, if receiving at least one occasion of the SPS PDSCH repetitive transmissions, the UE would transmit HARQ-ACK information for the SPS PDSCH. The UE does not expect that the SPS PDSCH corresponds to the same bits as the dynamically scheduled PDSCH in the HARQ-ACK codebook.

In the case of a dynamic HARQ-ACK codebook, such as the 3GPP TS 38.213 Type-2 HARQ-ACK codebook, if receiving at least one occasion of the SPS PDSCH repetitive transmissions, the UE would transmit HARQ-ACK information for the SPS PDSCH. If the UE does not receive any occasion of the SPS PDSCH repetitive transmissions, it may be specified that the UE would transmit HARQ-ACK information for the SPS PDSCH canceled by the dynamically scheduled PDSCH, which is NACK at this time; alternatively, it may be specified that the UE would not transmit HARQ-ACK information for the SPS PDSCH canceled by the dynamically scheduled PDSCH.

It should be noted that the time interval in this embodiment may also be defined as a time interval between start of the DCI and start of the SPS PDSCH; the time interval in this embodiment may also be defined as a time interval between the start of the DCI and the end of the SPS PDSCH; the time interval in this embodiment may also be defined as a time interval between the end of the DCI and the start of the SPS PDSCH. The unit of the time interval in this embodiment may also be a slot.

It should be noted that, A3, A4 and other time intervals in this embodiment may take different values according to different UE capabilities and/or different SCSs. In this embodiment, the units of A3, A4 and other time intervals may also be slots. In this embodiment, A3, A4 and other time intervals may be specified by standards or configured through higher layer signaling.

It should be noted that a DCI in this embodiment may be carried by a PDCCH, and transmission duration of the DCI in this embodiment may be equal to transmission duration of the PDCCH.

It should be noted that the dynamically scheduled PDSCH and the cancelled SPS PDSCH occasion in this embodiment may overlap in the time domain, or may not overlap in the time domain.

It should be noted that this embodiment is also applicable to the UE configured with multiple SPS PDSCH configurations. For each slot, the UE first selects a SPS PDSCH with the smallest SPS PDSCH index, then if the DCI for dynamically scheduling PDSCH cancels a SPS PDSCH in a slot, the DCI for dynamically scheduling PDSCH and the SPS PDSCH with the smallest index in the slot should satisfy the timing relationship specified in this embodiment.

This method specifies, in the case where the UE is configured with an activated SPS PDSCH configuration on a serving cell c, the UE can only receive one unicast PDSCH in a slot on a serving cell and when the SPS PDSCH is with repetitive transmissions, a timing relationship that should be satisfied between the DCI for dynamically scheduling PDSCH and the SPS PDSCH, and the behavior of the UE after receiving the DCI for dynamically scheduling PDSCH, ensures that the understanding of the HARQ-ACK codebook between the base station and the UE is consistent, and increases reliability of the HARQ-ACK codebook. Meanwhile, the base station may increase scheduling flexibility and improve network performance by parameter configuration.

In another embodiment, the UE is configured with an activated SPS PDSCH configuration on a serving cell c. The SPS PDSCH configuration is configured with the number N1 of inter slot repetitive transmissions (N1 is an integer greater than or equal to 1). The SPS PDSCH configuration is configured with a period P1, and the unit of P1 is a slot (P1 is an integer greater than or equal to 1). The UE can only receive one unicast PDSCH in a slot on a serving cell.

In a slot, one dynamically scheduled PDSCH may cancel all occasions of the SPS PDSCH repetitive transmissions. It should be noted that an occasion herein refers to one transmission of the SPS PDSCH repetitive transmissions. Optionally, a DCI for dynamically scheduling PDSCH should satisfy a certain timing relationship with a SPS PDSCH canceled by the dynamically scheduled PDSCH.

Specifically, if the dynamically scheduled PDSCH may cancel all occasions of the SPS PDSCH repetitive transmissions, it may be specified that the DCI for dynamically scheduling PDSCH should be earlier than the first occasion of the canceled SPS PDSCH by A5 OFDM symbols, that is, if the UE can only receive one unicast PDSCH in a slot on a serving cell, the UE is not expected to receive a PDSCH in a serving cell scheduled by a DCI and a SPS PDSCH occasion in a slot in the same serving cell except if the DCI scheduling the PDSCH ends at least A5 OFDM symbols before the start of the first SPS PDSCH occasion (the occasion herein refers to an occasion that overlaps with the dynamically scheduled PDSCH in the time domain), If the DCI for dynamically scheduling PDSCH ends earlier than the start of the first occasion of the SPS PDSCH by A5 OFDM symbols, the UE only receives the dynamically scheduled PDSCH in the slot.

In the case of a dynamic HARQ-ACK codebook, such as the 3GPP TS 38.213 Type-2 HARQ-ACK codebook, it may be specified that the UE would transmit HARQ-ACK information for the SPS PDSCH canceled by the dynamically scheduled PDSCH, which is NACK at this time; alternatively, it may be specified that the UE would not transmit HARQ-ACK information for the SPS PDSCH canceled by the dynamically scheduled PDSCH.

It should be noted that the time interval in this embodiment may also be defined as a time interval between start of the DCI and start of the SPS PDSCH; the time interval in this embodiment may also be defined as a time interval between the start of the DCI and the end of the SPS PDSCH; the time interval in this embodiment may also be defined as a time interval between the end of the DCI and the start of the SPS PDSCH. The unit of the time interval in this embodiment may also be a slot.

It should be noted that, A5 and other time intervals in this embodiment may take different values according to different UE capabilities and/or different SCSs. In this embodiment, the units of A5 and other time intervals may also be slots. In this embodiment, A5 and other time intervals may be specified by standards or configured through higher layer signaling.

It should be noted that a DCI in this embodiment may be carried by a PDCCH, and transmission duration of the DCI in this embodiment may be equal to transmission duration of the PDCCH.

It should be noted that the dynamically scheduled PDSCH and the cancelled SPS PDSCH occasion in this embodiment may overlap in the time domain, or may not overlap in the time domain.

It should be noted that this embodiment is also applicable to the UE configured with multiple SPS PDSCH configurations. For each slot, the UE first selects a SPS PDSCH with the smallest SPS PDSCH index, then if the DCI for dynamically scheduling PDSCH cancels a SPS PDSCH in a slot, the DCI for dynamically scheduling PDSCH and the SPS PDSCH with the smallest index in the slot should satisfy the timing relationship specified in this embodiment.

This method specifies, in the case where the UE is configured with an activated SPS PDSCH configuration on a serving cell c, the UE can only receive one unicast PDSCH in a slot on a serving cell and when the SPS PDSCH is with repetitive transmissions, a timing relationship that should be satisfied between the DCI for dynamically scheduling PDSCH and the SPS PDSCH, and the behavior of the UE after receiving the DCI for dynamically scheduling PDSCH, ensures that the understanding of the HARQ-ACK codebook between the base station and the UE is consistent, and increases reliability of the HARQ-ACK codebook. Meanwhile, the base station may increase scheduling flexibility and improve network performance by parameter configuration.

In another embodiment, the UE is configured with multiple activated SPS PDSCH configurations on a serving cell c. Optionally, each SPS PDSCH configuration #i (i is an integer greater than or equal to 0) is configured with the number Ni of inter slot repetitive transmissions (Ni is an integer greater than or equal to 1), and if not configured, the number of transmissions is 1 by default. Optionally, each SPS PDSCH configuration #i is configured with a period Pi, the unit of Pi is a slot (Pi is an integer greater than or equal to 1), and if not configured, the number of transmissions is 1 by default. Optionally, each SPS PDSCH configuration #i may also be configured with the number Mi of intra slot repetitive transmissions (Mi is an integer greater than or equal to 1), for example, Mi is 2, and if not configured, the number of transmissions is 1 by default. For SPS PDSCHs that transmit HARQ-ACK information in a same uplink slot, the HARQ-ACK information would be multiplexed in a same HARQ-ACK codebook.

Ni and/or Mi repetitive transmissions of each SPS PDSCH configuration #i are a bundle. If two or more repetitive transmissions bundles of different SPS PDSCH configurations overlap in the time domain, these repetitive transmissions bundles of SPS PDSCH configurations belong to a same group.

In method I, the UE in each group only receives repetitive transmissions bundle(s) of a SPS PDSCH configuration with the smallest index. Repetitive transmissions bundles of a SPS PDSCH configuration in a group would overlap with repetitive transmissions bundles of at least another SPS PDSCH configuration in the time domain.

Method 2 includes the following steps:

Step 1: The UE in each group receives repetitive transmissions bundle of a SPS PDSCH configuration with the smallest index;

Step 2: Delete from the group the repetitive transmissions bundle of the SPS PDSCH configuration with the smallest index, and repetitive transmissions bundle(s) of SPS PDSCH configuration(s) that overlap with the repetitive transmissions bundle of the SPS PDSCH configuration with the smallest index in the time domain, and repetitive transmissions bundles of the remaining SPS PDSCH configurations constitute a new group;

Step 3: Repeat step 1 and step 2, until the number of repetitive transmissions bundles of SPS PDSCH configurations in the group is 0, or the number of SPS PDSCHs to be received by the UE in a slot reaches the maximum number of unicast PDSCHs that the UE can receive in a slot.

It should be noted that, if the UE can only receive one unicast PDSCH in a slot on a serving cell, and if there are multiple activated SPS PDSCHs in a slot, it is considered that these SPS PDSCHs overlapping in the time domain should be handled according to the method of this embodiment, regardless of whether these SPS PDSCHs overlap in the time domain. That is, the UE only receives repetitive transmissions bundle of the SPS PDSCH configuration with the smallest index.

It should be noted that if the dynamically scheduled PDSCH and repetitive transmissions of multiple SPS PDSCH configurations overlap in the time domain, according to this embodiment, repetitive transmissions bundles of SPS PDSCH configurations to be received by the UE are selected firstly, and then the DCI for dynamically scheduling PDSCH and the repetitive transmissions bundles of the SPS PDSCH configurations to be received by the UE should also satisfy the timing relationship specified in other embodiments of the present disclosure. Alternatively, the DCI for dynamically scheduling PDSCH and repetitive transmissions bundles of each SPS PDSCH configuration should also satisfy the timing relationship specified in other embodiments of the present disclosure.

It should be noted that if the dynamically scheduled PDSCH and repetitive transmissions of multiple SPS PDSCH configurations overlap in the time domain, according to this embodiment, repetitive transmissions bundles of SPS PDSCH configurations to be received by the UE are selected firstly, and then the DCI for dynamically scheduling PDSCH and the repetitive transmissions bundles of the SPS PDSCH configurations to be received by the UE should also satisfy the timing relationship specified in other embodiments of the present disclosure. Alternatively, the DCI of the dynamically scheduled PDSCH and repetitive transmissions bundles of each SPS PDSCH configuration should also satisfy the timing relationship specified in other embodiments of the present disclosure.

It should be noted that, for a serving cell, if the total number of PDSCHs of the dynamically scheduled PDSCH and the firstly selected SPS PDSCHs to be received by the UE according to this embodiment in a slot is greater than the number of unicast PDSCHs that the UE can receive in a slot, the dynamically scheduled PDSCH may cancel repetitive transmissions bundles of SPS PDSCH configurations. Firstly, repetitive transmissions bundles of SPS PDSCH configurations that overlap with the dynamically scheduled PDSCH in the time domain are canceled. After that, if the total number of PDSCHs in a slot is still greater than the number of unicast PDSCHs that the UE can receive in a slot, cancellation is ordered in descending order of indexes of the SPS PDSCHs, until the number of unicast PDSCHs to be received by the UE in a slot is equal to the number of unicast PDSCHs that the UE can receive in a slot. The DCI for dynamically scheduling PDSCH and the repetitive transmissions bundles of the SPS PDSCH configurations to be received by the UE should also satisfy the timing relationship specified in other embodiments of the present disclosure. Alternatively, the DCI for dynamically scheduling PDSCH and repetitive transmissions bundles of each SPS PDSCH configuration should also satisfy the timing relationship specified in other embodiments of the present disclosure.

It should be noted that if the UE also receives a DCI indicating a SPS PDSCH release, according to this embodiment, the UE first selects repetitive transmissions bundles of SPS PDSCH configurations to be received by the UE, and then receives the repetitive transmissions bundles of the SPS PDSCH configurations and transmits HARQ-ACK information for the repetitive transmissions bundles of the SPS PDSCH configurations according to the timing relationship between SPS PDSCH reception(s) and HARQ-ACK feedback as well as the DCI indicating the SPS PDSCH release specified by other embodiments of the present disclosure.

This embodiment specifies the behavior of the UE if the UE is configured with multiple activated SPS PDSCH configurations and repetitive transmissions of these SPS PDSCHs overlap in the time domain. In this embodiment, repetitive transmissions bundle of a SPS PDSCH configuration are processed as a whole, which is easy to implement. Compared with method 2, method 1 has lower complexity and is easy to implement. Method 2 has better performance than method I, and can maximize the number of SPS PDSCHs that the UE can receive in a slot.

In another embodiment, the UE is configured with multiple activated SPS PDSCH configurations on a serving cell c. Optionally, each SPS PDSCH configuration #i is configured with the number Ni of inter slot repetitive transmissions (Ni is an integer greater than or equal to 1), and if not configured, the number of transmissions is 1 by default. Optionally, each SPS PDSCH configuration #i is configured with a period Pi, the unit of Pi is a slot (Pi is an integer greater than or equal to 1), and if not configured, the number of transmissions is 1 by default. Optionally, each SPS PDSCH configuration #i may also be configured with the number Mi of intra slot repetitive transmissions (Mi is an integer greater than or equal to 1, for example, Mi is 2), and if not configured, the number of transmissions is 1 by default. For SPS PDSCHs that transmit HARQ-ACK information in a same uplink slot, the HARQ-ACK information would be multiplexed in a same HARQ-ACK codebook.

If two or more repetitive transmissions occasions of different SPS PDSCH configurations overlap in the time domain in a slot, these repetitive transmissions occasions of SPS PDSCH configurations belong to a same group.

In method I, the UE in each group only receives occasions of repetitive transmissions bundles of a SPS PDSCH configuration with the smallest index in the slot. A repetitive transmissions occasion of a SPS PDSCH configuration in a group would satisfy to overlap with a repetitive transmissions occasion of at least another SPS PDSCH configuration in the time domain. If the repetitive transmissions occasion of the SPS PDSCH configuration is not a repetitive transmissions occasion of the first or last SPS PDSCH configuration in the group, it is required that the first OFDM symbol and the last OFDM symbol of the repetitive transmissions occasion of the SPS PDSCH configuration both overlap with a repetitive transmissions occasion of at least another SPS PDSCH configuration in the time domain.

Method 2 includes the following steps:

Step 1: The UE in each group receives repetitive transmissions occasion(s) of a SPS PDSCH configuration with the smallest index;

Step 2: Delete from the group the repetitive transmissions occasion(s) of the SPS PDSCH configuration with the smallest index, and repetitive transmissions occasion(s) of SPS PDSCH configuration(s) that overlap with the repetitive transmissions occasion(s) of the SPS PDSCH configuration with the smallest index in the time domain, and repetitive transmissions occasions of the remaining SPS PDSCH configurations constitutes a new group;

Step 3: Repeat step 1 and step 2, until the number of repetitive transmissions occasions of SPS PDSCH configurations in the group is 0, or the number of SPS PDSCHs to be received by the UE in a slot reaches the maximum number of unicast PDSCHs that the UE can receive in a slot.

It should be noted that, if the UE can only receive one unicast PDSCH in a slot on a serving cell, and if there are multiple activated SPS PDSCHs in a slot, it is considered that these SPS PDSCHs are overlapping in the time domain should be handled according to the method of this embodiment, regardless of whether these SPS PDSCHs overlap in the time domain. That is, the UE only receives repetitive transmissions bundle of the SPS PDSCH configuration with the smallest index.

It should be noted that, for a slot on a serving cell, if the dynamically scheduled PDSCH and repetitive transmissions of one or more SPS PDSCH configurations overlap in the time domain, according to this embodiment, repetitive transmissions occasion(s) of SPS PDSCH configuration(s) to be received by the UE in the slot are selected firstly, and then the DCI for dynamically scheduling PDSCH and the repetitive transmissions occasion(s) of the SPS PDSCH configuration(s) to be received by the UE should also satisfy the timing relationship specified in other embodiments of the present disclosure. Alternatively, the DCI for dynamically scheduling PDSCH and repetitive transmissions occasion(s) of each SPS PDSCH configuration should also satisfy the timing relationship specified in other embodiments of the present disclosure.

It should be noted that, for a serving cell, if the total number of PDSCHs of the dynamically scheduled PDSCH and the firstly selected SPS PDSCHs to be received by the UE according to this embodiment in a slot is greater than the number of unicast PDSCHs that the UE can receive in a slot, the dynamically scheduled PDSCH may cancel repetitive transmissions occasions of SPS PDSCH configurations. Firstly, repetitive transmissions occasions of SPS PDSCH configurations that overlap with the dynamically scheduled PDSCH in the time domain are canceled. After that, if the total number of PDSCHs in a slot is still greater than the number of unicast PDSCHs that the UE can receive in a slot, cancellation is ordered in descending order of indexes of the SPS PDSCHs, until the number of unicast PDSCHs to be received by the UE in a slot is equal to the number of unicast PDSCHs that the UE can receive in a slot. The DCI for dynamically scheduling PDSCH and the repetitive transmissions occasions of the SPS PDSCH configurations to be received by the UE should also satisfy the timing relationship specified in other embodiments of the present disclosure. Alternatively, the DCI for dynamically scheduling PDSCH and repetitive transmissions occasions of each SPS PDSCH configuration should also satisfy the timing relationship specified in other embodiments of the present disclosure.

It should be noted that if the UE also receives a DCI indicating a SPS PDSCH release, according to this embodiment, the UE first selects repetitive transmissions occasion(s) of SPS PDSCH configuration(s) to be received by the UE, and then receives the repetitive transmissions occasions of the SPS PDSCH configurations and transmits HARQ-ACK information for the repetitive transmissions occasions of the SPS PDSCH configurations according to the timing relationship between SPS PDSCH reception(s) and HARQ-ACK feedback as well as the DCI indicating the SPS PDSCH release specified by other embodiments of the present disclosure.

This embodiment specifies the behavior of the UE if the UE is configured with multiple activated SPS PDSCH configurations and repetitive transmissions of these SPS PDSCHs overlap in the time domain. In this embodiment, repetitive transmissions of SPS PDSCH configurations are processed separately for each slot, which can improve spectrum efficiency of the network. Compared with method 2, method 1 has lower complexity and is easy to implement. Method 2 has better performance than method I, and can maximize the number of SPS PDSCHs that the UE can receive in a slot.

In another embodiment, PDSCHs have two priorities: priority 0 and priority 1, wherein the priority of priority 0 is lower than the priority of priority 1. In addition, regarding dynamically scheduled PDSCHs and SPS PDSCHs, the order is: a dynamically scheduled PDSCH with priority 1 is higher than a SPS PDSCH with priority 1, the SPS PDSCH with priority 1 is higher than a dynamically scheduled PDSCH with priority 0, and the dynamically scheduled PDSCH with priority 0 is higher than a SPS PDSCH with priority 0.

If the UE can only receive one unicast PDSCH in a slot on a serving cell, if a dynamically scheduled PDSCH can cancel SPS PDSCHs with the lower priority according to the priority order specified in this embodiment, the timing relationship specified in other embodiments of the present disclosure should be satisfied. The UE only expects to receive the PDSCH with the highest priority.

If the UE can only receive W unicast PDSCHs in a slot on a serving cell, if a dynamically scheduled PDSCH can cancel SPS PDSCHs with the lower priority according to the priority order specified in this embodiment, the timing relationship specified in other embodiments of the present disclosure should be satisfied.

Specifically, a dynamically scheduled PDSCH with priority 0 can cancel SPS PDSCH(s) with priority 0, and SPS PDSCH(s) that overlap with the dynamically scheduled PDSCH in the time domain are cancelled firstly. If the total number of PDSCHs in a slot is still greater than the number W of unicast PDSCHs that the UE can receive in a slot, the cancellation is performed in descending order of indexes of SPS PDSCHs, until the number of unicast PDSCHs to be received by the UE in a slot is equal to the number of unicast PDSCHs that the UE can receive in a slot.

Specifically, a dynamically scheduled PDSCH with priority 1 can cancel SPS PDSCHs with priority 0 and SPS PDSCHs with priority 1, and SPS PDSCHs that overlap with the dynamically scheduled PDSCH in the time domain are canceled firstly. If the total number of unicast PDSCHs in a slot is still greater than the number W of unicast PDSCHs that the UE can receive in a slot, then SPS PDSCHs with priority 0 are cancelled, and the cancellation is performed in descending order of indexes of SPS PDSCHs, until the number of unicast PDSCHs to be received by the UE in a slot is equal to the number of unicast PDSCHs that the UE can receive in a slot, or all SPS PDSCHs with priority 0 are cancelled. If all SPS PDSCHs with priority 0 are cancelled and the total number of unicast PDSCHs in a slot is still greater than the number W of unicast PDSCHs that the UE can receive in a slot, then SPS PDSCHs with priority 1 are cancelled, and the cancellation is performed in descending order of indexes of SPS PDSCHs, until the number of unicast PDSCHs to be received by the UE in a slot is equal to the number of unicast PDSCHs that the UE can receive in a slot It should be noted that, if a SPS PDSCH is configured with repetitive transmissions, the specific method for dynamically scheduled PDSCHs to cancel the SPS PDSCH in this embodiment may adopt the methods specified in other embodiments of the present disclosure.

This embodiment specifies a method for dynamically scheduled PDSCHs to cancel SPS PDSCHs if PDSCHs have two priorities, clarifies the priority order of PDSCHs, clarifies the timing relationship of dynamically scheduled PDSCHs to cancel SPS PDSCHs, clarifies the behavior of the UE, and improve reliability of the network.

It should be noted that PDSCHs in all embodiments of the present disclosure refer to unicast PDSCHs, unless otherwise stated.

In another embodiment, the UE is configured with one downlink serving cell. The UE may indicate that it supports receiving multiple downlink DCIs on a same serving cell in a PDCCH monitoring occasion, and the HARQ-ACK codebook configured for the UE is a dynamic HARQ-ACK codebook, for example, 3GPP TS 38.213 Type-2 HARQ-ACK codebook. The UE may receive multiple downlink DCI formats for the serving cell in a PDCCH monitoring occasion to schedule PDSCHs of the serving cell. If the UE does not receive the last DCI format, the size of the HARQ-ACK codebook generated by the UE and the size of the HARQ-ACK codebook that the base station expects the UE to generate may be inconsistent, and the base station may not be able to decode the HARQ-ACK codebook correctly. To solve this problem, a total DAI (downlink assignment index) field may be introduced into the downlink DCI formats, such as DCI format 1_1, and/or DCI format 1_2, and the UE may determine the size of the HARQ-ACK codebook according to a value indicated by a T-DAI field in the DCI format received in the last PDCCH monitoring occasion.

For example, it may be specified by standard specifications that, for DCI format 1_x (x may be 1, 2, . . . ), downlink assignment index-number of bits as defined in the following:

4 bits: if one serving cell is configured in DL, and a higher layer parameter pdschHARQ-ACK-Codebook=dynamic or pdsch-HARQ-ACK-Codebook=enhancedDynamic-r16, and the UE reporting the capability of supporting receiving N downlink DCIs on a same serving cell in a PDCCH monitoring occasion, where N is an integer greater than 1, for example, N is equal to 2, or N is equal to 3, where, the 2 MSBs (Most Significant Bits) are the counter DAI, and the 2 LSBs (Least Significant Bits) are the total DAI;

Alternatively, for example, it may be specified by standard specifications that, for DCI format 1_2, downlink assignment indexes—the number of bits is defined as follows:

2 bits: if one serving cell is configured in DL, and a higher layer parameter pdschHARQ-ACK-Codebook=dynamic or pdsch-HARQ-ACK-Codebook=enhancedDynamic-r16, and the UE reporting the capability of supporting receiving N downlink DCI on a same serving cell in a PDCCH monitoring occasion, where N is an integer greater than 1, for example, N is equal to 2, or N is equal to 3, where, the 1 MSB (Most Significant Bit) is the counter DAI, and the 1 LSB (Least Significant Bit) is the total DAI;

Alternatively, for example, it may be specified by standard specifications that, for DCI format 1_x (x may be 1, 2, . . . ), downlink assignment index-number of bits as defined in the following:

4 bits: if one serving cell is configured in DL, the type of the HARQ-ACK codebook is configured as a dynamic codebook or an enhanced dynamic codebook, and the UE reports the capability of supporting receiving multiple downlink DCI on a same serving cell in a PDCCH monitoring occasion, where, the 2 MSBs (Most Significant Bits) are the counter DAI, and the 2 LSBs (Least Significant Bits) are the total DAI;

Alternatively, for example, it may be specified by standard specifications that, for DCI format 1_x (x may be 1, 2, . . . ), downlink assignment index-number of bits as defined in the following:

4 bits: if the type of the HARQ-ACK codebook is configured as a dynamic codebook or an enhanced dynamic codebook (for example, a higher layer parameter pdschHARQ-ACK-Codebook=dynamic or pdsch-HARQ-ACK-Codebook=enhancedDynamic-r16), and the UE reporting capability supports receiving multiple downlink DCI on a same serving cell in a PDCCH monitoring occasion, where, the 2 MSBs (Most Significant Bits) are the counter DAI, and the 2 LSBs (Least Significant Bits) are the total DAI;

This method specifies that downlink DCI format 1_1 and/or 1_2 both include a T-DAI field if the UE reporting capability supports receiving multiple downlink DCIs on a same serving cell in a PDCCH monitoring occasion, which may improve reliability of the HARQ-ACK codebook, reduce a retransmission probability of downlink data, and improve system spectrum efficiency.

The scheme for SPS PDSCHs in the present disclosure may also be used in uplink, for example, Configured Grant PUSCH pre-configured PUSCH.

According to an embodiment of the present disclosure, a DCI indicating SPS PDSCH release which is scrambled by CS-RNTI may be used to trigger transmission of a HARQ-ACK codebook for all configured HARQ procedures. For example, the HARQ-ACK codebook for all configured HARQ procedures may be a 3GPP TS 38.213 type-3 codebook.

If the UE receives that the DCI indicating SPS PDSCH release triggering the transmission of the HARQ-ACK codebook for all configured HARQ procedures, the UE transmits the HARQ-ACK codebook for all configured HARQ procedures, for example, the 3GPP TS 38.213 Type-3 codebook. The UE does not transmit the HARQ-ACK information for the DCI indicating SPS PDSCH release. Optionally, the DCI indicating SPS PDSCH release may be scrambled by a CS-RNTI. Optionally, the DCI indicating SPS PDSCH release may indicate one or more SPS PDSCH releases.

This method may trigger transmission of the HARQ-ACK codebook for all configured HARQ procedures by DCI indicating SPS PDSCH release, which may improve flexibility of network scheduling, reduce delay of feeding back HARQ-ACK information for all configured HARQ procedures, and increase spectrum efficiency of the system. This method implicitly feeds back ACK for DCI indicating SPS PDSCH release, which reduces the size of the HARQ-ACK codebook, saves PUCCH resources, reduces UE transmission power, and reduces interference to other UEs. If the base station receives the HARQ-ACK codebook for all configured HARQ procedures, it indicates that the UE has received the DCI indicating SPS PDSCH release.

In another embodiment, the UE is configured with a semi-static HARQ-ACK codebook, for example, 3GPP TS 38.213 Type-1 HARQ-ACK codebook. The semi-static HARQ-ACK codebook determines the size and the order of the HARQ-ACK codebook according to parameters of semi-static configurations.

For a serving cell c, the number of PDSCHs that would be fed back for a downlink slot i on its activated BWP (band width part) is determined by the maximum value of the number of PDSCHs that do not overlap in the downlink slot i. A TDRA (Time Domain Resource Allocation) table for time domain resources occupied by PDSCHs may be configured by higher layer signaling. A row in the TDRA table may indicate the number K0 of slot intervals between a PDCCH and a PDSCH, and a start and length indicator (SLIV) of the PDSCH.

The reference point S0 for the starting symbol S is defined as:
if it is configured to use the starting symbol of a PDCCH monitoring occasion as the reference point of the SLIV, for example, configured with the parameter ReferenceofSLIV-ForDCIFormat1_2, and when receiving a PDSCH scheduled by a DCI format 1_2 with CRC scrambled by C-RNTI, MCS-C-RNTI, CS-RNTI with K0=0, and PDSCH mapping Type B, the starting symbol S is relative to the starting symbol S0 of the PDCCH monitoring occasion where DCI format 1_2 is detected;
otherwise, the starting symbol S is relative to the start of the slot using S0=0.

When PDSCHs can be with repetitive transmissions, how to determine PDSCHs possibly to be received in a slot is a problem to be solved.

Method I: it may be specified by standard specifications that when the UE receives a DCI format to schedule PDSCH repetitive transmissions, the starting symbol S is relative to the start of the slot, S0=0. For example, PDSCH repetitive transmissions may be inter slot repetitive transmissions and/or intra slot repetitive transmissions. If PDSCH repetitive transmissions is inter slot repetitive transmissions, the number of repetitive transmissions may be semi-statically configured by higher layer signaling and/or dynamically indicated by DCI. If PDSCH repetitive transmissions is intra slot repetitive transmissions, a symbol interval $\bar{K}$ between 2 repetitive transmissions may be configured by higher layer signaling, and is 0 by default if not configured.

For example, the reference point S0 for starting symbol S is defined as:
if it is configured to use the starting symbol of a PDCCH monitoring occasion as the reference point of the SLIV (for example, configured with the parameter ReferenceofSLIV-ForDCIFormat1_2), when receiving a PDSCH scheduled by a DCI format 1_2 with CRC scrambled by C-RNTI, MCS-C-RNTI, CS-RNTI, K0=0, and PDSCH mapping Type B, and when the TDRA indicated by the DCI format does not include the parameter repetitionNumber, the starting symbol S is relative to the starting symbol S0 of the PDCCH monitoring occasion where DCI format 1_2 is detected;
otherwise, the starting symbol S is relative to the start of the slot using S0=0.

For another example, the reference point S0 for starting symbol S is defined as:
- if it is configured to use the starting symbol of a PDCCH monitoring occasion as the reference point of the SLIV (for example, configured with the parameter ReferenceofSLIV-ForDCIFormat1_2) and does not configured with the parameter pdsch-AggregationFactor, and when receiving a PDSCH scheduled by a DCI format 1_2 with CRC scrambled by C-RNTI, MCS-C-RNTI, CS-RNTI, K0=0, and PDSCH mapping Type B, the starting symbol S is relative to the starting symbol S0 of the PDCCH monitoring occasion where DCI format 1_2 is detected;
- otherwise, the starting symbol S is relative to the start of the slot using S0=0.

For another example, the reference point S0 for starting symbol S is defined as:
- if it is configured to use the starting symbol of a PDCCH monitoring occasion as the reference point of the SLIV (for example, configured with the parameter ReferenceofSLIV-ForDCIFormat1_2) and a repetitive transmissions mode parameter is not configured as tdmSchemeA, and when receiving a PDSCH scheduled by a DCI format 1_2 with CRC scrambled by C-RNTI, MCS-C-RNTI, CS-RNTI, K0=0, and PDSCH mapping Type B, the starting symbol S is relative to the starting symbol S0 of the PDCCH monitoring occasion where DCI format 1_2 is detected;
- otherwise, the starting symbol S is relative to the start of the slot using S0=0.

For another example, the reference point S0 for starting symbol S is defined as:
- if it is configured to use the starting symbol of a PDCCH monitoring occasion as the reference point of the SLIV (for example, configured with the parameter ReferenceofSLIV-ForDCIFormat1_2) and the parameter pdsch-AggregationFactor is not configured in PDSCH-Config, and when receiving a PDSCH scheduled by a DCI format 1_2 with CRC scrambled by C-RNTI, MCS-C-RNTI, CS-RNTI, K0=0, and PDSCH mapping Type B, the starting symbol S is relative to the starting symbol S0 of the PDCCH monitoring occasion where DCI format 1_2 is detected;
- if it is configured to use the starting symbol of a PDCCH monitoring occasion as the reference point of the SLIV (for example, configured with the parameter ReferenceofSLIV-ForDCIFormat1_2) and the parameter pdsch-AggregationFactor is not configured in PDSCH-Config or SPS-Config, and when receiving a PDSCH scheduled by a DCI format 1_2 with CRC scrambled by CS-RNTI with NDI=0, K0=0, and PDSCH mapping Type B, the starting symbol S is relative to the starting symbol S0 of the PDCCH monitoring occasion where DCI format 1_2 is detected;
- otherwise, the starting symbol S is relative to the start of the slot using S0=0.

It should be noted that the parameter pdsch-AggregationFactor in this embodiment may also be a parameter pdsch-AggregationFactor greater than 1.

This method clarifies that how to determine PDSCHs possibly to be received in a slot in a semi-static HARQ-ACK codebook, which ensures a consistent understanding of the size and the order of the HARQ-ACK codebook between the UE and the base station, improves reliability of HARQ-ACK codebook transmission, and avoids the situation that the base station schedules a PDSCH repetitive transmissions without feedback bit(s) in the semi-static HARQ-ACK codebook.

Method 2: in a semi-static HARQ-ACK codebook, PDSCHs possibly to be received in a downlink slot may be determined by SLIV(s) in the TDRA table, the number of inter slot repetitive transmissions, the configuration of PDCCH monitoring occasions, and the semi-static uplink and downlink configuration. For a SLIV with K0=0 in the TDRA table, an extended SLIV may be determined according to the number of inter slot repetitive transmissions and a PDCCH monitoring occasion. Optionally, the extended SLIV satisfies that the ending symbol of the PDSCH does not exceed the boundary of the slot. For a SLIV with K0=0 in the TDRA table, possible slot(s) for receiving a PDCCH is determined according to possible value(s) of the number of inter slot repetitive transmissions, and the SLIV is extended according to the possible slot(s) for receiving a PDCCH and the starting symbol of the PDCCH monitoring occasion therein. Optionally, the SLIV is extended according to starting symbols of PDCCH monitoring occasions in all slots. Optionally, whether the extended SLIV is a valid SLIV may be determined according to an uplink and downlink frame structure configuration, or may also be determined according to the uplink and downlink frame structure configuration and the number of repetitive transmission. A valid extended SLIV is added to the TDRA table. The UE determines PDSCHs possibly to be received according to SLIV(s) in the extended TDRA table.

Alternatively, if the type of repetitive transmissions is configured as intra slot repetitive transmissions, in a semi-static HARQ-ACK codebook, PDSCH(s) possibly to be received in a downlink slot may be determined by SLIV(s) in the TDRA table, a symbol interval $\overline{K}$ between 2 repetitive transmissions, the configuration of PDCCH monitoring occasions and the semi-static uplink and downlink configuration. Optionally, the end of the last repetitive transmission determined according to the extended SLIV and the symbol interval $\overline{K}$ between 2 repetitive transmissions will not exceed the slot boundary. Optionally, whether the extended SLIV is a valid SLIV may also be determined according to the uplink and downlink frame structure configuration. A valid extended SLIV is added to the TDRA table. The UE determines PDSCH(s) possibly to be received according to SLIV(s) in the extended TDRA table.

This method determines PDSCHs possibly to be received in a downlink slot in a semi-static HARQ-ACK codebook based on the number of inter slot repetitive transmissions and PDCCH monitoring occasion(s), which avoids the situation that the base station schedules a PDSCH repetitive transmissions without feedback bit(s) in the semi-static HARQ-ACK codebook, ensures a consistent understanding of the size and order of the HARQ-ACK codebook between the UE and the base station, and improves reliability of HARQ-ACK codebook transmission. Compared with Method I, this method increases flexibility of scheduling without increasing bits for DCI.

Method 3: it may be specified by standard specifications that when the UE is configured with a semi-static HARQ-ACK codebook, the reference point S0 for the starting symbol S in the downlink TDRA table is 0, that is, the start of a downlink slot is taken as the reference.

For example, the reference point S0 for starting symbol S is defined as:
- if it is configured to use the starting symbol of a PDCCH monitoring occasion as the reference point of the SLIV (for example, configured with the parameter ReferenceofSLIV-ForDCIFormat1_2) and the type of the HARQ-ACK codebook is dynamic codebook (for example, the parameter pdsch-HARQ-ACK-Codebook is configured as dynamic and/or enhancedDynamic), and when receiving a PDSCH scheduled by a DCI format 1_2 with CRC scrambled by C-RNTI, MCS-C-RNTI, CS-RNTI, K0=0, and PDSCH mapping Type B, the starting symbol S is relative to the starting symbol S0 of the PDCCH monitoring occasion where DCI format 1_2 is detected;

otherwise, the starting symbol S is relative to the start of the slot using S0=0.

For another example, the reference point S0 for starting symbol S is defined as:

if it is configured to use the starting symbol of a PDCCH monitoring occasion as the reference point of the SLIV (for example, configured with the parameter ReferenceofSLIV-ForDCIFormat1_2) and the type of the HARQ-ACK codebook is not semi-static codebook (for example, the parameter pdsch-HARQ-ACK-Codebook is not configured as semi-static), and when receiving a PDSCH scheduled by a DCI format 1_2 with CRC scrambled by C-RNTI, MCS-C-RNTI, CS-RNTI, K0=0, and PDSCH mapping Type B, the starting symbol S is relative to the starting symbol S0 of the PDCCH monitoring occasion where DCI format 1_2 is detected;

otherwise, the starting symbol S is relative to the start of the slot using S0=0.

This method clarifies that how to determine PDSCHs possibly to be received in a slot in a semi-static HARQ-ACK codebook, which ensures a consistent understanding of the size and order of the HARQ-ACK codebook between the UE and the base station, improves reliability of HARQ-ACK codebook transmission, and avoids the situation that the base station schedules a PDSCH repetitive transmissions without feedback bit(s) in the semi-static HARQ-ACK codebook.

In another embodiment, the UE is configured with a semi-static HARQ-ACK codebook, for example, 3GPP TS 38.213 Type-1 HARQ-ACK codebook. The HARQ-ACK bit corresponding to a PDSCH in the semi-static HARQ-ACK codebook is determined by time domain resources of the PDSCH. For a DCI indicating SPS PDSCH release, the HARQ-ACK bit corresponding to the associated PDSCH in the semi-static HARQ-ACK codebook is determined by time domain resource occupied by the released SPS PDSCH. If a DCI indicating SPS PDSCH release indicates multiple SPS PDSCH releases, the HARQ-ACK bit corresponding to the associated PDSCH in the semi-static HARQ-ACK codebook is determined by time domain resource occupied by the released SPS PDSCH with the smallest index. Since a period of the SPS PDSCH and a period of the uplink and downlink frame structure configuration may be different, in a downlink slot, it may occur that time domain resource occupied by the released SPS PDSCH with the smallest index is all uplink in a slot, and at this time, there is no corresponding bit in the HARQ-ACK codebook to feed back the DCI indicating SPS PDSCH release. The bit for feeding back the DCI indicating SPS PDSCH release in the HARQ-ACK codebook may be determined by using the following methods.

The UE receives a DCI indicating multiple SPS PDSCH releases in a downlink slot. The bit for the DCI in the semi-static HARQ-ACK is the bit corresponding to the SPS PDSCH with the smallest index among the released SPS PDSCHs, as indicated by the DCI, which could possibly be received in the current slot. Alternatively, the bit for the DCI in the semi-static HARQ-ACK is determined by time domain resource of the SPS PDSCH with the smallest index among the released SPS PDSCHs, as indicated by the DCI, which could possibly be received in the current slot. Alternatively, the position of the DCI in the semi-static HARQ-ACK is determined by time domain resource of the SPS PDSCH with the smallest index among the released SPS PDSCHs, as indicated by the DCI, which could be received in the current slot.

For example, the UE has 4 activated SPS PDSCH configurations SPS PDSCH #1, #2, #3, and #4 in slot n. The UE receives a DCI indicating the release of SPS PDSCH #1 and #3 in slot n. Time domain resource for SPS PDSCH #1 is uplink in slot n, and time domain resource for SPS PDSCH #3 is all downlink in slot n. SPS PDSCH #1 has no corresponding bit in the HARQ-ACK codebook, and SPS PDSCH #3 has a corresponding bit in the HARQ-ACK codebook. A corresponding position of the DCI indicating SPS release in the HARQ-ACK codebook is the position corresponding to SPS PDSCH #3 in slot n.

It may further be specified that the UE does not expect to receive a DCI indicating SPS PDSCH release, and the DCI has no feedback bit(s) in the HARQ-ACK codebook.

This method avoids the situation where a DCI indicating SPS PDSCH release does not have feedback bit(s) in the semi-static HARQ-ACK codebook, so as to maintain a consistent understanding of the size and order of the HARQ-ACK codebook between the UE and the base station, improve reliability of HARQ-ACK codebook transmission, and ensure that the DCI indicating SPS PDSCH release can have HARQ-ACK information feedback.

Figure 17:
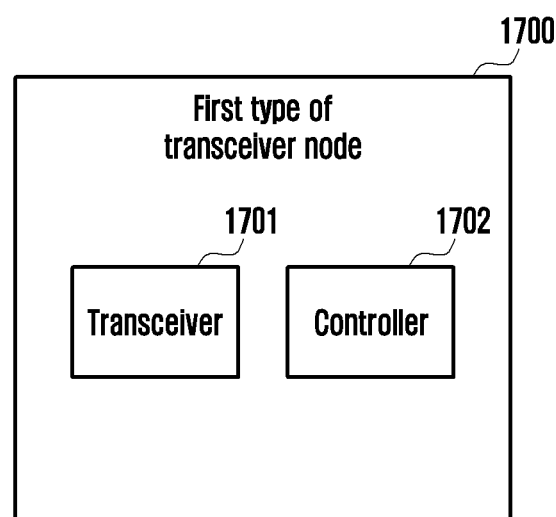
FIG. 17 shows a block diagram of a first type of transceiver node according to an embodiment of the present disclosure.

FIG. 17 shows a block diagram of a first type of transceiver node according to an embodiment of the present disclosure.

Referring to FIG. 17, the first type of transceiver node 1700 may include a transceiver 1701 and a controller 1702.

The transceiver 1701 may be configured to transmit a first type of data and/or a first type of control signaling to a second type of transceiver node and receive a HARQ-ACK codebook from the second type of transceiver node in a time unit.

The controller 1702 may be a circuit-specific integrated circuit or at least one processor. The controller 1702 may be configured to control an overall operation of the first type of transceiver node, including controlling the transceiver 1701 to transmit the first type of data and/or the first type of control signaling to the second type of transceiver node and receive the HARQ-ACK codebook from the second type of transceiver node in the determined time unit, and the HARQ-ACK codebook and the time unit are determined by the second type of transceiver node based on the received first type of data and/or the first type of control signaling.

In the following description, BS is taken as an example (but not limited thereto) to describe the first type of transceiver node, UE is taken as an example (but not limited thereto) to describe the second type of transceiver node, a downlink time unit (but not limited thereto) is used to describe the first type of time unit, and an uplink time unit (but not limited thereto) is used to describe the time unit. Downlink data and/or downlink control signaling (but not limited thereto) are used to describe the first type of data and/or the first type of control signaling. The HARQ-ACK codebook may be included in a second type of control signaling, and uplink control signaling (but not limited thereto) is used to describe the second type of control signaling.

Figure 18:
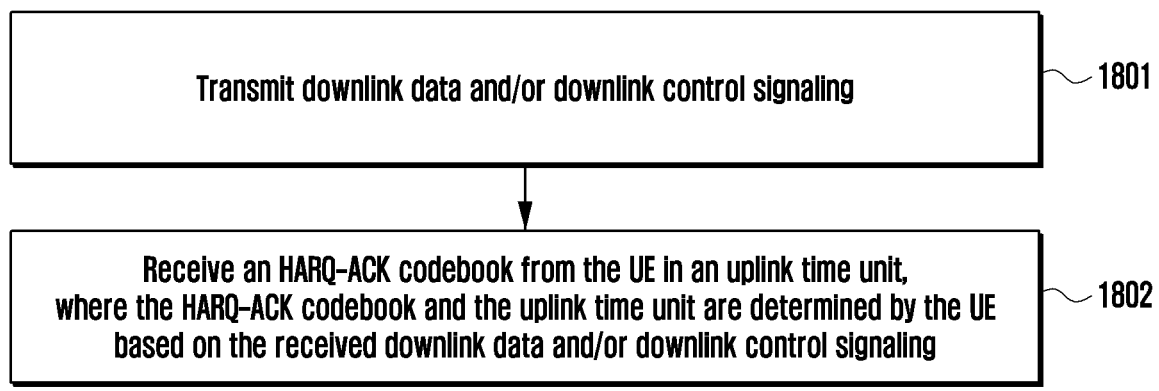
FIG. 18 shows a flowchart of a method performed by a BS according to an embodiment of the present disclosure.

FIG. 18 shows a flowchart of a method performed by a BS according to an embodiment of the present disclosure.

First, in step 1801, the BS transmits downlink data and/or downlink control signaling to UE.

In step 1802, the BS receives a HARQ-ACK codebook from the UE in an uplink time unit, where the HARQ-ACK codebook and the uplink time unit are determined by the UE based on the received downlink data and/or downlink control signaling.

Those skilled in the art will understand that the BS decodes the HARQ-ACK codebook based on a method corresponding to the method performed by the UE in the above-described embodiment.

It may be understood by a person of ordinary skill in the art that computer program instructions may be used to realize each block in structure diagrams and/or block diagrams and/or flowcharts as well as a combination of blocks in the structure diagrams and/or block diagrams and/or flowcharts. It may be understood by a person of ordinary skill in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by a person of ordinary skill in the art that the operations, methods, steps in the flows, measures and solutions already discussed in the present application may be alternated, changed, combined or deleted. Further, the operations, methods, other steps in the flows, measures and solutions already discussed in the present application may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely some implementations of the present application. It should be noted that, to a person of ordinary skill in the art, various improvements and modifications may be made without departing from the principle of the present application, and these improvements and modifications shall be deemed as falling into the protection scope of the present application.

The invention claimed is:

1. A method performed by a terminal in a communication system, the method comprising:
   receiving, from a base station, higher layer signaling configuring two physical downlink shared channel (PDSCH) groups;
   receiving, from the base station, first downlink control information (DCI) scheduling a first PDSCH corresponding to a first PDSCH group of number n, wherein the first DCI includes a first new feedback indicator (NFI) for the first PDSCH group, where n corresponds to 0 or 1;
   receiving, from the base station, second DCI scheduling a second PDSCH corresponding to a second PDSCH group of number (n+1) mod 2, wherein the second DCI includes a second NFI for the first PDSCH group and at least one of a first downlink assignment index (DAI) or a second DAI for the second PDSCH group, and a third DAI for the first PDSCH group, and group codebook indication information; and
   in case that the group codebook indication information indicates a feedback of hybrid automatic repeat request acknowledgement (HARQ-ACK) codebook of both the first PDSCH group and the second PDSCH group:
      generating a HARQ-ACK codebook for the first PDSCH group and a HARQ-ACK codebook for the second PDSCH group; and
      transmitting, to the base station, both of the HARQ-ACK codebook for the first PDSCH group and the HARQ-ACK codebook for the second PDSCH group,
   wherein the third DAI in the second DCI corresponds to both a first HARQ-ACK sub-codebook associated with a transport block (TB)-ACK and a second HARQ-ACK sub-codebook associated with a code block group (CBG)-ACK for the first PDSCH group.

2. The method of claim 1, wherein a value of the second NFI in the second DCI and a value of the first NFI in the first DCI is the same.

3. The method of claim 1, wherein the generating of the HARQ-ACK codebook for the first PDSCH group and the HARQ-ACK codebook for the second PDSCH group further comprises:
   in case that n is 0, appending the HARQ-ACK codebook for the second PDSCH group to the HARQ-ACK codebook for the first PDSCH group.

4. The method of claim 1, wherein the generating of the HARQ-ACK codebook for the first PDSCH group and the HARQ-ACK codebook for the second PDSCH group further comprises:
   in case that n is 1, appending the HARQ-ACK codebook for the first PDSCH group to the HARQ-ACK codebook for the second PDSCH group.

5. The method of claim 1, wherein the higher layer signaling further includes information indicating that the third DAI is included in downlink control information.

6. The method of claim 1, wherein a size of the third DAI is 2 bit.

7. A method performed by a base station in a communication system, the method comprising:
   transmitting, to a terminal, higher layer signaling configuring two physical downlink shared channel (PDSCH) groups;
   transmitting, to the terminal, first downlink control information (DCI) scheduling a first PDSCH corresponding to a first PDSCH group of number n, wherein the first DCI includes a first new feedback indicator (NFI) for the first PDSCH group, where n corresponds to 0 or 1;
   transmitting, to the terminal, second DCI scheduling a second PDSCH corresponding to a second PDSCH group of number (n+1) mod 2, wherein the second DCI includes a second NFI for the first PDSCH group and at least one of a first downlink assignment index (DAI) or a second DAI for the second PDSCH group, and a third DAI for the first PDSCH group, and group codebook indication information; and
   in case that the group codebook indication information indicates a feedback of hybrid automatic repeat request acknowledgement (HARQ-ACK) codebook of both the first PDSCH group and the second PDSCH group, receiving, from the terminal, both of a HARQ-ACK codebook for the first PDSCH group and a HARQ-ACK codebook for the second PDSCH group,
   wherein the third DAI in the second DCI corresponds to both a first HARQ-ACK sub-codebook associated with a transport block (TB)-ACK and a second HARQ-ACK sub-codebook associated with a code block group (CBG)-ACK for the first PDSCH group.

8. The method of claim 7, wherein a value of the second NFI in the second DCI and a value of the first NFI in the first DCI is the same.

9. The method of claim 7, wherein in case that n is 0, the HARQ-ACK codebook for the second PDSCH group is appended to the HARQ-ACK codebook for the first PDSCH group.

10. The method of claim 7, wherein in case that n is 1, the HARQ-ACK codebook for the first PDSCH group is appended to the HARQ-ACK codebook for the second PDSCH group.

11. The method of claim 7, wherein the higher layer signaling further includes information indicating that the third DAI is included in downlink control information.

12. The method of claim 7, wherein a size of the third DAI is 2 bit.

13. A terminal in a communication system, the terminal comprising:
a transceiver; and
a controller coupled with the transceiver and configured to:
receive, from a base station, higher layer signaling configuring two physical downlink shared channel (PDSCH) groups,
receive, from the base station, first downlink control information (DCI) scheduling a first PDSCH corresponding to a first PDSCH group of number n, wherein the first DCI includes a first new feedback indicator (NFI) for the first PDSCH group, where n corresponds to 0 or 1,
receive, from the base station, second DCI scheduling a second PDSCH corresponding to a second PDSCH group of number (n+1) mod 2, wherein the second DCI includes a second NFI for the first PDSCH group and at least one of a first downlink assignment index (DAI) or a second DAI for the second PDSCH group, and a third DAI for the first PDSCH group, and group codebook indication information, and
in case that the group codebook indication information indicates a feedback of hybrid automatic repeat request acknowledgement (HARQ-ACK) codebook of both the first PDSCH group and the second PDSCH group:
generate a HARQ-ACK codebook for the first PDSCH group and a HARQ-ACK codebook for the second PDSCH group, and
transmit, to the base station, both of the HARQ-ACK codebook for the first PDSCH group and the HARQ-ACK codebook for the second PDSCH group,
wherein the third DAI in the second DCI corresponds to both a first HARQ-ACK sub-codebook associated with a transport block (TB)-ACK and a second HARQ-ACK sub-codebook associated with a code block group (CBG)-ACK for the first PDSCH group.

14. The terminal of claim 13, wherein a value of the second NFI in the second DCI and a value of the first NFI in the first DCI is the same.

15. The terminal of claim 13, wherein the controller is further configured to append the HARQ-ACK codebook for the second PDSCH group to the HARQ-ACK codebook for the first PDSCH group, in case that n is 0.

16. The terminal of claim 13, wherein the controller is further configured to append the HARQ-ACK codebook for the first PDSCH group to the HARQ-ACK codebook for the second PDSCH group, in case that n is 1.

17. The terminal of claim 13, wherein the higher layer signaling further includes information indicating that the third DAI is included in downlink control information.

18. The terminal of claim 13, wherein a size of the third DAI is 2 bit.

19. A base station in a communication system, the base station comprising:
a transceiver; and
a controller coupled with the transceiver and configured to:
transmit, to a terminal, higher layer signaling configuring two physical downlink shared channel (PDSCH) groups,
transmit, to the terminal, first downlink control information (DCI) scheduling a first PDSCH corresponding to a first PDSCH group of number n, wherein the first DCI includes a first new feedback indicator (NFI) for the first PDSCH group, where n corresponds to 0 or 1,
transmit, to the terminal, second DCI scheduling a second PDSCH corresponding to a second PDSCH group of number (n+1) mod 2, wherein the second DCI includes a second NFI for the first PDSCH group and at least one of a first downlink assignment index (DAI) or a second DAI for the second PDSCH group, and a third DAI for the first PDSCH group, and group codebook indication information, and
in case that the group codebook indication information indicates a feedback of hybrid automatic repeat request acknowledgement (HARQ-ACK) codebook of both the first PDSCH group and the second PDSCH group, receive, from the terminal, both of a HARQ-ACK codebook for the first PDSCH group and a HARQ-ACK codebook for the second PDSCH group,
wherein the third DAI in the second DCI corresponds to both a first HARQ-ACK sub-codebook associated with a transport block (TB)-ACK and a second HARQ-ACK sub-codebook associated with a code block group (CBG)-ACK for the first PDSCH group.

20. The base station of claim 19, wherein a value of the second NFI in the second DCI and a value of the first NFI in the first DCI is the same.

21. The base station of claim 19, wherein in case that n is 0, the HARQ-ACK codebook for the second PDSCH group is appended to the HARQ-ACK codebook for the first PDSCH group.

22. The base station of claim 19, wherein in case that n is 1, the HARQ-ACK codebook for the first PDSCH group is appended to the HARQ-ACK codebook for the second PDSCH group.

23. The base station of claim 19, wherein the higher layer signaling further includes information indicating that the third DAI is included in downlink control information.

24. The base station of claim 19, wherein a size of the third DAI is 2 bit.

* * * * *